US012012276B2

(12) United States Patent
Hoffman et al.

(10) Patent No.: US 12,012,276 B2
(45) Date of Patent: Jun. 18, 2024

(54) CAP ASSEMBLY FOR A MEDICATION CONTAINER

(71) Applicant: Express Scripts Strategic Development, Inc., St. Louis, MO (US)

(72) Inventors: Robert E. Hoffman, Linden, IN (US); Timothy B. Clise, Howell, MI (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 17/570,759

(22) Filed: Jan. 7, 2022

(65) Prior Publication Data

US 2022/0127061 A1 Apr. 28, 2022

Related U.S. Application Data

(63) Continuation-in-part of application No. 17/122,656, filed on Dec. 15, 2020, now Pat. No. 11,827,442, which is a continuation-in-part of application No. 16/927,420, filed on Jul. 13, 2020.

(60) Provisional application No. 62/872,733, filed on Jul. 11, 2019, provisional application No. 62/903,554, filed on Sep. 20, 2019, provisional application No. 63/135,285, filed on Jan. 8, 2021.

(51) Int. Cl.

*B65D 83/04* (2006.01)
*A61J 1/03* (2023.01)
*B65D 51/24* (2006.01)

(52) U.S. Cl.

CPC ............ *B65D 83/0409* (2013.01); *A61J 1/03* (2013.01); *B65D 51/248* (2013.01)

(58) Field of Classification Search

CPC ....... B65D 83/0409; B65D 51/248; A61J 1/03
USPC .......... 221/266, 233, 95, 252; 206/539, 457, 206/534
See application file for complete search history.

(56) References Cited

U.S. PATENT DOCUMENTS

| | | | | |
|---|---|---|---|---|
| 3,437,236 A | | 4/1969 | Huck | |
| 3,823,844 A | | 7/1974 | Linkemer | |
| 4,034,757 A | | 7/1977 | Glover | |
| 4,288,006 A | * | 9/1981 | Clover, Jr. ........... | B65D 47/265 222/42 |

(Continued)

FOREIGN PATENT DOCUMENTS

| | | |
|---|---|---|
| EP | 02524321 A | 1/1988 |
| EP | 3762881 A | 1/2021 |

(Continued)

*Primary Examiner* — Rakesh Kumar
(74) *Attorney, Agent, or Firm* — Dickinson Wright PLLC

(57) ABSTRACT

The medication container includes a receptacle that has an inner space for holding medications. The cap assembly is coupled with the receptacle for retaining the medications in the inner space. The cap assembly includes at least one passage that can be selectively opened and closed and includes at least one medication sensor that is configured to detect any medications travelling through the passage and out of the receptacle in a contactless manner. A microprocessor is in electrical communication with the at least one medication sensor and with a memory. The microprocessor is configured to record data to the memory in response to the at least one medication sensor detecting a medication travelling through the passage. A wireless module is in electrical communication with the microprocessor for uploading the data to an external device.

13 Claims, 37 Drawing Sheets

(56) References Cited

U.S. PATENT DOCUMENTS

| | | | | | |
|---|---|---|---|---|---|
| 4,308,979 | A * | 1/1982 | Otterson | B65D 47/265 | 222/548 |
| 4,377,236 | A * | 3/1983 | Montgomery | B65D 39/04 | 220/301 |
| 4,432,300 | A | 2/1984 | Lyss | | |
| 4,460,106 | A | 7/1984 | Moulding, Jr. | | |
| 4,489,834 | A | 12/1984 | Thackrey | | |
| 4,530,447 | A * | 7/1985 | Greenspan | B65D 83/04 | 222/543 |
| 4,541,541 | A * | 9/1985 | Hickman | B65D 47/265 | 220/253 |
| 4,567,995 | A * | 2/1986 | Kreiseder | B65D 47/265 | 220/267 |
| 4,611,725 | A * | 9/1986 | Kacalieff | B65D 47/265 | 222/541.6 |
| 4,971,221 | A | 11/1990 | Urquhart | | |
| 5,000,345 | A | 3/1991 | Brogna | | |
| 5,176,277 | A * | 1/1993 | Schuermann | B65D 47/265 | 222/548 |
| 5,193,704 | A * | 3/1993 | Kick | B65D 47/265 | 222/548 |
| RE34,263 | E * | 5/1993 | vanKerkhoven | B65D 47/36 | 222/548 |
| 5,213,238 | A * | 5/1993 | Martin | B65D 47/265 | 222/548 |
| 5,259,532 | A | 11/1993 | Schwarzli | | |
| 5,269,432 | A * | 12/1993 | Beckertgis | B65D 51/24 | 215/250 |
| 5,383,582 | A * | 1/1995 | Baxter | B65D 47/265 | 222/548 |
| 5,407,107 | A * | 4/1995 | Smith | B65D 47/265 | 222/548 |
| 5,421,472 | A * | 6/1995 | Beckertgis | B65D 47/265 | 222/548 |
| 5,542,579 | A * | 8/1996 | Robbins, III | B65D 47/0866 | 222/456 |
| 5,549,217 | A * | 8/1996 | Benarrouch | B65D 83/0409 | 221/265 |
| 5,601,213 | A * | 2/1997 | Daniello | G01F 11/261 | 222/456 |
| 5,850,919 | A * | 12/1998 | Freed | B65D 83/0481 | 206/534 |
| 5,921,394 | A | 7/1999 | Shroff | | |
| 6,098,835 | A | 8/2000 | Dejonge | | |
| 6,142,337 | A * | 11/2000 | Schreckenberg | A61J 1/03 | 221/266 |
| 6,259,654 | B1 | 7/2001 | De La Huerga | | |
| 6,332,100 | B1 | 12/2001 | Sahai | | |
| 6,343,711 | B1 | 2/2002 | Coughlin | | |
| 6,401,429 | B2 | 6/2002 | Aylward | | |
| 6,651,840 | B1 | 11/2003 | Van Dullemen | | |
| 6,655,707 | B2 | 12/2003 | Buckmiller | | |
| 6,860,403 | B1 | 3/2005 | Mehrens | | |
| 7,100,797 | B2 | 9/2006 | Kahn | | |
| 7,213,721 | B2 | 5/2007 | Abdulhay | | |
| 7,240,795 | B2 * | 7/2007 | Lee | B65D 25/04 | 206/534 |
| 7,377,401 | B2 * | 5/2008 | Humphrey | G07F 11/44 | 221/95 |
| 7,711,449 | B2 | 5/2010 | Abdulhay | | |
| 7,748,569 | B2 * | 7/2010 | Sunatori | A47G 19/24 | 211/DIG. 1 |
| 7,909,212 | B2 * | 3/2011 | Parve | B65D 83/06 | 222/548 |
| 7,967,160 | B2 * | 6/2011 | Rault | B65D 51/20 | 220/270 |
| 8,269,613 | B2 | 9/2012 | Lazar | | |
| 8,386,275 | B2 | 2/2013 | Chambers | | |
| 8,388,907 | B2 | 3/2013 | Gold | | |
| 8,666,539 | B2 | 3/2014 | Ervin | | |
| 8,666,543 | B2 | 3/2014 | Macvittie | | |
| 8,955,058 | B2 | 2/2015 | Castro | | |
| D723,793 | S | 3/2015 | Macvittie | | |
| 9,021,981 | B2 | 5/2015 | Raiti De Boyles | | |
| 9,195,822 | B2 | 11/2015 | Carlson | | |
| 9,283,150 | B2 | 3/2016 | Bujalski | | |
| D756,681 | S | 5/2016 | Macvittie | | |
| 9,492,357 | B2 | 11/2016 | Macvittie | | |
| 9,497,178 | B2 | 11/2016 | Chow | | |
| 9,511,003 | B2 | 12/2016 | Medrano | | |
| 9,516,008 | B2 | 12/2016 | Chow | | |
| 9,554,969 | B2 | 1/2017 | Lehmann | | |
| 9,622,939 | B2 | 4/2017 | Buxton-Dakides | | |
| 9,713,574 | B2 | 7/2017 | Carrel | | |
| 9,730,860 | B2 | 8/2017 | Hamilton | | |
| 9,731,103 | B1 | 8/2017 | Rouse | | |
| 9,757,305 | B2 | 9/2017 | Ika | | |
| 9,775,780 | B2 | 10/2017 | Afsarifard | | |
| 9,872,808 | B2 | 1/2018 | Gipson | | |
| 9,934,365 | B2 | 4/2018 | Turnell | | |
| 9,981,116 | B1 | 5/2018 | Rouse | | |
| 10,073,954 | B2 | 9/2018 | Chen | | |
| 10,093,474 | B2 | 10/2018 | Littman | | |
| 10,188,840 | B2 | 1/2019 | Rouse | | |
| 10,196,197 | B2 | 2/2019 | Yeo | | |
| 10,392,181 | B2 | 8/2019 | Zonana | | |
| 10,399,725 | B2 | 9/2019 | Paz | | |
| 10,441,509 | B2 | 10/2019 | Rouse | | |
| 10,468,132 | B2 | 11/2019 | Kamen | | |
| 10,494,165 | B2 | 12/2019 | Sterns | | |
| 10,555,873 | B2 | 2/2020 | Poirier | | |
| 10,621,880 | B2 | 4/2020 | Boguraev | | |
| 10,675,216 | B2 | 6/2020 | Mejia | | |
| 10,722,431 | B2 | 7/2020 | Chen | | |
| 10,729,860 | B1 | 8/2020 | Boyer | | |
| 10,792,226 | B2 | 10/2020 | Rouse | | |
| 10,894,001 | B2 | 1/2021 | Jarvis | | |
| 10,964,154 | B2 | 3/2021 | Einav | | |
| 11,157,601 | B2 | 10/2021 | Miu | | |
| 11,576,842 | B2 * | 2/2023 | Park | A61J 7/0076 | |
| 2005/0269348 | A1 * | 12/2005 | Limback | A47L 15/4409 | 221/263 |
| 2006/0124502 | A1 * | 6/2006 | Lee | B65D 25/04 | 206/539 |
| 2006/0213917 | A1 | 9/2006 | Handfield | | |
| 2007/0007301 | A1 * | 1/2007 | Kaplan | G07F 17/0092 | 221/288 |
| 2008/0245810 | A1 | 10/2008 | Karwacki, Jr. | | |
| 2010/0200593 | A1 * | 8/2010 | Lazar | A61J 7/0481 | 220/560.03 |
| 2011/0301747 | A1 | 12/2011 | Chambers | | |
| 2012/0203376 | A1 | 8/2012 | Savage | | |
| 2012/0257478 | A1 | 10/2012 | Marcellino | | |
| 2013/0035785 | A1 * | 2/2013 | MacVittie | A61J 7/0076 | 700/231 |
| 2013/0116818 | A1 * | 5/2013 | Hamilton | A61J 7/04 | 221/277 |
| 2013/0161207 | A1 | 6/2013 | Luciano, Jr. | | |
| 2014/0305963 | A1 | 10/2014 | Zonana | | |
| 2014/0343734 | A1 | 11/2014 | Meyer | | |
| 2015/0053801 | A1 | 2/2015 | Smit | | |
| 2015/0129602 | A1 | 5/2015 | Medrano | | |
| 2015/0291344 | A1 | 10/2015 | Macvittie | | |
| 2015/0342830 | A1 | 12/2015 | Bujalski | | |
| 2015/0360834 | A1 | 12/2015 | Mikhail | | |
| 2016/0015885 | A1 | 1/2016 | Pananen | | |
| 2016/0058670 | A1 | 3/2016 | Wheeler | | |
| 2016/0107820 | A1 | 4/2016 | Macvittie | | |
| 2016/0120758 | A1 | 5/2016 | Pi | | |
| 2016/0147976 | A1 | 5/2016 | Jain | | |
| 2016/0158470 | A1 | 6/2016 | Esteve | | |
| 2016/0309967 | A1 | 10/2016 | Pelfrey | | |
| 2016/0367188 | A1 | 12/2016 | Malik | | |
| 2017/0079886 | A1 | 3/2017 | Sagynaliev | | |
| 2017/0281471 | A1 * | 10/2017 | Hamilton | A61J 7/0076 | |
| 2017/0296432 | A1 | 10/2017 | Ika | | |
| 2017/0334631 | A1 | 11/2017 | Veltri | | |
| 2018/0015002 | A1 | 1/2018 | Alaev | | |
| 2019/0130078 | A1 * | 5/2019 | Herbert | A61J 7/0418 | |
| 2019/0133888 | A1 | 5/2019 | Lam | | |
| 2019/0156475 | A1 | 5/2019 | Markson | | |

(56) References Cited

U.S. PATENT DOCUMENTS

| | | | | |
|---|---|---|---|---|
| 2019/0185249 | A1* | 6/2019 | Bartley ................ | B65D 47/265 |
| 2019/0223792 | A1 | 7/2019 | Dhar | |
| 2020/0252395 | A1 | 8/2020 | Mercier | |

FOREIGN PATENT DOCUMENTS

| | | | |
|---|---|---|---|
| WO | 2004103856 | A1 | 12/2004 |
| WO | 2015157759 | A1 | 10/2015 |
| WO | 2016061462 | A2 | 4/2016 |
| WO | 2016127051 | A1 | 8/2016 |

* cited by examiner

CAP ASSEMBLY FOR A MEDICATION CONTAINER

CROSS-REFERENCE TO RELATED APPLICATIONS

This application is a Continuation-In-Part of and claims priority to co-pending U.S. patent application Ser. No. 17/122,656, filed on Dec. 15, 2020, and entitled "CAP ASSEMBLY FOR A MEDICATION CONTAINER," which is a Continuation-In-Part of U.S. patent application Ser. No. 16/927,420, filed Jul. 13, 2020, entitled "CAP ASSEMBLY FOR A MEDICATION CONTAINER," which claims priority to U.S. Provisional Application No. 62/872,733, filed on Jul. 11, 2019, and entitled "CAP ASSEMBLY FOR A MULTI-CHAMBER MEDICATION CONTAINER" and U.S. Provisional Application No. 62/903,554, filed on Sep. 20, 2019, and entitled "CAP ASSEMBLY FOR A MULTI-CHAMBER MEDICATION CONTAINER," and this application also claims priority to and the benefit of U.S. Provisional Application No. 63/135,285, filed on Jan. 8, 2021, and entitled "CAP ASSEMBLY FOR A MEDICATION CONTAINER," the entire disclosures of all of these applications being incorporated herein by reference.

FIELD

The subject disclosure is generally related to medication containers and, more particularly, to a cap assembly for a medication container or dispensing sensors for containers.

BACKGROUND

Medication compliance by patients is a known problem in the medical industry because patients often, either intentionally or accidentally, fail to follow a medication regimen prescribed by a medical provider. In some cases, as little as a single missed dose may require a patient to restart a medication regimen from the beginning. One known product which seeks to improve medication compliance, includes a plurality of packets, each of which contains only the medications that the user has to take at a certain time. In other words, the pills are divided, not by type, but by when they should be taken. However, there remains a continuing need for a product that is can improve medication compliance and which is both more convenient and less costly than other known solutions.

SUMMARY

One aspect of the present disclosure is related to a medication container that includes a receptacle that has an inner space for holding medications. The cap assembly is coupled with the receptacle for retaining the medications in the inner space. The cap assembly includes at least one passage that can be selectively opened and closed. The cap assembly includes at least one medication sensor that is configured to detect any medications travelling through the passage and out of the receptacle in a contactless manner. A microprocessor or other electronic controller is in electrical communication with the at least one medication sensor and with a memory. The microprocessor is configured to record data to the memory in response to the at least one medication sensor detecting a medication travelling through the passage. A wireless module is in electrical communication with the microprocessor for uploading the data to an external device.

According to yet another aspect of the present disclosure, the at least one medication sensor includes a light source and a light detector. In an example embodiment, the medication sensor includes a transceiver. The light source can be an array of light emitters and aligned detectors. The array can be a one by many array, an N by N array, an M by N array (with N and M being different integers) or the like. The plurality of light sources and one or more detectors can be arranged in other patterns to match the periphery of the aperture through which the items, e.g., pills, pass. The plurality of light sources and one or more detectors can be arranged in an oval arrangement, a circular arrangement, or a polygonal arrangement (square or rectangular).

According to still another aspect of the present disclosure, the light detector is configured to produce a voltage or other signal when exposed to light. In an example embodiment, the microprocessor is configured to monitor the voltage produced by the light detector or another output signal from the detector to determine when a medication travels through the passage.

According to a further aspect of the present disclosure, the cap assembly further includes a gate, which is configured to be moved between an open position and a closed position at the passage. In an example embodiment, the gate closes the dispenser and the interior of the container from the outside environment. In an example embodiment, the gate holds the items (e.g., medication items or pills) spaced inwardly from the medication sensor.

According to yet a further aspect of the present disclosure, the wireless module is configured to communicate with the external device over cellular communication channels.

Another aspect of the present disclosure is related to a medication container including a receptacle that has an inner space (defined by an outer wall) that is divided into at least two chambers for holding different medications. A cap assembly is operably coupled with the receptacle for retaining the medications in the at least two chambers. The cap assembly further includes at least one passage that can be selectively opened for allowing the medications in the at least two chambers to exit the receptacle and can be closed. The cap assembly further includes at least one medication sensor that is configured to detect any medications travelling through the passage and out of the receptacle. The sensor can detect passage in a contactless manner. A microprocessor is in electrical communication with the at least one medication sensor and with a memory. The microprocessor is configured to record data to the memory in response to the at least one medication sensor detecting a medication travelling through the at least one passage. The data includes at least a time stamp and an identification of which chamber of the at least two chambers in which the medication was located. The cap assembly further includes a wireless module that is in electrical communication with the microprocessor for uploading the data to an external device.

According to another aspect of the present disclosure, the at least one passage of the cap assembly is only a single passage, and the cap assembly is rotatable relative to the receptacle for allowing a user to selectively align the passage with a desired one of the at least two chambers of the receptacle. In an example embodiment, the passage is tapered from a wider throat (fluidly connected to the open interior of the container) to a narrower mouth such that a single item passes by the medication sensor at the mouth of the passage.

According to yet another aspect of the present disclosure, the cap assembly further includes a position sensor which is configured to detect which one of the at least two chambers of the receptacle is a selected chamber with which the passage is aligned. In an example embodiment, the position sensor is in electrical communication with the microprocessor.

According to still another aspect of the present disclosure, the data recorded by the microprocessor to the memory further includes which chamber of the receptacle was the selected chamber when the at least one medication sensor detected the medication travelling through the passage.

According to a further aspect of the present disclosure, the at least one medication sensor is a photoreflective sensor. In an example, a wall of the passage is configured to reflect at least a portion of the light in the passage.

According to yet a further aspect of the present disclosure, the at least one medication sensor is a diffuse sensor.

According to still a further aspect of the present disclosure, the cap assembly further includes at least one gate for selectively opening and closing the at least one passage and further includes at least one gate sensor which is configured to detect if the gate is in an open position or a closed position. In an example embodiment, the gate closes the passage in the dispenser from the outside environment. In an example embodiment, the gate holds the items (e.g., medication items or pills) spaced inwardly in the passage from the medication sensor.

According to another aspect of the present disclosure, the cap assembly further includes an attachment sensor, which is able to confirm attachment of the cap assembly with the receptacle.

Another aspect of the present disclosure is related to a medication container, which includes a receptacle that has an inner space for holding medications. A cap assembly is operably coupled with the inner space for retaining the medications in the inner space. The cap assembly further includes at least one passage that can be selectively opened and closed. At least one medication sensor is disposed in the cap assembly and is configured to detect any medications travelling through the passage and out of the receptacle. The at least one medication sensor is also able to operate in either an active mode or a low power mode. A movement sensor is disposed in the cap assembly and is configured to detect movement of the medication container. A microprocessor is in electrical communication with the at least one medication sensor and with the movement sensor. The microprocessor is configured to operate the at least one medication sensor in a low power mode and to activate the at least one medication sensor in the active mode in response to the movement sensor detecting movement of the medication container.

According to another aspect of the present disclosure, the movement sensor is an accelerometer.

According to yet another aspect of the present disclosure, the cap assembly further includes a memory, and the microprocessor is configured to record data to the memory in response to the at least one medication sensor detecting a medication travelling through the at least one passage. The data includes at least a time stamp and a count of the number of medications that travelled through the at least one passage during a dispensing event.

According to still another aspect of the present disclosure, the cap assembly further includes a wireless module, which is configured to communicate the data to an external device.

According to a further aspect of the present disclosure, the at least one medication sensor includes a light sensor and a light detector.

According to another aspect of the present disclosure, a medication container including a receptacle with an inner space for holding medications is provided. A cap assembly is coupled with the receptacle for retaining the medications in the inner space. The outer and inner pieces are fixedly attached, and the middle piece is fixedly attached with the receptacle. The outer, middle, and inner pieces have at least one pill opening, and the pill openings of the outer and inner pieces are circumferentially spaced apart from one another. The middle piece is rotatable with the receptacle relative to the outer piece and the inner piece to transport a pill through a curved path from the pill opening of the outer piece to the pill opening of the inner piece or from the pill opening of the inner piece to the pill opening of the outer piece to either dispense the pill from the receptacle or to insert the pill into the receptacle. In an example, the inner piece includes a insert to alter the lateral dimension of the passage through which items (e.g., medications) pass.

In an embodiment, the outer piece of the cap assembly is a crown.

In an embodiment, the inner piece is a disk that includes a probe that extends through the middle piece and engages the crown to fixedly attach the disk with the crown.

In an embodiment, the probe extends along a central axis, and the crown and disk are rotatable relative to the middle piece and the receptacle about the central axis.

In an embodiment, the cap assembly further includes at least one medication sensor that is configured to detect the passage of pills through the cap assembly either into or out of the receptacle.

In an embodiment, the cap assembly further includes a memory and a microprocessor that is configured to record data relative to the passage of pills into or out of the receptacle to the memory.

In an embodiment, the cap assembly further includes a wireless module that is configured to communicate the data on the memory to an external device and to receive data from the external device.

In an embodiment, the cap assembly further includes a light that is attached with the probe for providing an alert to the user.

In an embodiment, a contact extends through a through opening in the probe from the light to a circuit board that is attached with the disk.

In an embodiment, the middle piece is an inner cap that threadedly engages the receptacle.

In an embodiment, the middle piece and the receptacle are rotatable relative to the outer and inner pieces about a central axis, and the pill openings of the outer, middle, and inner pieces of the cap assembly are all spaced from the central axis by the same distance.

In an embodiment, the pill openings of the outer, middle, and inner pieces have similar shapes.

Another aspect of the present disclosure is related to a method of dispensing a pill from a medication container that has a receptacle and a cap assembly. The cap assembly includes an inner piece and a middle piece and an outer piece. The inner, middle, and outer pieces have pill openings. The method includes the step of guiding a pill from the receptacle into the pill opening of the inner piece. The method proceeds with the step of rotating the outer and inner pieces together relative to the middle piece to bring the pill opening of the middle piece into alignment with the pill opening of the inner piece such that the pill falls from the pill opening of the inner piece to the pill opening of the middle piece. The method continues with the step of further rotating the outer and inner pieces together relative to the middle piece to bring the pill opening of the middle piece into alignment with the pill opening of the outer piece such that the pill falls from the pill opening of the inner piece through the pill opening of the outer piece and outside of the medication container.

In an embodiment, the outer piece is a crown and the inner piece includes a probe that extends through the middle piece and is joined with the crown to fixedly attach the inner piece with the crown.

In an embodiment, the method further includes the steps of detecting a pill in at least one of the pill openings with at least one pill detector and recording data pertaining to the dispensing event to the memory using a microprocessor.

In an embodiment, the method further includes the step of transmitting the data pertaining to the dispensing device to an external device.

Another aspect of the present disclosure is related to a method of making a medication container. The method includes the step of inserting a probe of an inner piece of a cap assembly through a probe opening of a middle piece and into a probe opening of an outer piece of the cap assembly. The method continues with the step of joining the probe with the outer piece to fixedly attach the inner and outer pieces together such that the inner and outer pieces can rotate together relative to the middle piece to selectively bring a pill opening in the middle piece into alignment with either a pill opening of the outer piece or a pill opening of the inner piece. The method proceeds with the step of threading the middle piece onto a receptacle to attach the cap assembly with the receptacle.

In an embodiment, the step of joining the probe of the inner piece with the outer piece includes heat staking the probe with the outer piece.

In an embodiment, the outer piece is a crown that can be engaged by a user to rotate the crown and inner piece relative to the middle piece and the receptacle during a dispensing operation.

In an embodiment, the method further includes the step of inserting a processor and a memory and at least one pill detector into the cap assembly.

Another aspect of the present disclosure is related to a medication container that includes a receptacle having an inner space for holding medications. A cap assembly is coupled with the receptacle for retaining the medications in the inner space. The cap assembly including a crown and a base and a rotating wheel. The base is engaged with the receptacle, and the base and crown are fixedly attached with one another. The base, rotation wheel, and crown have at least one pill opening. The pill openings of the base and crown are circumferentially spaced apart from one another. The rotation wheel is rotatable relative to the base and the crown to transport a pill through a curved path from the pill opening of the base to the pill opening of the crown or from the pill opening of the crown to the pill opening of the base to either dispense the pill from the receptacle or to insert the pill into the receptacle.

In an embodiment, a probe extends through an opening in the rotation wheel between the base and crown to fixedly attach the base and crown with one another.

In an embodiment, the receptacle has threads adjacent an opening, and the base of the cap assembly is threadedly engaged with the threads of the receptacle.

In an embodiment, the rotation wheel includes multiple pill openings, and the crown only has a single pill opening so that the cap assembly can only dispense pills from one of the pill openings of the rotation wheel at a time.

In an embodiment, the base includes a projection that extends into the receptacle for guiding pills in the receptacle to the at least one pill opening of the base.

In an embodiment, at least the rotation wheel includes at least one rotation indexing device that holds the rotation wheel in at least one rotational orientation relative to the base and the crown.

In an embodiment, the rotation wheel includes at least one gripping feature that can be engaged by a digit of a user to rotate the rotation wheel relative to the base and the crown during a dispensing operation.

In an embodiment, the at least one gripping feature of the rotation wheel is recessed radially inwardly of or radially aligned with an outer periphery of at least one of the base and of the crown.

In an embodiment, the at least one gripping feature of the rotation wheel is recessed radially inwardly of or radially aligned with the outer peripheries of both of the base and of the crown.

Yet another aspect of the present disclosure is related to a method of making a medication container. The method includes the step of preparing a receptacle that has an inner space for holding medications. The method proceeds with the step of preparing a base, a rotation wheel, and a crown. Each of the base and the rotation wheel and the crown have at least one pill opening. The method continues with inserting the rotation wheel onto a central probe of the base or of the crown to establish a slip-fit engagement between the rotation wheel and the base or the crown so that the rotation wheel can rotate relative to the base or the crown. The method proceeds with fixedly attaching the probe of the base or the crown with the other of the crown and base. This fixed attachment is done such that the at least one pill opening of the base is not rotationally aligned with the at least one pill opening of the crown and such that the rotation wheel is trapped axially between and is rotatable relative to the base and the crown. Thus, the at least one pill opening of the rotation wheel can be selectively aligned with the at least one pill opening of the base and with the at least one pill opening of the crown but not with both at the same time. The method proceeds with engaging the base with the receptacle.

In an embodiment, the probe is on the base, and the step of fixedly attaching the probe includes fixedly attaching the probe of the base with the crown.

In an embodiment, the step of attaching the probe of the base with the crown includes either brazing or adhesives.

In an embodiment, the crown only includes a single pill opening.

In an embodiment, the base includes a projection, and the step of engaging the base with the receptacle includes inserting the projection partially into the inner space of the receptacle. In an example embodiment, the base includes an insert that changes the dimension of the passage for the medications (e.g., items) that pass therethough.

Still another aspect of the present disclosure is related to a method of dispensing a pill from a medication container that has a receptacle and a cap assembly. The method includes the step of preparing a cap assembly that includes a base and a rotation wheel and a crown that all have pill openings. The method includes the step of guiding a pill from the receptacle into the pill opening of the base. The method continues with the step of rotating the rotation wheel relative to the base and crown and receptacle to bring the pill opening of the rotation wheel into alignment with the pill opening of the base such that the pill falls from the pill opening of the base to the pill opening of the rotation wheel. The method proceeds with the step of further rotating the rotation wheel to bring the pill opening of the rotation wheel into alignment with the pill opening of the crown such that the pill falls from the pill opening of the rotation wheel through the pill opening of the crown and outside of the medication container.

In an embodiment, the base and the crown are fixedly attached with one another via a probe that extends through the rotation wheel to hold the base and crown fixed together as the rotation wheel is rotated.

In an embodiment, the crown only has a single pill opening so that only the pill in one pill opening of the rotation wheel can be dispensed out of the cap assembly through the single pill opening of the crown.

In an embodiment, the receptacle has at least one gripping feature that can be engaged by a user to rotate the rotation wheel relative to the base and the crown.

In an embodiment, the at least one gripping feature does not extend radially beyond an outer periphery of either the base or the crown to prevent unintentional rotation of the rotation wheel relative to the base and the crown.

In an embodiment, the pill openings of the rotation wheel are sized and shaped to only accommodate a single pill at a time.

BRIEF DESCRIPTION OF THE DRAWINGS

These and other features and advantages of the present disclosure will be readily appreciated, as the same becomes better understood by reference to the following detailed description when considered in connection with the accompanying drawings wherein:

FIG. 29 is a schematic view illustrating an environment that the medication container can operate in;

DESCRIPTION OF THE ENABLING EMBODIMENTS

Figure 1:
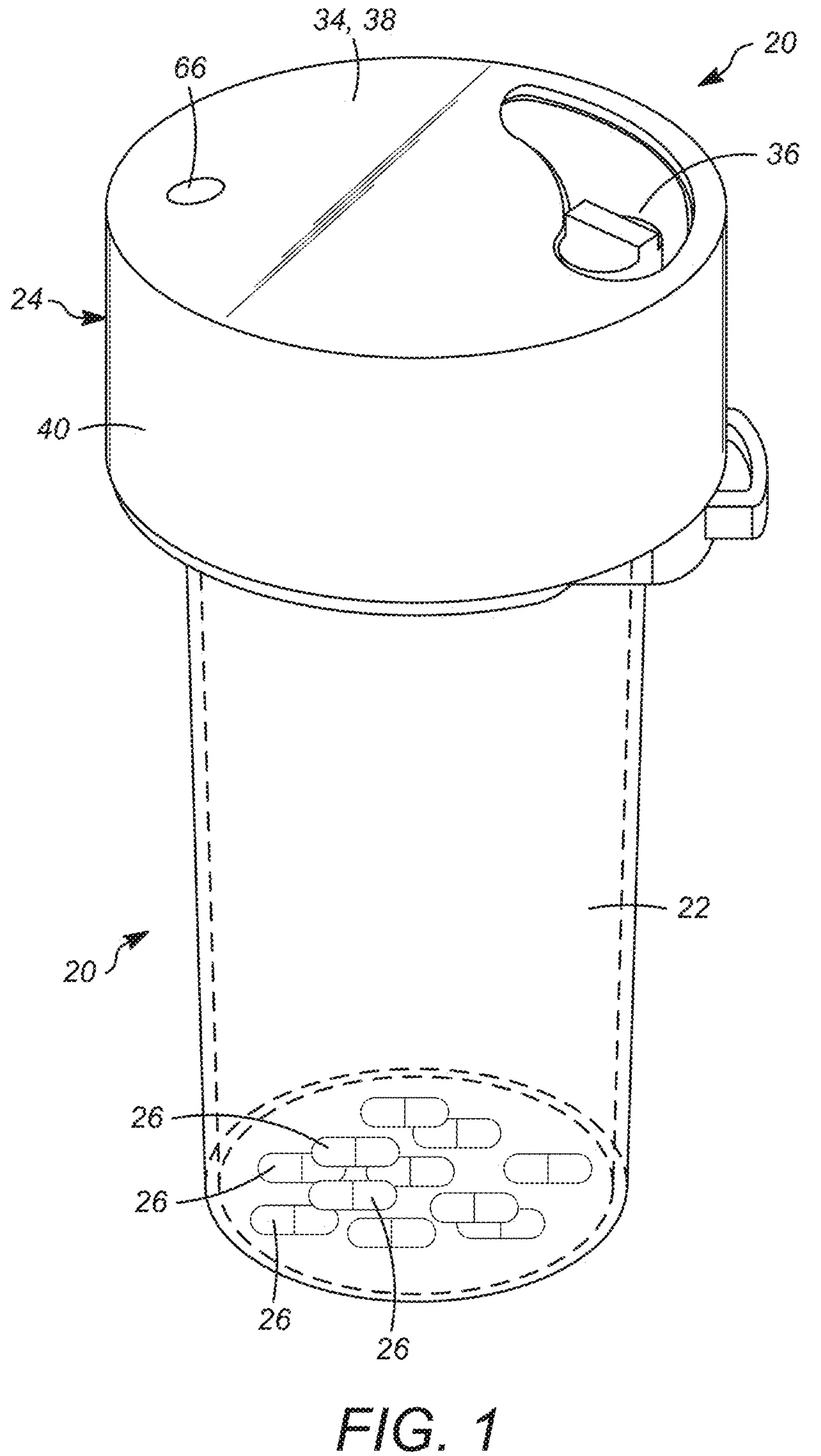
FIG. 1 is a perspective view of a first embodiment of a medication container constructed according to one aspect of the present disclosure.
Figure 2:
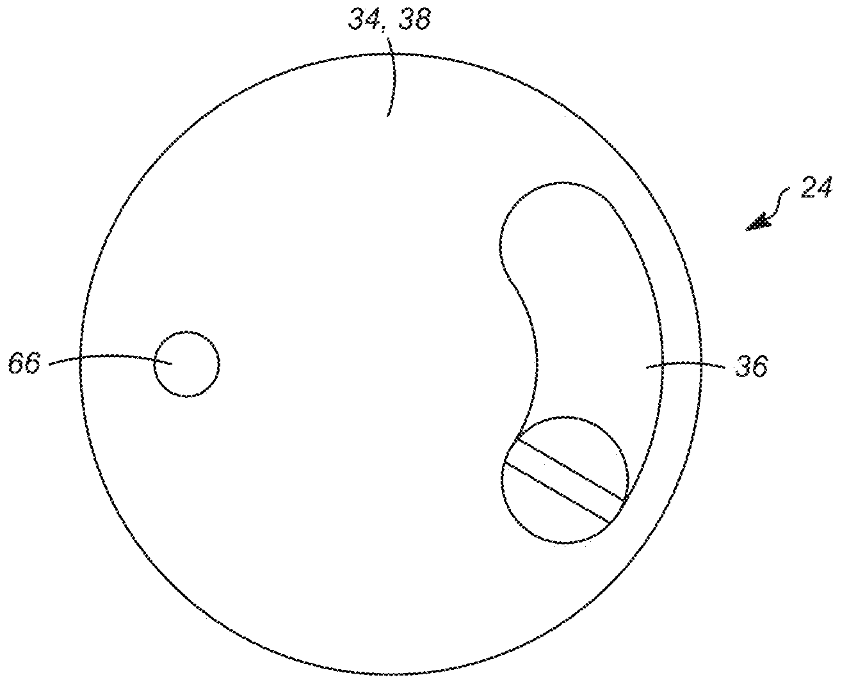
FIG. 2 is a top elevation view of the medication container of FIG. 1.
Figure 7:
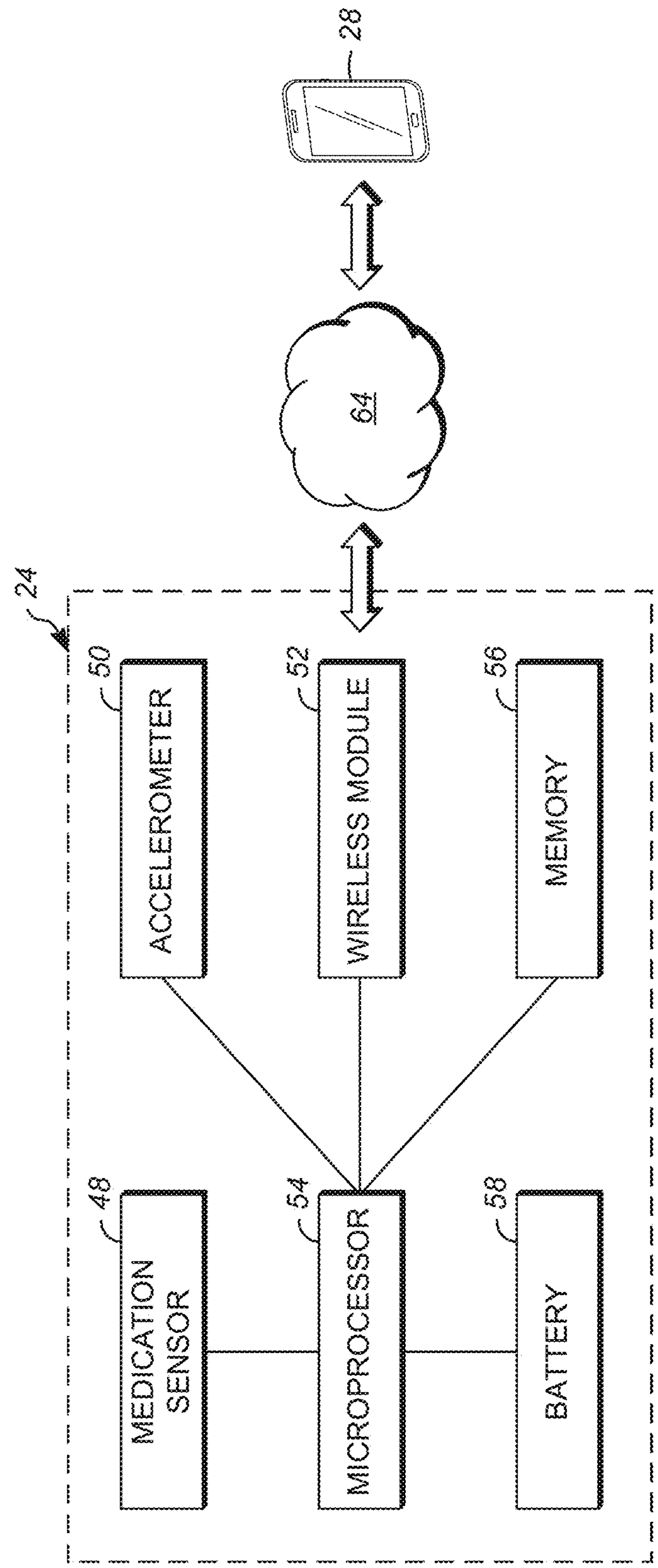
FIG. 7 is a schematic view showing a cap assembly in electrical communication with an external device.

Referring to the Figures, wherein like numerals indicate corresponding parts throughout the several views, a first embodiment of an improved medication container 20 is generally shown in FIG. 1-3. As discussed in further detail below, the medication container 20 is a low-cost and highly effective approach to improving a user's compliance of a medication schedule. The medication container 20 includes a receptacle 22 and a cap assembly 24, which is configured both to monitor the passage of medications 26 in the form of pills 26 out of the receptacle 22 and to wirelessly transmit information pertaining to each dispensing event to at least one external communication/computing device 28 (shown in FIG. 7), such as a computing device, e.g., a smart phone, a computer, electronic storage a server or the like. The transmission of data relating to dispensing can be sent wirelessly. The external device 28 may be controlled either by the patient, by a medical provider, a pharmacy, a pharmacy benefit provider, or combinations thereof. The external device 28 can include a display to display for its user an easy to access log of all dispensing events, including time stamps and quantities of pills 26 dispensed or graphics related to pills 26 dispensed from the receptacle 22. The graphics can be triggered by a flag value stored in memory for the prescribed dosing regimen for the patient and the medication 26. Thus, the medication container 20 improves medication compliance (e.g., adherence) by helping the user avoid either missing medication doses, taking medication at the wrong time, or taking double doses of medication. In an embodiment where a medical provider is provided with access to the log of dispensing events, the medical provider may be able to better diagnose or otherwise treat a patient's illness with the full knowledge of how well that patient is conforming to his or her medication schedule. The use of the word pills 26 herein is intended to cover any suitable types of solid medications, including pills, capsules, tablets, or the like.

Figure 3A:
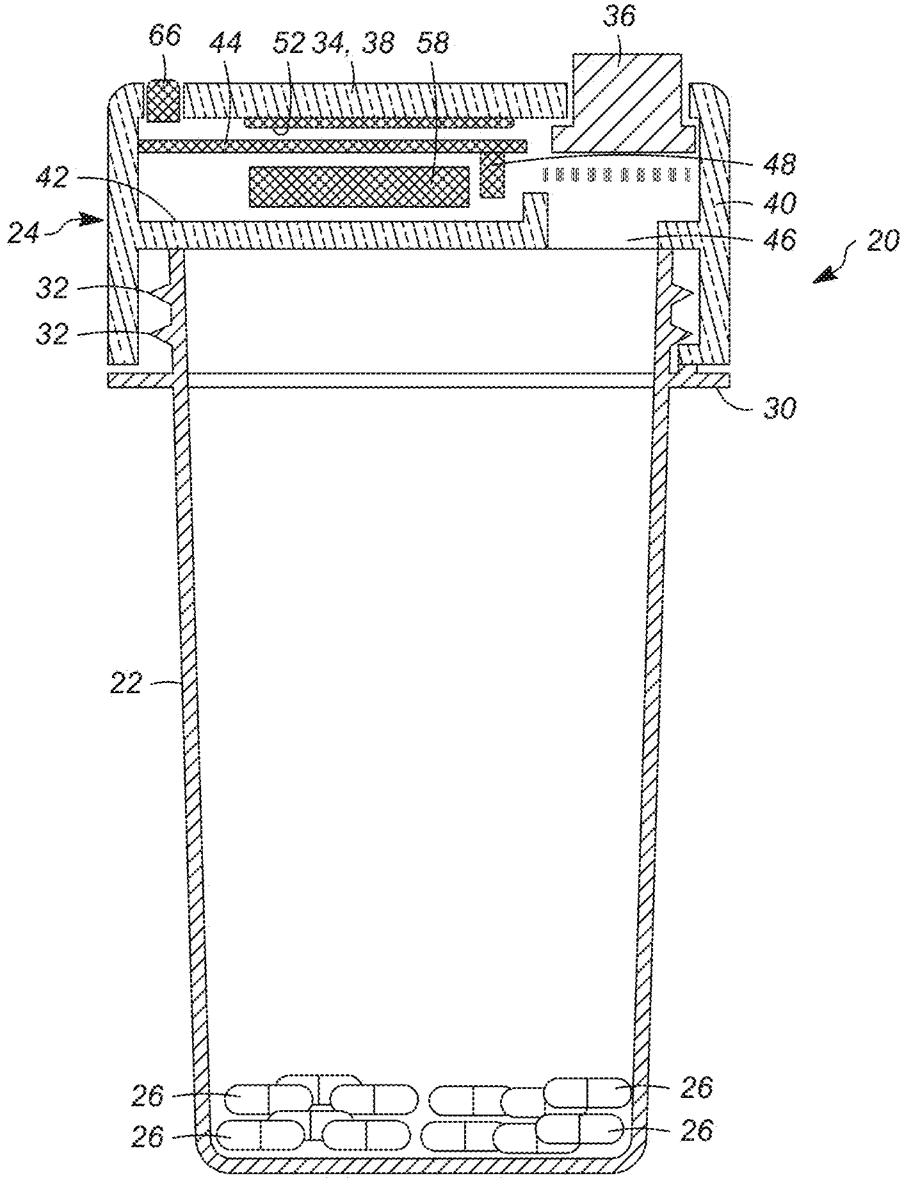
FIG. 3A is a cross-sectional view of the medication container of FIG. 1.

As shown in FIGS. 1 and 3A, the receptacle 22 is cup-shaped and has a single inner space (storage void) which extends from a closed end (sometimes referred to as the bottom) to an open end (sometimes referred to as the top). An outer wall extends upwardly from the closed end and defines the inner volume that defines the inner space. Adjacent the open end of the inner space, an outer surface of the receptacle 22 defines a radially outwardly extending flange 30 (sometimes also known as a bead) and a pair of circumferential ribs 32, which are configured to engage with the cap assembly 24 to retain the cap assembly 24 on the receptacle 22. The ribs 32 can be a continuous thread that extends twice around the circumference of the top of the receptacle wall. In the exemplary embodiment, the receptacle 22 is in the form of a vial, which allows for improved efficiency when initially filling the receptacle 22 with pills 26. However, in alternate embodiments, the receptacle 22 could be a bottle. The receptacle 22 is preferably made of a monolithic piece of a durable plastic material and may be shaped through an injection molding operation, for example. An outer surface of the receptacle 22 may include indicia (such as on a label) that identifies the type of pills 26 contained in the receptacle 22 and dosage instructions. The label may contain instructions on how to use the cap assembly 24 to dispense pills 26 without removing the cap assembly 24 from the receptacle 22. The label can include a machine-readable code for directing a user's electronic device to instructions for using the cap assembly 24 and can link the cap assembly 24 to the user's account.

In a first exemplary embodiment, the cap assembly 24 includes a cap 34; a gate 36; and a plurality of electrical components (discussed in further detail below) for monitoring the passage of the pills 26 (a type of solid, non-liquid item) into and out of the receptacle 22. The cap 34 has a generally planar or slightly curved top (outer) wall 38 and a cylindrically-shaped outer wall 40 that is in a snap-fitting engagement with the ribs 32 of the receptacle 22 to retain the cap assembly 24 on the receptacle 22. The exemplary cap 34 preferably has a diameter of forty-five millimeters (45 mm) and preferably has an environmental seal, which is sealed against the receptacle 22 to retard entry of moisture, light, and air from entering the inner space of the receptacle 22. The cap 34 could have different sizes, such as thirty-eight millimeters (38 mm). In other embodiments, the cap 34 could be threadedly engaged with the receptacle 22 or could be lockingly secured with the receptacle 22 through other suitable means. The cap 34 is preferably made of polymer, e.g., plastic, and can be shaped through an injection molding operation. In other embodiments, the cap may be threaded into engagement with the receptacle or may be snap fit directly onto the flange.

As shown in FIG. 3A, the cap 34 further includes an inner wall 42 that is spaced from and parallel with the top wall 38 to define a chamber within the cap 34. In an exemplary embodiment, the inner wall 42 is monolithic with the planar top wall 38 and the cylindrical outer wall 40 of the cap 34. An electronics substrate 44, such as a printed circuit board (PCB), which contains the aforementioned electrical components, is disposed within the chamber fixedly attached with the cap 34. In one embodiment, the electronics substrate 44 is formed within the inner wall 42. In some embodiments, the inner wall is made as a separate piece from the remainder of the cap and is sealed against the cap to assist in preventing dust and the like from entering the chamber with the electronics substrate. In some embodiments, the electronic components can be snapped into the cap as a pre-assembled unit and then electrically connected with the electronics substrate. In other embodiments, the electronics substrate itself serves as the inner wall and is sealed against the cylindrical outer wall of the cap.

The top wall 38 and the inner wall 42 of the cap 34 have aligned openings to define a single passage 46 for guiding the pills 26 in the receptacle 22 through the cap assembly 24 and out of the medication container 20. In an example embodiment, the passage 46 has an annulus sector shape. In some embodiments, the passage has other shapes, e.g., a circular shape, an elliptical shape, a rectangular shape, etc.

Figure 4:
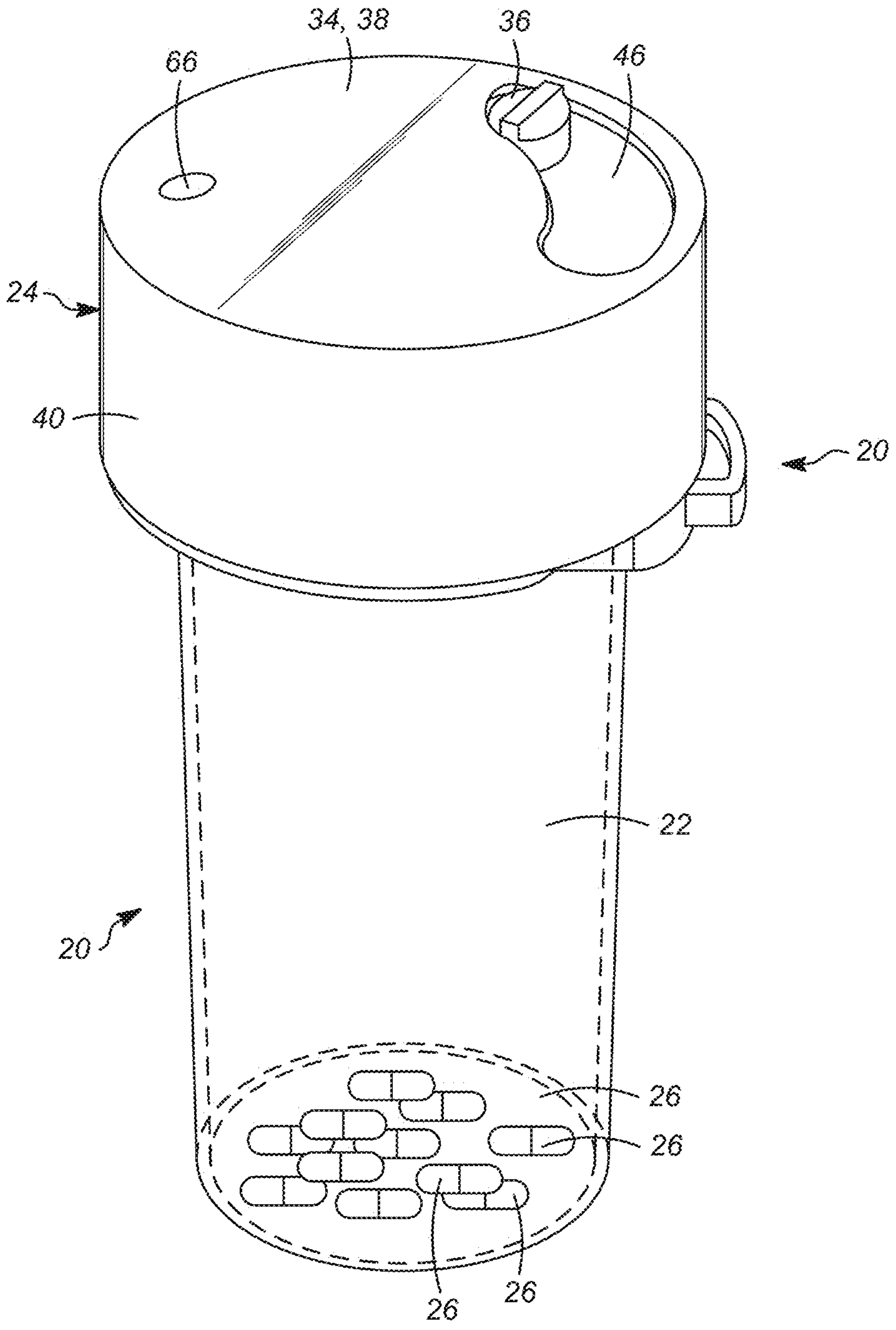
FIG. 4 is a perspective view of the medication container of FIG. 1 and showing a gate of a cap assembly in an open position.

The gate 36 is slidably attached with the cap 34 and is movable from an open position (shown in FIG. 4) to a closed position (shown in FIG. 1) and vice versa. When the gate 36 is in the open position, the pills 26 in the receptacle 22 can freely travel through the passage 46 out of the medication container 20 or pills 26 can be added into the medication container 20. On the other hand, when the gate 36 is in the closed position, the passage 46 is closed and pills 26 cannot get into or out of the receptacle 22. In an example embodiment, the gate 36 has a lip, which projects above the top wall 38 of the cap 34 so that a user can manually engage the gate 36 and slide the gate 36 between the open and closed positions. The manual control of the gate 36 allows a user to still be able to access the pills 26, even in the event of a failure of the electrical components of the cap assembly 24. In some embodiments, the gate may be electronically, rather than manually, opened and closed. For example, an electrical motor or solenoid, powered from an electrical power source, can operate the gate to move it from a closed position to an open position.

In one embodiment, the gate 36 is limited to only open by a certain amount based on a size of the pills 26 contained in the receptacle 22 to limit the rate that pills 26 can be dispensed. In other words, for medication containers 20 containing larger pills 26 and/or for medication containers 20 where a dose includes multiple pills 26, the gate 36 can open more than in medication containers 20 containing smaller pills 26 or containing pills 26 that are to be taken one at a time.

In an example embodiment, the electrical components include a plurality of medication sensors 48 (in some embodiments, only a single medication sensor 48 may be included), an accelerometer 50, a wireless module 52, a processor (such as a microprocessor 54), a memory 56, and a battery 58. These different electrical components could be separate from or packaged along with one another. The medication sensors 48 can be item sensors to sense non-liquid items individually being dispensed from the container. The medication sensors 48 are located adjacent to the passage 46 for detecting pills 26 traveling either into or out of the receptacle 22 in a contactless manner, i.e., the pills 26 do not have to touch the medication sensors 48 for the medication sensors 48 to be triggered and for the cap assembly 24 to register the event as a dispensing event. Thus, the medication sensors 48 do not include any moving parts that require contact from the pills 26 to detect dispensing. In some embodiments, the inner wall 42 may be removable or may be able to open or close in order to allow the battery 58 to be replaced when depleted.

In one embodiment, each medication sensor 48 includes an emitter, e.g., a light source 60, and a detector 62 for detecting reflected light from the light source 60. The light source 60 is a light emitting diode (LED), which is configured to emit light in the infrared wavelength band, in an example embodiment. In an example embodiment, the wavelength of light emitted from the light source 60 is greater than 622 nm. However, other types of light sources that emit light with different wavelengths may alternately be employed. In an example embodiment, the medication sensors can be sonic sensors. The medication sensor can be an array of light emitters 60 and aligned detectors 62. The array can be a one-by-many array, an N-by-N array, an N-by-M array (with N and M being different integers) or the like. The plurality of light sources and one or more detectors can be arranged in other patterns to match the periphery of the aperture through which the items, e.g., medication pills, pass. The plurality of light sources and one or more detectors can be arranged in an oval arrangement, a circular arrangement, or a polygonal arrangement (square or rectangular). For ease of illustration, a single sensor 48 is shown in FIG. 3. The medication sensors can be stacked in the direction of the exit movement of item, to detect the direction of movement of an item. The multiple sensors will produce a time delayed signal relative to each other in the direction of travel of the item.

Figure 5:
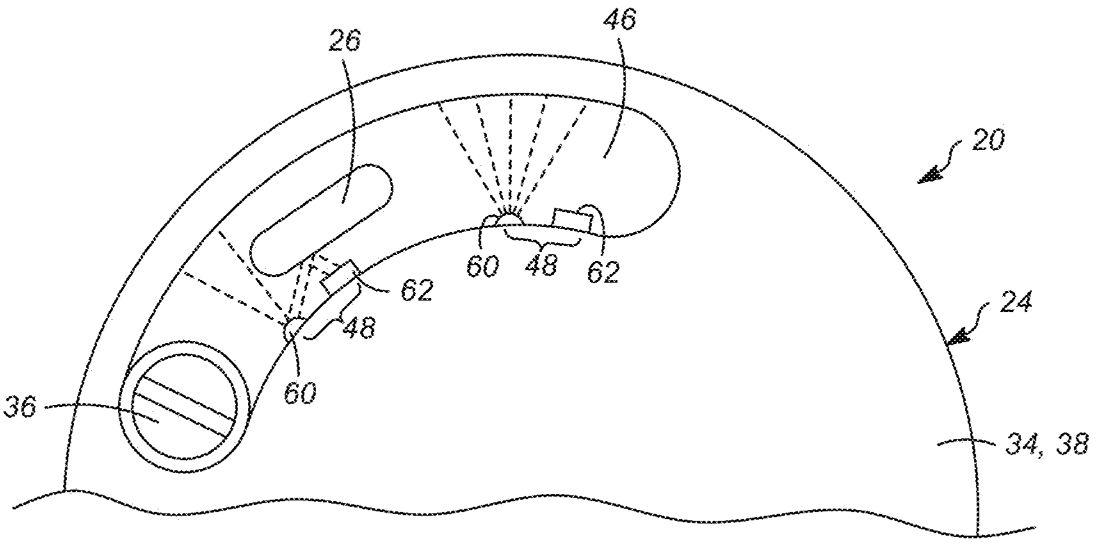
FIG. 5 is an enlarged and fragmentary view of the cap assembly and showing a medication being dispensed out of the medication container of FIG. 1.

As shown in FIG. 5, each light source 60 is directed to project light in a direction towards an opposite wall of the passage 46, e.g., through a lens or collimator, which can be mounted to an inwardly, opening in facing wall of the cap 34. Each light detector 62 can be a photodiode, which responds to a change in light, such as by generating a voltage or another signal, when light is projected on a surface of the photodiode. The light detector 62 can communicate this voltage (or other signal) to the microprocessor 54, which can use this information to determine if a dispensing event occurred. Depending on the type of pills 26 (specifically, their color, reflectivity, and transparency) contained in the receptacle 22, the opposite wall of the passage 46 may be white, black, reflective, or colored such that the light detectors 62 generate a baseline voltage when the passage 46 is empty.

Figure 6A:
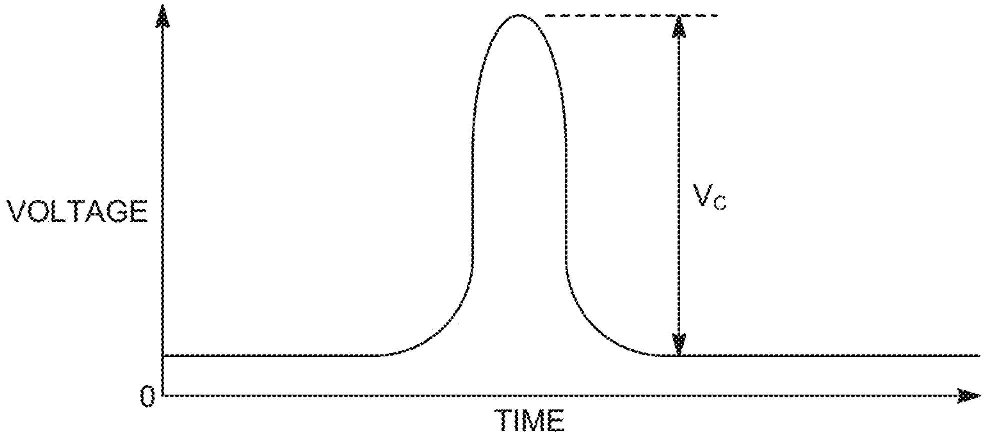
FIG. 6A is a plot showing the voltage produced by a light detector in the cap assembly of FIG. 5 as a medication is dispensed therefrom.
Figure 6B:
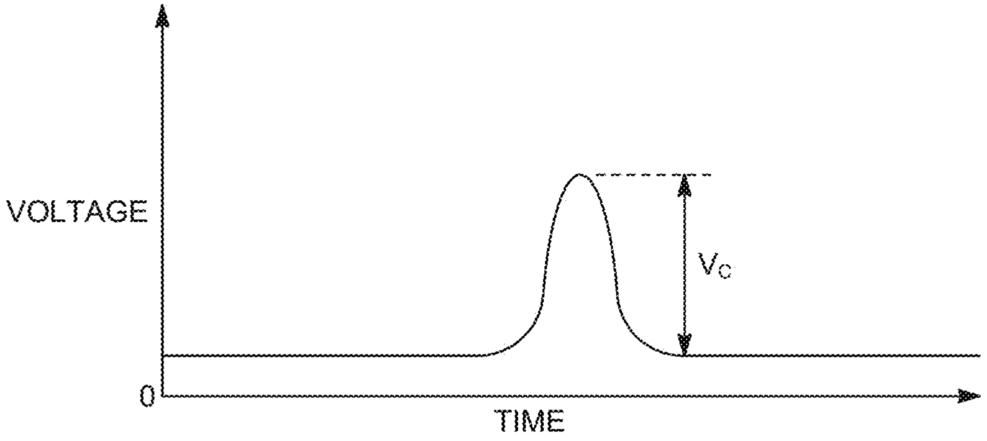
FIG. 6B is a plot showing the voltage produced by a light detector in the cap assembly of FIG. 5 as a different medication is dispensed therefrom than the medication dispensed in FIG. 6A.
Figure 6C:
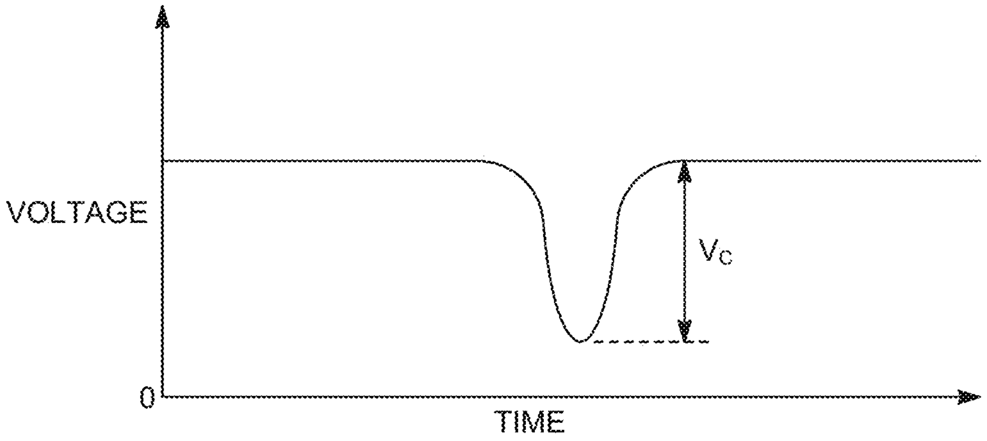
FIG. 6C is a plot showing the voltage produced by a light detector in the cap assembly of FIG. 5 as a different medication is dispensed therefrom than the medications dispensed in FIGS. 6A and 6B.

In operation, when a pill 26 travels through the passage 46 either into or out of the medication container 20, some of the light emitted by one of the light sources 60 reflects off of the pill 26 and back to one of the light detectors 62, thereby changing the voltage produced by that light detector 62. The magnitude of this voltage change $V_C$ will depend, inter alia, on the baseline voltage when the passage 46 is empty and the color and reflectivity of the pill 26. The microprocessor 54 is pre-programmed to recognize the certain voltage changes $V_C$ as being associated with the pills 26 of the medication container 20 and to program into the memory 56 data associated with each event in which that voltage change $V_C$ is detected. For example, FIG. 6A depicts the voltage output by a light detector 62 wherein the opposite wall of the passage 46 (shown in FIG. 5) has a reflective coating and wherein the pill 26 (also shown in FIG. 5) has a white color. The baseline signal of the light sensor is set based on the ambient light that the sensor receives. In an example, the sensor is recessed into wall and does not receive direct ambient light on the sensor. There is some light that is received at the sensor. For example, in this example, there is some white light that is being received at the sensor. In an embodiment, the microprocessor 54 may be configured to recognize a voltage change $V_C$ of 325±25 mV as being associated with this pill 26. In another example, FIG. 6B depicts the voltage value output by the same light detector 62 when a differently colored pill 26 passes through the same passage 46. The microprocessor 54 may be configured to recognize a voltage change $V_C$ of 250±25 mV as being associated with this type of pill 26. In other embodiments, the voltage change $V_C$ may be a negative value, i.e., the voltage at the light detector 62 decreases when the pill 26 passes travels through the passage 46. For example, FIG. 6C depicts the voltage value output by the same light detector 62 when a black colored pill passes through the same passage 46. In this embodiment, the microprocessor 54 may be configured to recognize a voltage change $V_C$ of −175±25 mV as being associated with this type of pill 26. In either scenario where the voltage change $V_C$ is either positive or negative, the microprocessor 54 interprets such an event as a positive confirmation that a pill 26 has passed into or out of the receptacle 22 (depending on an orientation of the medication container 20, as discussed in further detail below) and records the event into the memory 56. The width of the curve of the detection signal may depend on the dimension of the pill being passed by the sensor. An elongate pill may have a wider pulse width that a shorter pill. The sensed signal can be used to indicate a valid or invalid dispensing action, e.g., multiple pills or placing other items into the container through the passage past the sensor.

The data that is saved into the memory 56 following a dispensing event preferably includes a time stamp and a quantity of pills 26 detected and dispensed out of the passage 46. Other data that may be saved into the memory 56 includes a temperature at the time of dispensing (if the cap assembly further includes a temperature sensor) and remaining battery capacity information. The fact that the cap assembly 24 only records a dispensing event when the correct voltage change $V_C$ is detected reduces false positives and improves accuracy of the data saved into the memory 56. The microprocessor 54 may also be configured to record data into the memory 56 when non-dispensing events occur, such as if the gate 36 is opened but no pill 26 is detected in the passage 46. In one embodiment, data is recorded onto the memory 56 each time the gate 36 is opened for more than a predetermined time threshold (such as two seconds).

In another embodiment, the medication sensors 48 are photoreflective diffuse sensors that are configured to sense a break in a path of light from the light source 60 (also known as a sender or emitter) to the light detector 62 (also known as a receiver). Specifically, in an example embodiment, a far wall of the passage 46 opposite of the medication sensors 48 can be coated with a highly reflective coating such that, in a resting condition with the passage 46 being empty, a beam of light emitted from the light source 60 reflects off of the reflective coating and is sensed by a phototransistor of the light detector 62. In another example, the base line reading is the light reflecting off the opposite wall and returning to the light detector 62; the reflector is the uncoated polymer that forms the opposite wall. In this embodiment, the opposite wall can be a smoothed polymer. When a pill 26 travels through the passage 46 either into or out of the receptacle 22, one or more of the medication sensors 48 are triggered by a breakage of the path of this beam of light. In an example embodiment, the medication sensor 48 can work by ambient light in the passage 46, e.g., detecting a change in the light sensed reflected in the passage 46 without its own light source to illuminate the passage 46. Such an event with either of the medication sensors 48 is interpreted by the microprocessor 54 as a positive confirmation that a pill 26 has either passed into or out of the receptacle 22. The number of medication sensors 48 may be dictated by the sizes and shapes of the pills 26 that will be contained in the medication container 20 with more medication sensors 48 being preferred for smaller pills 26 to ensure that any pills 26 travelling through the passage 46 break at least one of the light beams. The light beams emitted by the light sources 60 may be in the infrared range such that the light beams are invisible to the human eye. In another embodiment, the medication sensors 48 are of the type that are capable of sensing the breakage of a beam of light from the light source 60 without the need for the reflective coating on the far wall of the passage 46.

In yet another embodiment, the medication sensors 48 include imagers (for example, cameras), which are configured to capture image of the pills 26 traveling through the passage 46 and communicate those images to the microprocessor 54. The microprocessor 54 can then automatically confirm that the pill 26 is the correct type of pill 26 by scanning the image for a size, shape, and color match and/or for an etching or other indicia on the pill 26. This improves medication compliance by positively confirming that each dispensing event recorded to the memory 56 is for the correct pill 26 and not an error. The image may be stored in the memory 56 of the cap assembly 24 and ultimately uploaded to the external device 28 via the wireless module 52, as discussed in further detail below.

In another example embodiment, the medication sensors 48 include signal emitters 60 (in place of light sources), and the detectors 62 can detect the signals. The signal emitters 60 can emit an ultrasonic signal that is sensed by the detectors 62. In an example, the emitters are radio frequency (RF) emitters and the detectors detect change in the emitted signal. The associated circuitry can detect the presence of a pill 26 in the passage 46 by a phase shift in the signal or a time shift in the signal received versus the signal emitted. The ultrasonic sensors are selected to have a wavelength that is disrupted when a solid item, e.g., a pill, passes the sensor. The ultrasonic sensors can be an array of sonic emitters and aligned sonic detectors to provide complete coverage of the passage that the item will take to exit the container. The sonic emitter and sonic detector can be arranged in a single unit, e.g., a transceiver. The array can be a one by many array, an N by N array, an M by N array (with N and M being different integers) or the like. The plurality of sonic sensors can be arranged in other patterns to match the periphery of the aperture through which the items, e.g., pills, pass. The sonic sensors can be arranged in an oval arrangement, a circular arrangement, or a polygonal arrangement (square or rectangular). The operational frequency range of the sonic sensors is selected to detect the particular item being dispensed. In the case of pharmaceuticals, e.g., pills, capsules and the like, the frequency range is selected (and controlled by processor circuitry) to identify the pharmaceuticals passing the sensors. The positioning of the multiple sensors are positioned equidistant to each other to assist in detecting the shape of the item, e.g., height, width or both. In an example embodiment, the sonic sensors operate at different frequencies relative to at least one other sonic sensor. When using sonic sensors, the items lined up in the passage, e.g., singulated pills, can be sensed as the walls and in some examples, the items themselves, can at least semi-transparent when using sonic sensors. In an example, a sonic sensor detects one or more items in the passage and at least one light sensor detects passage of the item out of the container.

In an example embodiment, the medication sensors 48 can include detection circuitry to detect when a pill 26 passes into the passage 46. The detection circuitry can detect the change in light, sound source, RF signal, or the like to determine passing of one or more pills 26 past the medication sensor 48 in the passage 46.

In yet another example embodiment, each medication sensor includes a camera and a light source, and the opposite wall of the passage has the at least one concave mirror. In operation, the light source projects light against the concave mirror, which reflects and focuses the light onto the camera. The camera takes images of any pills travelling through the passage to detect pills travelling through the passage. The images captured by the camera can be analyzed by the microprocessor to confirm that the medications contained therein are the correct pills.

The accelerometer 50 is in electrical communication with the microprocessor 54 and is configured to sense movement of the cap assembly 24, such as opening or closing of the gate 36 or a tilting of the medication container 20. In the first embodiment, the microprocessor 54 is configured to put the electrical components in the cap assembly 24 in a low power (sleep) mode after a predetermined time wherein the accelerometer 50 senses no or little movement, thus preserving power and extending battery life. For example, the microprocessor 54 could be configured to reduce or cut power to all of the electronic components in the cap assembly 24 except itself and the accelerometer 50 when the accelerometer 50 fails to sense any movement for a half-minute, one minute, two minutes, three minutes or the like. When the cap assembly 24 is in the low power mode, the microprocessor 54 is configured to immediately activate the electrical components in response to the accelerometer 50 detecting movement and providing an "ON" signal to the microprocessor 54.

In an embodiment, the accelerometer 50 also is configured to sense an orientation of the medication container 20 so that the microprocessor 54 can determine whether a trigger event by the medication sensors 48 is the travel of a pill 26 into or out of the receptacle 22. Specifically, if the accelerometer 50 senses that the medication container 20 is upside down or is angled downwardly at the time when one or more of the medication sensors 48 are triggered, then this indicates that a pill 26 has been poured out of the receptacle 22, and the microprocessor 54 records the event in the memory 56 as a pill 26 leaving the receptacle 22. Conversely, if the accelerometer 50 senses that the medication container 20 is in an upright or an upwardly angled orientation at the time when one or more of the medication sensors 52 are triggered, then the microprocessor 58 records the event as a pill 26 being inserted into the receptacle 22.

The wireless module 52 is configured to transmit and receive data with the external device 28 (such as a smart phone, a tablet, a personal computer, a smart watch, a dedicated unit, server, or any suitable type of electronic device) either directly or via the internet 64. The wireless module 52 could be configured to communicate with the external device 28 via one or more of Bluetooth®, WiFi®, near field communications (NFC®), cellular communication, or any suitable wireless protocol or protocols. In an embodiment, the wireless module 52 is configured to communicate with the external device 28 via cellular communication channels, thereby eliminating the need for the user to pair or otherwise set up direct communication between the cap assembly 24 and the external device 28 and allowing the data to be uploaded to the external device 28 even when the external device 28 is not in the proximity of the cap assembly 24. Depending on the region, the wireless module 52 may be configured to communicate using Narrowband IoT and/or LTE-M technology. The external device 28 may also be a smart speaker that can allow a user to check if they have already taken their pill(s) 26 or which can remind the user when to take their pill(s) 26 according to the schedule. The external device 28 may further be a cloud accessible storage device that can store all of the data generated by the cap assembly 24 as a backup in the event that the cap assembly 24 is lost or damaged.

The wireless module 52 and the external device 28 can be configured to encrypt and verify all data communication therebetween, regardless of the form of wireless communication. The memory 56 can store at least the data that is to be transferred to the external device 28 so that this data is not lost if pills 26 are either added to or removed from the medication container 20 when the wireless module 52 is not in active communication with the external device 28. In other words, when the wireless module 52 is not actively in communication with the external device 28, the cap assembly 24 can operate as a stand-alone unit, which stores data internally until that data can be uploaded to the external device 28. The memory 56 may also contain data for an updatable medication count for the medication container 20. The medication count may be initially set by a pharmacy that fills the medication container 20 or may be set by the user. The memory 56 is preferably of the non-volatile type such that the data stored thereon is not lost in the event of a power failure.

The battery 58 is mounted on the electronics substrate 44 and is electrically connected with all of the electronic components to power these components. The battery 58 could be designed to be easily replaced to allow for re-use of the medication container 20 or the medication container 20 could be disposable such that it, along with the battery 58, is to be recycled after the pills 26 contained therein have been taken. In alternate embodiments, the cap assembly could include a plurality of batteries and the battery or batteries could be rechargeable via a recharging port on the cap assembly. The battery 58 or batteries may be provided with only enough charge (plus a safety factor) to last until the pills 26 that are initially placed in the receptacle 22 are to be either discontinued according to prescription instructions or run out. The battery 58 could be configured for wireless charging. The battery 58 can be a rechargeable electricity source, e.g., a capacitor, NiC battery, Li battery or the like. The battery 58 may be recharged using wireless energy recharging.

The cap assembly 24 itself and/or the external device 28 may be configured to monitor the medication count and alert a pharmacy to trigger an automatic refill when the medication count passes a predetermined threshold, e.g., four days of supply.

The cap assembly 24 and/or the external device 28 may also be configured to automatically alert a user when it is time for the user to take a dose of the pills 26. In some embodiments, a medication schedule is programmed into the memory 56, and the microprocessor 54 is configured to alert the user each time the user is to take a dose of the pills 26 according to the medication schedule. The medication schedule can be changed by a user and/or could be remotely changed by either the pharmacy or a doctor via the external device 28. The alert could be, for example, a notification displayed on or broadcast by the external device 28. In the exemplary embodiment, the cap assembly 24 further includes an alert means in the form of a light 66 (such as an LED), which can visually alert the user. For example, the alert could be the light 66 changing colors or flashing at different rhythms. The light 66 may also communicate other messages to the user, such as when the battery 58 needs to be recharged or replaced.

As discussed above, the external device 28 and/or the memory 56 is/are programmed to maintain a continuously updated record of each positive confirmation of pill(s) 26 leaving or entering the receptacle 22 through the passage 46 and communicate that record when prompted by the user or a medical provider (such as a doctor). Thus, in the event that a user is unsure, the user can check the record to determine if the pill 26 was removed. The medical provider may then use the record to determine if the user is properly following a prescribed medication schedule. This improves medication adherence by eliminating doubt for both the user and the medical provider without the user having to take any additional steps, such as writing down the time each pill 26 was taken. The external device 28 may include an app that can also communicate with a remote, cloud-based database via internet protocols, which maintains a copy of the medication count and the records. This advantageously allows the user, the medical provider, and/or a pharmacy to access the data from different devices and also ensures that the data is not lost if the user loses or otherwise damages the cap assembly 24 or the external device 28.

The cap assembly 24 can be assembled separately from the receptacle 22 and is only joined with the receptacle 22 after the pills 26 have been inserted into the receptacle 22, for example, at a pharmacy. The memory 56 may be initially programmed to include data related to the pills 26 either before or after the cap assembly 24 is joined with the receptacle 22.

Figure 8:
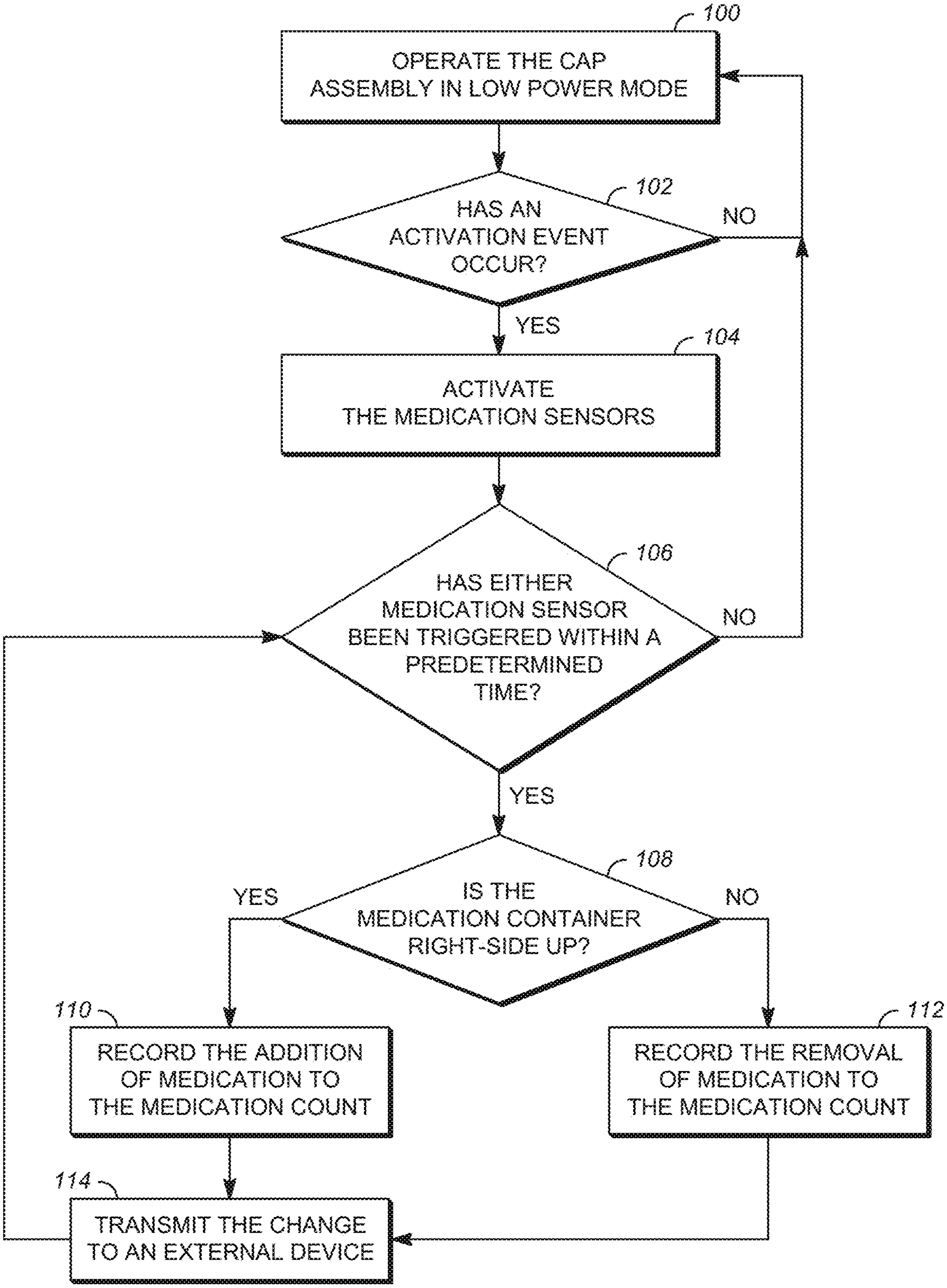
FIG. 8 is a flow chart illustrating the steps of a method according to one aspect of the present disclosure.

Operation of an exemplary embodiment of the medication container 20 is discussed below with reference to the flow chart of FIG. 8. The method starts at step 100 with the cap assembly 24 operating in the low power mode whereby all of the electronic components, except the accelerometer 50 and the microprocessor 54, are deactivated. At decision step 102, the cap assembly 24 determines if an activation event has occurred, such as the accelerometer 50 sensing movement of the medication container 20 or the gate 36. If the answer to step 102 is no, then the method returns to step 100. If the answer to step 102 is yes, then the method proceeds to step 104. At step 104, the microprocessor 54 activates the medication sensors 48, the wireless module 52, and the memory 56. In another embodiment that has an on/off switch, all of the electrical components, including the microprocessor and the accelerometer, could be off when the cap assembly is in the low power mode and only activated when the switch is moved to the "on" position.

At decision step 106, the microprocessor 54 determines if one or more of the medication sensors 48 has been triggered within a predetermined period of time, e.g., one minute. If the answer at step 106 is no, then the method returns to step 100. If the answer to step 106 is yes, then the method proceeds to decision step 108. At decision step 108, the microprocessor 54, based on data from the accelerometer 50, determines if the medication container 20 is right-side up. If the answer at decision step 108 is yes, then the method proceeds to step 110. At step 110, the microprocessor 54 records the addition of pill(s) 26 to the medication count. If the answer at decision step 108 is no, then the method proceeds to step 112, then the microprocessor 54 records the removal of pill(s) 26 to the medication count. After either step 110 or 112, the method proceeds to step 114, and the change in the medication count is communicated via the wireless module 52 to the external device 28 or saved to the memory 56 for later uploading to the external device 28.

Figure 9:
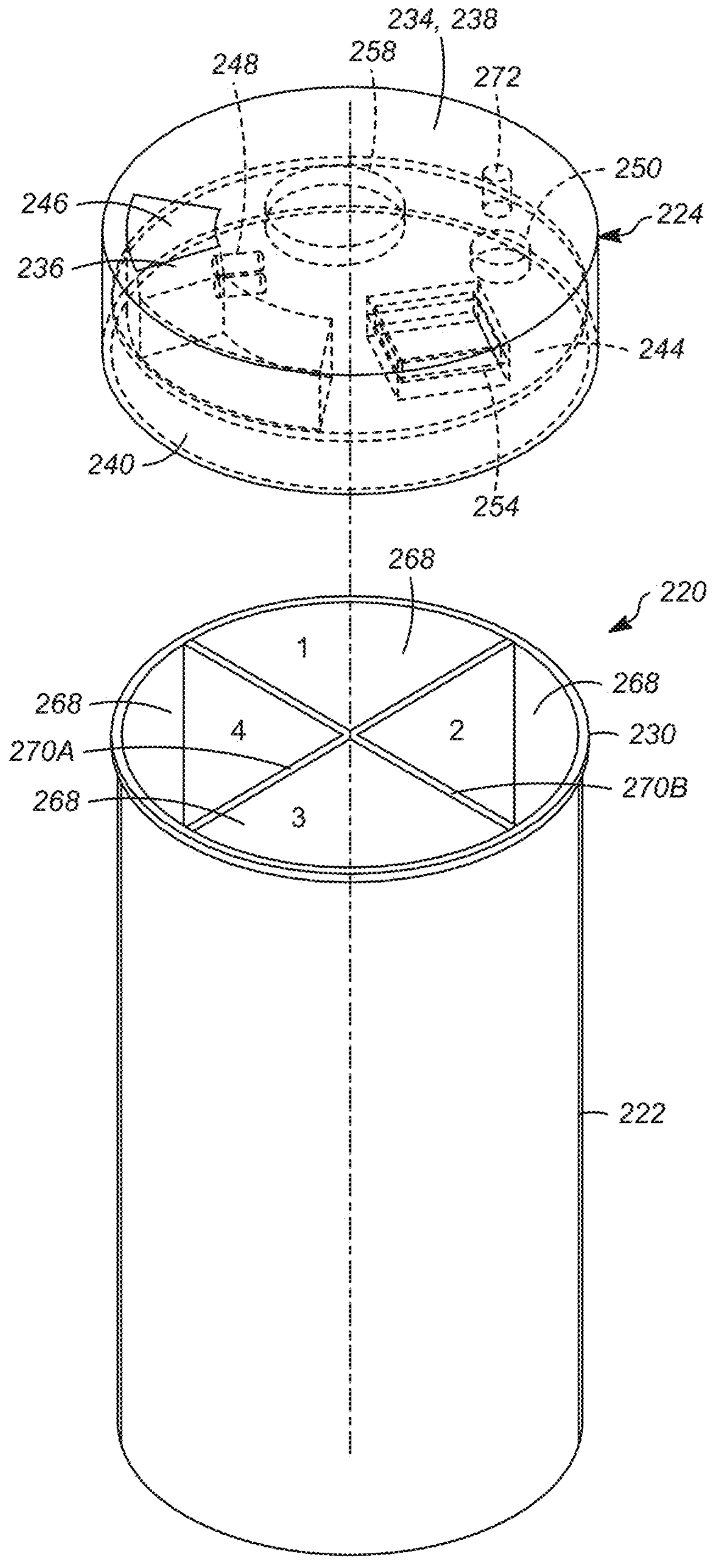
FIG. 9 is a perspective and partially exploded view of a second embodiment of a medication container.
Figure 10:
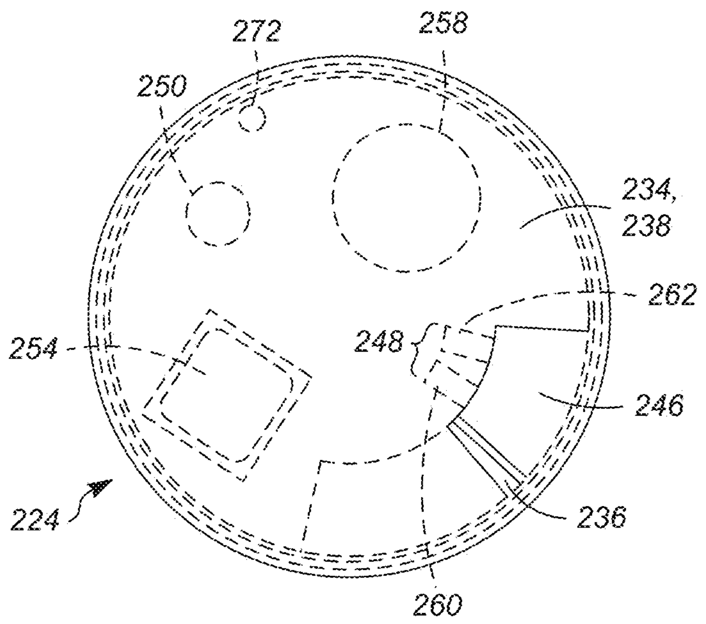
FIG. 10 is a top schematic view of the medication container of FIG. 9.

Referring now to FIG. 9, a second embodiment of the medication container 220 is generally shown with like numerals, separated by a prefix of "2", indicating corresponding parts with the first embodiment described above. The second embodiment is distinguished from the first embodiment by the inside of the receptacle 222 being provided with multiple chambers 268 for simultaneously storing different types of pills within the same receptacle 222. The chambers 268 are defined by at least one wall **270*a*, 270*b*. Specifically, in the exemplary embodiment, the receptacle 222 includes two walls (a first wall 270*a* and a second wall 270*b*) which extend diametrically across the inner space, from opposing positions at an outer wall of the receptacle 222, and perpendicularly to one another to divide the inner space into four equally shaped and sized chambers 268. In an example embodiment, the first wall 270*a* and the second wall 270*b* extend to the top of the receptacle 2221. In an example, the top ends of the outer wall, the first wall 270*a*, and the second wall 270*b* of the receptacle 222 are co-planar. The chambers 268 define sub-spaces between parts of the outer wall, the first wall 270*a* and the second wall 270*b*. The chambers 268** are designed to receive the pills in a loose configuration, i.e., not structurally organized, through the open top, and to store pills therein before dispensing the individual ones of the pills. In some embodiments, the receptacle includes only one inner wall or three or more walls to divide the inner space into any suitable number of chambers, and those walls could be arranged so that the chambers have either similar or differing shapes and sizes.

An outer surface of the receptacle 222 may include indicia associated with the chambers 268 that identify the respective chambers 268 with numbers (for example, "1", "2", etc.) or any suitable identifiers. The indicia could alternately identify what types of pills are contained in the chambers 268.

In the second embodiment, the cap 234 is loosely fit onto the receptacle 222 such that the cap assembly 224 can rotate relative to the receptacle 222 while remaining connected therewith with little force being required. The cap assembly 224 preferably includes a rotation restriction means that only allows the cap assembly 224 to rotate relative to the receptacle 222 in one rotational direction (either clockwise or counter-clockwise) and restricts rotation in the opposite direction. In an example embodiment, the cap assembly 224 can include a first part fixed to at the top, open end of the receptacle 224 and a second part that is rotatable on the first part.

The passage 246 has a cross-sectional area that is sized no greater than a cross-sectional area of the largest of the chambers 268 in the receptacle 222 to ensure that only the pills in the chamber 224 that is aligned with the passage 246 can travel through the passage 246 and out of the medicine container 226, i.e., all of the other chambers 268 remain closed by the cap assembly 224. In an example embodiment, the largest dimension of the passage 246 is equal to or less than the largest, cross-sectional dimension of the chamber 268. The chamber 268 that is, at any given moment or position of the cap 236, aligned with the passage 246 is hereinafter referred to as the "selected chamber". In the first exemplary embodiment, the passage 246 has a similar shape and size as each of the four equally sized chambers 268. In an example embodiment, the passage 246 has a similar shape and size as an outer portion of the chambers 246, e.g., adjacent the outer wall of the receptacle 222.

The cap assembly 224 further includes an electronic position sensor 272, which can monitor a rotational position of the cap assembly 224 relative to the receptacle 222 to determine which of the chambers 268 is the selected chamber aligned with the passage 246. In an example embodiment, the position sensor 272 is a photoreflective sensor that projects light through an opening in the electronics substrate 244 and into the inner space of the receptacle 222. The top edges of the first and second walls **270*a*, 270*b* are provided with a highly reflective coating. The photoreflective position sensor 272 is triggered not by a break in a light beam emitted by the photoreflective position sensor 272 but by the opposite, i.e., the light beam being reflected off of the highly reflective coating on the first and second walls 270***a*, 270*b* and back to the phototransistor when the cap assembly 224 is rotated until the position sensor 272 passes over one of the first and second walls 270*a*, 270*b*. In response to this trigger event, the microprocessor 254 updates in the memory 250 which chamber 268 in the receptacle 222 is the selected chamber.

In alternate embodiments, the position sensor could take a range of different forms other than that of a photoreflective sensor. For example, the position sensor could be a magnetic sensor, and the receptacle could include a plurality of magnets in precise locations, such as on the first and second walls. In such an embodiment, the microprocessor would determine which chamber the passage is aligned with based on the interactions between the position sensor and the magnets at the walls and associated with the chambers. In an example embodiment, the position sensor includes a capacitive sensor that senses the position of the cap relative to the container. In another embodiment, the position sensor is a diffuse sensor that can sense the breakage of a beam of light without the need for a reflective coating.

Figure 11:
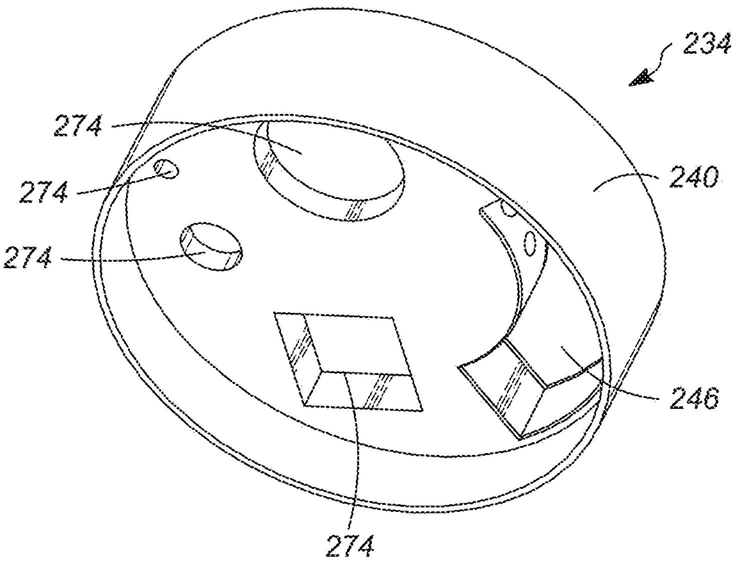
FIG. 11 is a perspective view of a cap of the medication container of FIG. 10.

Referring now to FIG. 11, in the second exemplary embodiment, a lower (inner) surface of the cap 234 includes a plurality of recesses 274 formed into it for accommodating the electrical components of the cap assembly 224. The presence of the recesses 274 improves the durability of the cap assembly 224 by protecting the electrical components.

Figure 12:
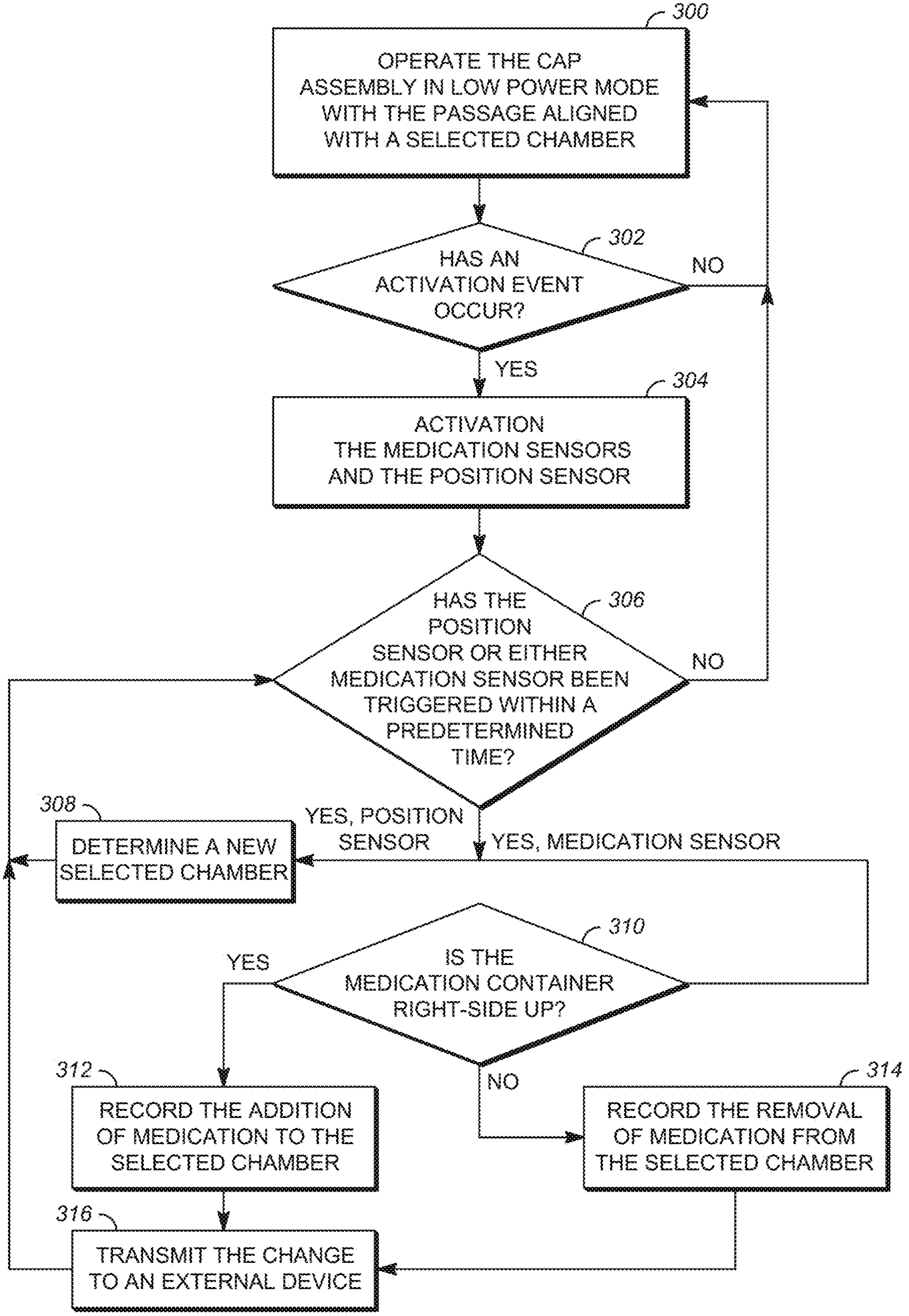
FIG. 12 is a flow chart illustrating the steps of a method according to an aspect of the present disclosure.

Operation of an exemplary embodiment of the medication container 220 is discussed below with reference to the flow chart of FIG. 12. The method starts at step 300 with the cap assembly 224 in a known rotational position relative to the receptacle 222 such that the passage 246 is aligned with a selected chamber that is known by the microprocessor 254. The cap assembly 224 starts in the low power mode whereby all of the electronic components, except the accelerometer 250 and the microprocessor 254, are deactivated to preserve the life of the battery 258. At decision step 302, the microprocessor 254 determines if the accelerometer 250 senses movement. If the answer at decision step 302 is no, then the method proceeds back to step 300. If the answer at step 302 is yes, then the method proceeds to step 304. At step 304, the microprocessor 254 activates the position sensor 272, the medication sensors 248, and the wireless module 252. In another embodiment that has an on/off switch, all of the electrical components, including the microprocessor and the accelerometer, could be off when the cap assembly is in the low power mode and only activated when the switch is moved to the "on" position.

At decision step 306, the microprocessor 254 determines if either the position sensor 272 or one of the medication sensors 248 has been triggered within a predetermined period of time, e.g., one minute. If the answer at decision step 306 is no, then the method proceeds back to step 300. If the answer at decision step 306 is yes for the position sensor 272, then the method continues with step 308 wherein the microprocessor 254 determines a new selected chamber. Because the cap assembly 224 is only configured to rotate relative to the receptacle 222 in one rotational direction, the microprocessor 254 determines the new selected chamber by indexing the selected chamber stored in the memory 256 to the next sequential one of the chambers 268. In an embodiment where the cap assembly is able to rotate in both rotational directions, then the position sensor and receptacle are provided with a chamber identification means which is configured to identify which new chamber the passage becomes aligned with and that chamber is stored in the microprocessor as the new selected chamber. Once the new selected chamber has been determined, then the method proceeds back to decision step 306.

If the answer at decision step 306 is yes for one or both of the medication sensors 245, then the method continues to decision step 310. At decision step 310, the microprocessor 254 (with input from the accelerometer 250) determines if the medication container 220 is right-side up (or angled upwardly). If the answer at decision step 310 is yes, then at step 312, the microprocessor 254 records the addition of pill(s) to the selected chamber into the memory 256. If the answer at decision step 310 is no (i.e., the medication container 220 is upside down), then at step 314, the microprocessor 254 records the removal of pill(s) from the selected chamber to the memory 256.

Following either of step 312 or 314, at step 316, the wireless module 252 transmits to the external device 228 data related to the change (either addition or subtraction) in medication count. If the wireless module 252 is not in communication with the external device 228 at the time of the change, then the change can be stored in a memory 256 and transmitted to the external device 228 upon the next establishment of communication between the wireless module 252 and the external device 228.

The second embodiment improves medication compliance by allowing the user to both store a quantity of different types of pills in the single, easily transportable medication container 220 and to monitor the passage of all of those types of pills out of the medication container 220. This embodiment can also allow the individual detection of medications in the respective passage 246.

Figure 13:
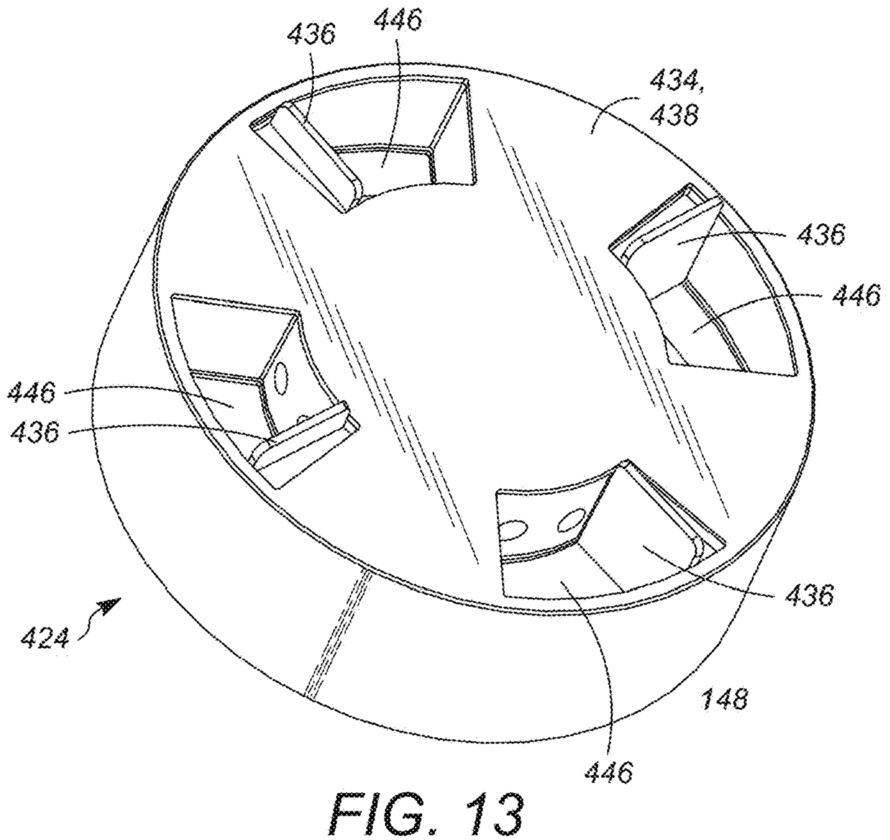
FIG. 13 is a perspective view showing a cap assembly constructed to another exemplary embodiment.
Figure 14:
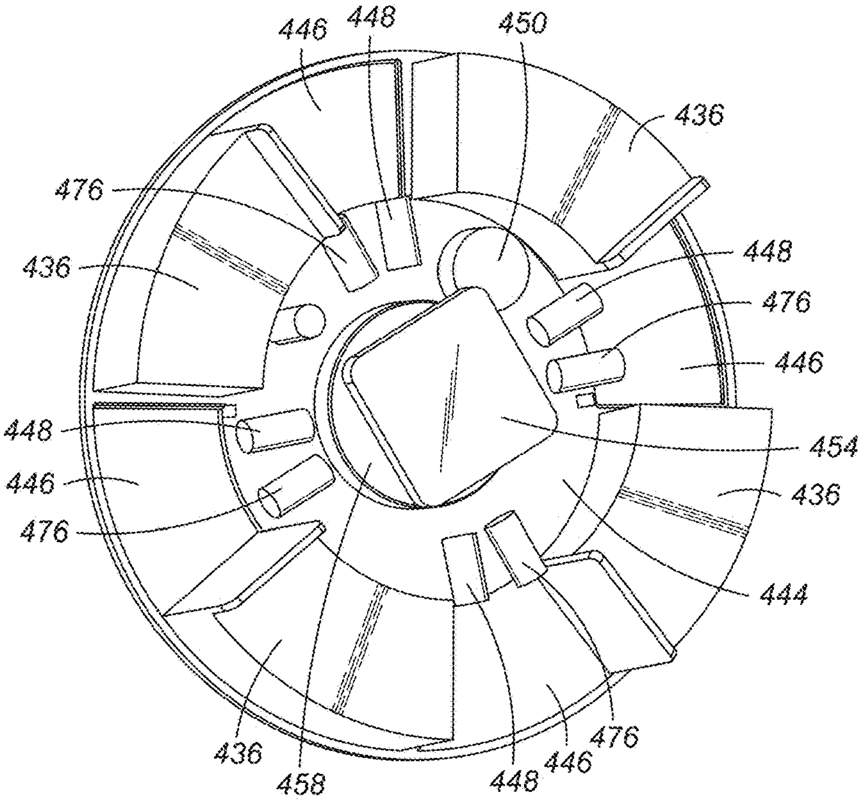
FIG. 14 is a perspective view showing the cap assembly of FIG. 13 with an inner wall of the cap assembly being removed.

Referring now to FIGS. 13 and 14, another exemplary embodiment of the cap assembly 424 is generally shown with like numerals, separated by a prefix of "4" identifying corresponding components with the exemplary embodiments described above. This embodiment is distinguished from the second exemplary embodiment by the cap assembly 426 being fixedly attached (non-rotatable) with the receptacle (such as the receptacle 222 shown in FIG. 9) and by the cap 434 including separate passages 446 and separate gates 436 for each of the chambers. Thus, to access a desired pill, a user opens the gate 436 associated with the chamber which contains the desired pill. The cap assembly 424 includes a pair of medication sensors 448 for each of the passages 446. Thus, the cap assembly 424 has a total of eight medication sensors 448 to go with the four passages 446. Because the cap assembly 424 does not rotate relative to the receptacle the position sensor found in the second embodiment is absent. The cap assembly 424 further includes a plurality of gate sensors 476 (two being visible in FIG. 14) that are located adjacent the passages 446. As discussed in further detail below, the gate sensors 476 are configured to detect whether the respective gates 436 are in the open or closed positions. In this embodiment, a positive confirmation that medication has travelled through the passage 446 is only logged by the microprocessor 450 if both one of the gate sensors 476 detects that the gate 436 is in an open position and a respective one of the medication sensors 448 is triggered. The gate sensors 476 can either be proximity sensors or switches and may be triggered through any suitable means, e.g., magnetic, mechanical, light, etc. For example, in some embodiments, the gate sensors 476 are photovoltaic sensors that are configured to detect light reflecting off of a reflective coating (not shown) on the gate 436 when the associated gate 436 is open.

In some embodiments, the microprocessor 454 can be configured to only activate the medication sensors 448 in response to the gate sensor 476 associated with the respective passage 446 detecting that the adjacent gate 436 is in the open position. In other words, only the medication sensors 448 of the passage 446 with the open gate 436 are activated and the remaining medication sensors 448 remain in the low power mode.

Figure 15:
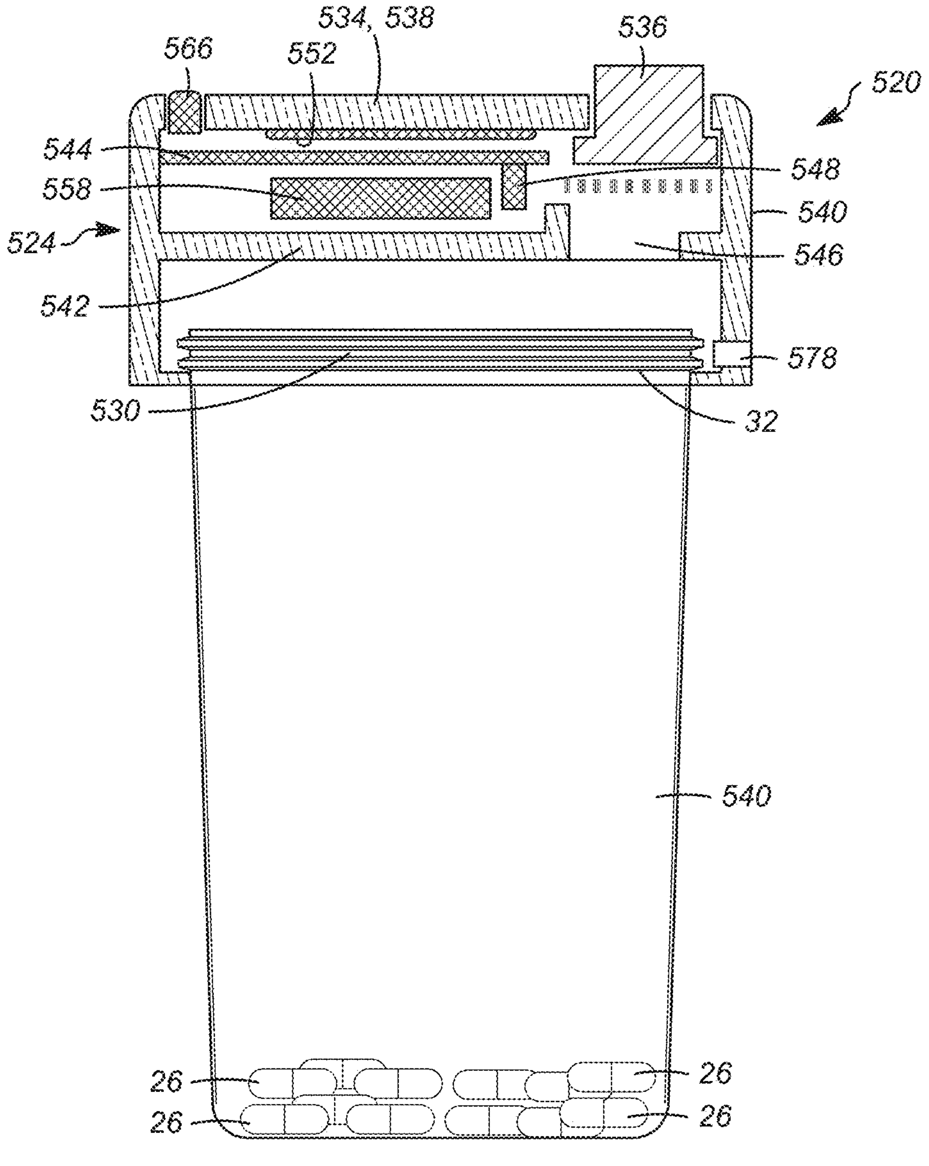
FIG. 15 is a cross-sectional view of yet another exemplary embodiment of the medication container.

Referring now to FIG. 15, yet another exemplary embodiment of the medication container 520 is generally shown with like numerals, separated by a prefix of "5", identifying corresponding components with the embodiments described above. The cap assembly 524 includes an attachment sensor 578 that is configured to detect if the cap assembly 524 is attached with or detached from the receptacle 522. The attachment sensor 578 is preferably a proximity sensor, which cooperates with the flange 530 of the receptacle 522 to positively confirm the attachment of the cap assembly 524. In some embodiments, the attachment sensor 578 is a photovoltaic sensor that is configured to detect light reflecting off of a reflective coating (not shown) which is located on an outermost surface of the flange 530.

Figure 16:
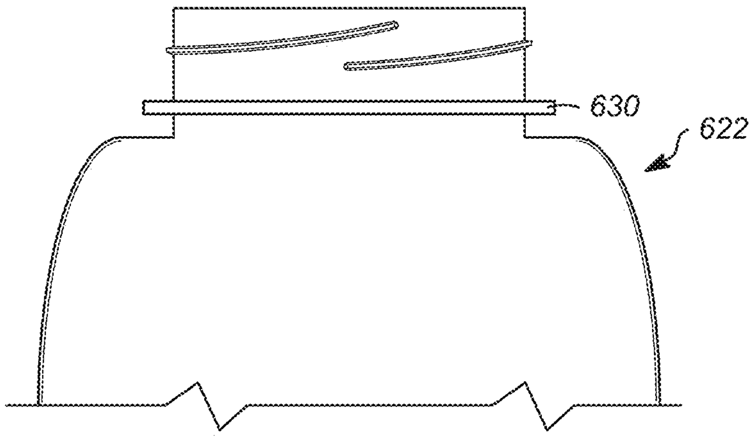
FIG. 16 is a front view of a receptacle which can be used with a cap assembly.

The attachment sensor 578 shown in FIG. 15 and discussed above may also be used in an alternate embodiment of a cap assembly (not shown) that has inner threads so that it can be threaded onto (as opposed to snap-fit onto) a bottle, such as the bottle 622 shown in FIG. 16. In this case, the attachment sensor 578 cooperates with the flange 530 located below the threads on the bottle 622 to positively confirm the attachment of the cap assembly with the bottle 622.

The attachment sensor 578 is in electrical communication with the microprocessor (not shown). In the event that the attachment sensor 578 detects that the cap assembly 524 has been detached from the receptacle 522, the microprocessor logs this event in the memory and/or uploads the event to the external device to inform the user that the cap assembly 524 is not properly attached. This data can also be used to inform the user that the medication count in any chambers of the receptacle may no longer be accurate due to the removal event.

Figure 17:
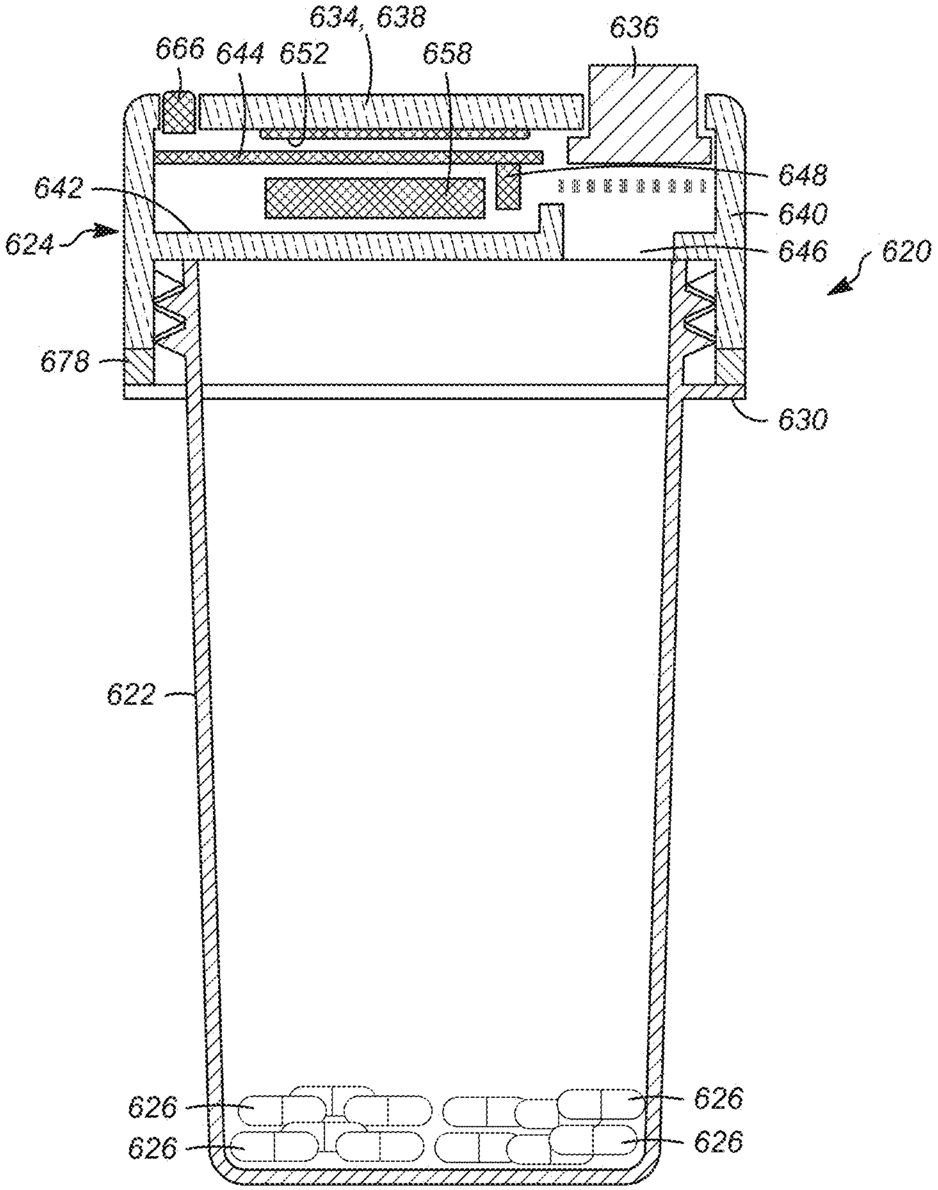
FIG. 17 is a cross-sectional view of a medication container constructed according to another aspect of the present disclosure.

Referring now to FIG. 17, still another exemplary embodiment of the medication container 620 is generally shown with like numerals, separated by a prefix of "6", identifying corresponding components with the embodiments described above. In this embodiment, the attachment sensor 678 is a pressure sensor that is located at a bottom rim of the cap assembly 624. The attachment sensor 678 is thus configured to be either be activated or deactivated in response to a pressure being applied to it. When the cap assembly 624 is joined with the receptacle 622, such as by threading the cap assembly 624 onto the threads of the bottle 622, the attachment sensor 678 is pressed against the flange 630 to trigger the attachment sensor 678 and positively confirm that the cap assembly 624 is properly attached with the receptacle 622. In the event that the cap assembly 624 is removed from the receptacle 622, the pressure applied to the attachment sensor 678 is relieved, thereby triggering the removal event.

Systems and methods described herein can determine whether and/or when a patient is taking the prescribed pills 26. The cap assembly 24 or the external device 28 can provide, when appropriate, reminders and/or alerts to the patient or patient representative to improve adherence to a medication regimen.

In some embodiments, the medication container includes an interface that can alert the user to environmental conditions that may compromise the integrity of the pills, e.g., temperature sensors determining that ambient temperature has exceeded a certain temperature, that a thermal budget has been used, or that the interior a chamber has exceeded a moisture level. The circuitry in the cap through its communications circuitry can electronically communicate with prescribing doctor's devices, pharmacy devices, insurance companies, pharmacy benefits management devices, and other parties that may be interested in prescription practices and adherence.

Referring back to the embodiment of FIGS. 1-8 (but applicable to all embodiments), the external device 28 may further include an app or computer program that is configured to communicate with the cap assembly 24 to allow the user to interact with the medication container 20. The app may be able to do any combination of the following functions: history tracking of medication events; provide reminders, such as through text messaging, E-mail, or through a phone call; provide caregiver support; select, download, and delete data; allow the user to provide feedback after each medication take; allow the user to request a refill; control a rewards program which gives the user rewards for following a medication schedule; and warn the patient when a medication schedule attempts to pair incompatible medications. Further, the app may work either when the external device 28 is or is not in communication with the medication container 20 and may allow the user to manually enter other medication taking events, such as if the medication container 20 is not working or such as for other medications than those contained in the medication container 20. The app may further integrate with an existing electronic health records (HER) platform to automatically populate those records with a medication history. This may reduce the number of steps needed by both the patient and the providers to set up a medication adherence program and limit mistakes from patients who self-enter their medication. In one embodiment, the external device 28 may be configured to pair with the medication container 20 by scanning a code (such as a quick response [QR] code) on the cap assembly 24.

Figure 18:
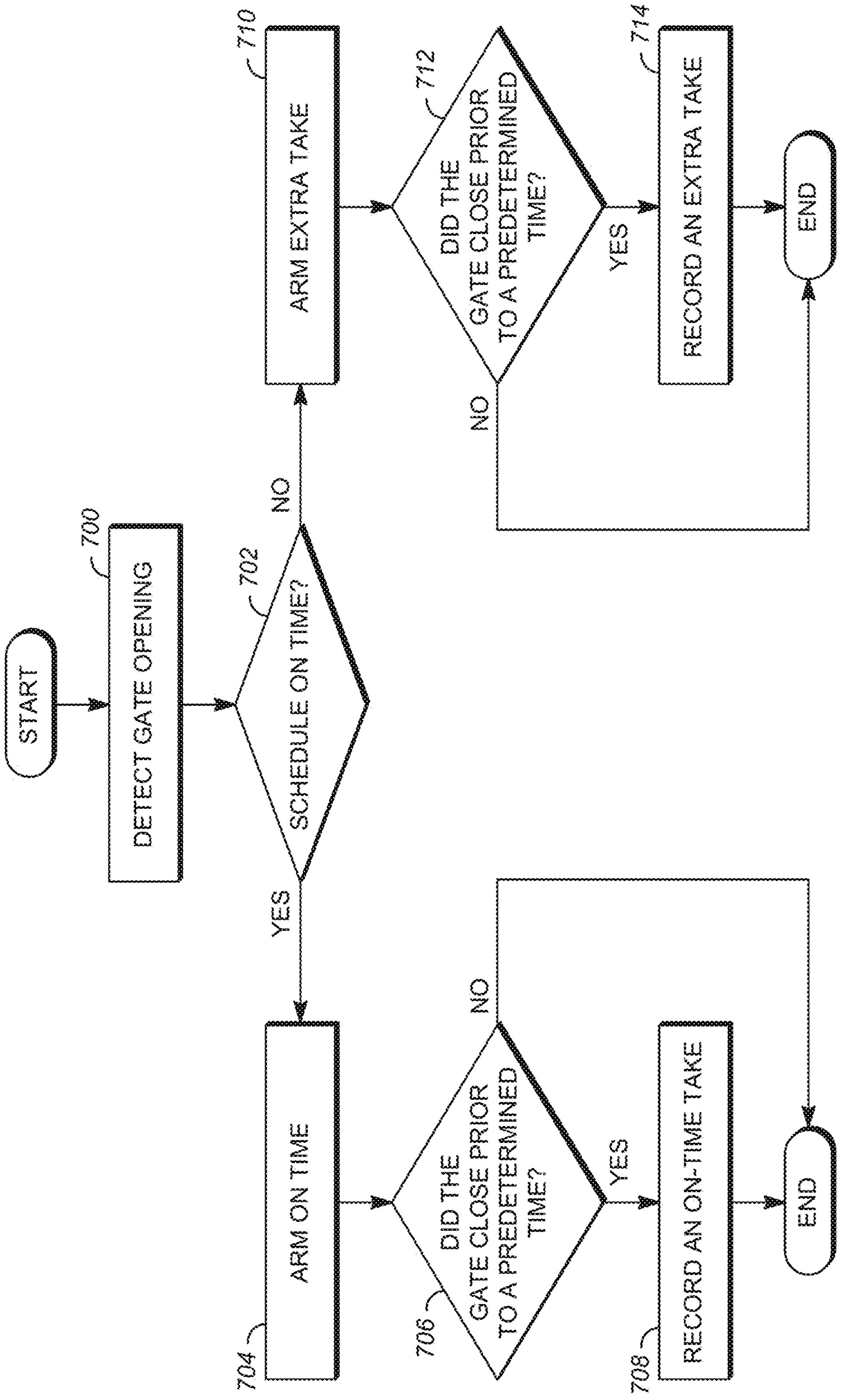
FIG. 18 is a flow chart illustrating the steps of a method according to an aspect of the present disclosure.

FIG. 18 is another flow chart depicting the steps of a method of operating a medication container, such as the medication container 20 shown in FIGS. 1-8, is generally shown. At step 700, the cap assembly 24 detects a gate 36 opening (in other embodiments, it may be the accelerometer 50 detecting movement or some other activation trigger event). At decision step 702, the cap assembly 24 determines if the gate 36 opening event occurred within a predetermined range (for example, thirty minutes) of a scheduled medication dosage event.

If the answer at decision step 702 is yes, then the method proceeds to step 704, and the cap assembly 24 arms itself for an on-time dosage event. At decision step 706, the cap assembly 24 determines if the gate 36 closed prior to a very short, predetermined time period, such as one second or two seconds. If the answer at decision step 706 is yes, then at step 708, the cap assembly 24 records an on-time take to the memory 56, and then the cap assembly 24 goes into standby mode and awaits another gate 36 opening event. If the answer at decision step 706 is no, then the cap assembly 24 goes into standby mode and awaits another gate 36 opening event.

If the answer at decision step 702 is no, then the method proceeds to step 710, and the cap assembly 24 arms itself for an extra take dosage event. At step 712, the cap assembly 24 determines if the gate 36 closed prior to a very short predetermined time period, such as one second or two seconds. If the answer at step 712 is yes, then at step 714, the cap assembly 24 records an extra take event to the memory 56, and then the cap assembly 24 goes into standby mode and awaits another gate 36 opening event. If the answer at decision step 712 is no, then the cap assembly 24 goes into standby mode and awaits another gate 36 opening event. If the gate 36 opened outside the predetermined window set forth in step 702, but no dosage event occurred within that window, then the following dosage event may be marked as being scheduled rather than an extra take.

The schedule programmed into the memory 56 of the cap assembly 24 may be a single day schedule, a weekly schedule, or a monthly schedule. The cap assembly 24 may also be configured to operate without any schedule programmed therein. In this condition, any dosage event recorded to the memory 56 as being on time except if that dosage event occurs within a predetermined time (for example, one or two hours) of another dosage event. In that case, the second dosage event is recorded to the memory 56 as being an extra take.

Referring now to FIGS. 19-22, another exemplary embodiment of the medication container 1920 is shown with like numerals, separated by a prefix of "19," identifying like parts with the embodiments described above. In this embodiment, the cap assembly 1924 is configured to singulate and dispense pills 1926 out of the receptacle 1922. The cap assembly 1924 includes four basic pieces: a crown 1980 (or an outer cap), an inner cap 1981, a disk 1982, and a circuit board cover 1983. In the exemplary embodiment, the crown 1980, inner cap 1981, disk 1982, and circuit board cover 1983 are all separately formed of a rigid polymeric material and through an injection molding operation. In other embodiments, these components may be made of different materials and may be made through any suitable manufacturing processes.

The crown 1980 and the inner cap 1981 are each generally cup-shaped with a generally planar base and a cylindrical sidewall. The crown 1980 has an inner diameter $D_1$ (shown in FIG. 22A) that is slightly greater than an outer diameter $D_2$ (shown in FIG. 22C) of the inner cap 1981, and the inner cap 1981 has an axial height $H_2$ (shown in FIG. 22D) that is less than an axial height $H_1$ (shown in FIG. 22B) of the crown 1980 such that the inner cap 1981 fits entirely within an inner space of the crown 1980. Thus, when the cap assembly 1924 is engaged with the receptacle 1922, the inner cap 1981 cannot be directly accessed from outside of the cap assembly 1924.

The disk 1982 has an outer diameter $D_3$ that is less than an inner diameter of an open end of the receptacle 1922. This allows the disk 1982 to extend at least partially into the receptacle 1922 when the cap assembly is engaged with the receptacle in the manner described in further detail below. The disk 1982 either does not touch the receptacle 1922 or any contact between the disk 1982 and the receptacle 1922 is a loose, slip-fit contact, thereby allowing the disk 1982 and receptacle 1922 to rotate relative to one another as also described in further detail below. The disk 1922 includes a probe 1984 that extends outwardly from the main body of the disk 1920 along a central axis A through a similarly shaped hole in the inner cap 1981 and that is fixedly attached with the crown 1980. The probe 1984 also presents a shoulder that rests against the inner cap 1981. In an embodiment, the probe 1984 is heat staked with the crown 1980 to establish the fixed attachment between these components. In an embodiment, the probe 1984 is adhered (e.g., with glue, epoxy or the like) to the crown 1980 to establish the fixed attachment between these components. The inner cap 1981 is in a slip-fit relationship with both the crown 1980 and the disk 1982 so that the crown 1982 and disk 1982, which are fixed together, can rotate relative to the inner cap 1981 and vice versa during a pill dispensing or insertion operation discussed in further detail below. The probe 1984 can include electrical components therein, e.g., a power line and a light source at the free end or an input sensor to provide a user the ability to input or interact with the circuitry in the cap assembly 1924.

In the exemplary embodiment, the sidewall of the inner cap 1981 has female threads that can engage with outer threads on the receptacle 1922 to fixedly attach the inner cap 1981 with the receptacle 1922. When the inner cap 1981 is threadedly engaged with the receptacle 1922 at its neck (which is smaller in diameter than the body of the receptacle 1922 forming the content holding volume), the crown 1980 and the disk 1982 can then rotate relative to the receptacle 1922 about the central axis A. The crown 1980 and inner cap 1981 are provided with cooperating rotation limiting features that only allow the crown 1980 and disk 1982 to rotate in one rotational direction (either clockwise or counterclockwise) relative to the inner cap 1981 and receptacle 1922. In an embodiment, the cooperating rotation limiting features allow the inner cap 1981 to be threaded onto the receptacle 1922 without inhibiting the rotation of the crown 1980 and disk 1982 relative to the inner cap 1981 and the receptacle 1922 during the dispensing operation discussed in further detail below. In this embodiment, the rotation limiting feature of the crown 1980 includes a plurality of teeth that are angled in one direction, and the rotation limiting feature of the inner cap 1981 includes a plurality of teeth that are angled in an opposite direction. When threading the crown 1980 onto the receptacle 1922, the teeth engage with one another to allow the inner cap 1981 to rotate with the crown 1980 and thread onto the receptacle 1922. When rotating the crown 1980 relative to the receptacle 1922, the teeth do not engage with one another, thereby allowing the crown 1980 to rotate freely relative to the inner cap 1981 and the receptacle 1922.

The disk 1982 has a single first pill opening 1985 that is spaced radially from the central axis A and is sized and shaped to accommodate only a single pill 1926. The shape and size of the first pill opening 1985 thus depends on the shape and size of the pills 1926 contained in the receptacle 1922. In some embodiments, the first pill opening 1985 thus has a shape that generally matches the pill 1926, e.g., an oval first pill opening for an oval pill or a circular first pill opening for a circular pill. In some embodiments, the first pill opening may have a circular shape to accommodate differently shaped pills.

Figure 20:
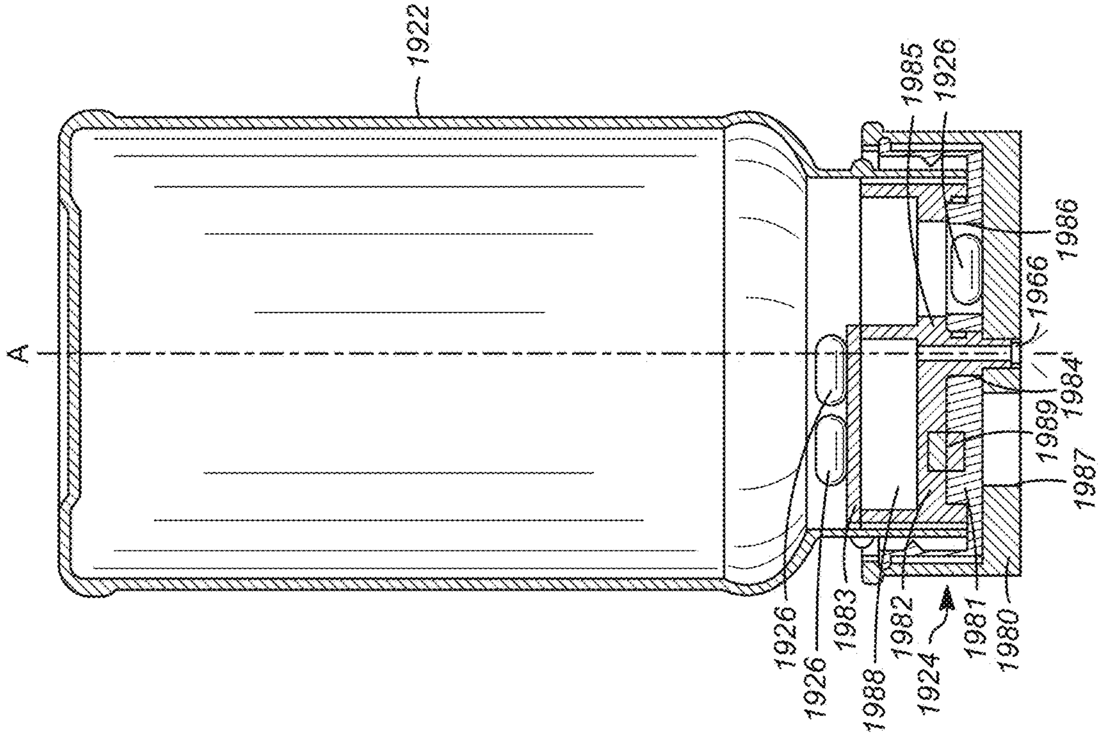
FIG. 20 is a cross-sectional view of the medication container of FIG. 19 and showing the cap assembly in one configuration.
Figure 19:
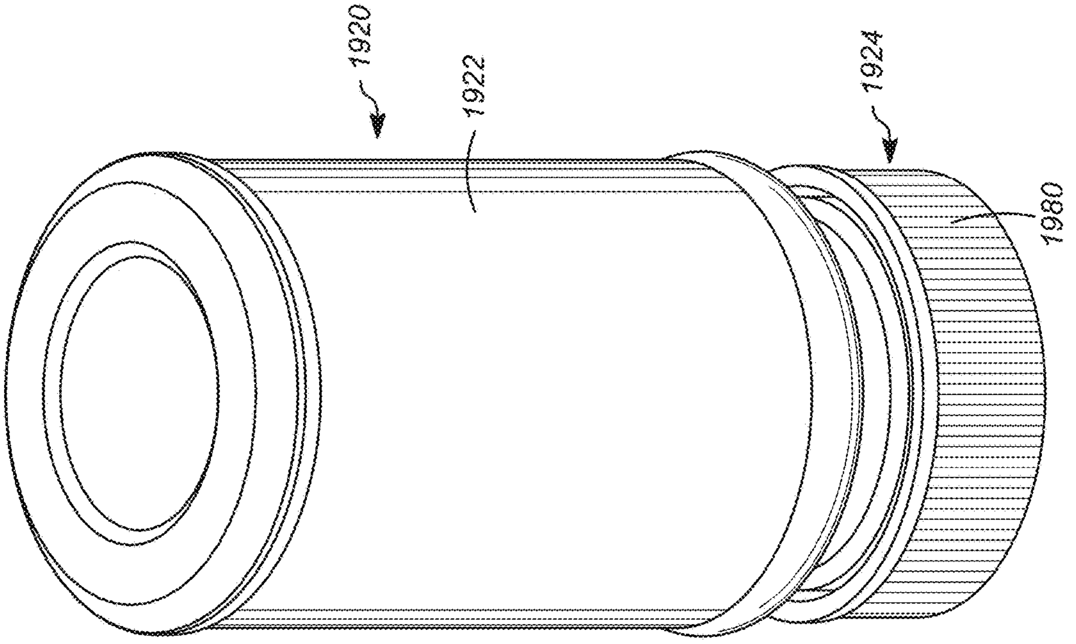
FIG. 19 is a perspective elevation view of a medication container including a cap assembly constructed to another exemplary embodiment.
Figure 21:
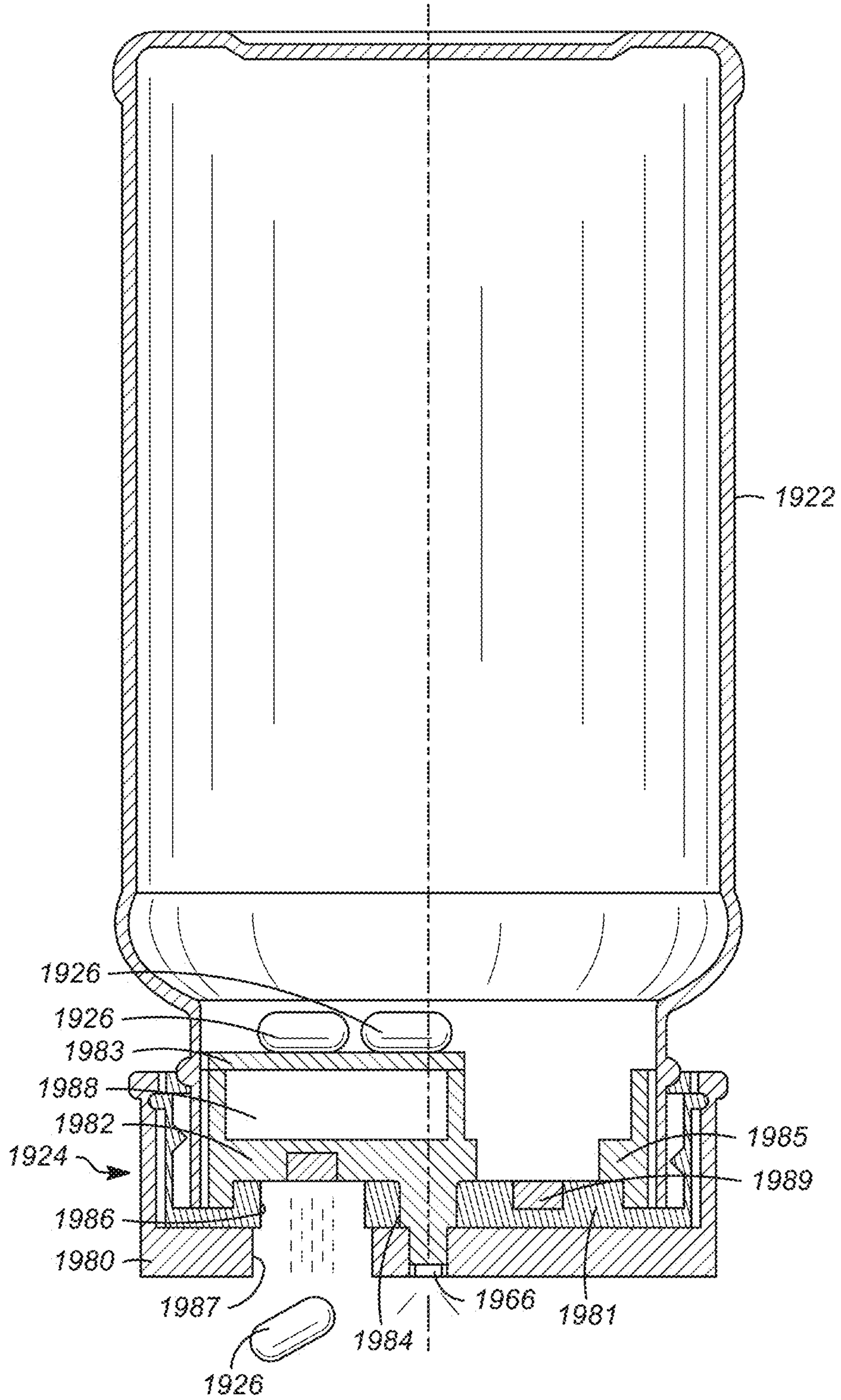
FIG. 21 is another cross-sectional view of the medication container of FIG. 19 and showing the cap assembly in a different configuration than the configuration shown in FIG. 20.
Figure 22A:
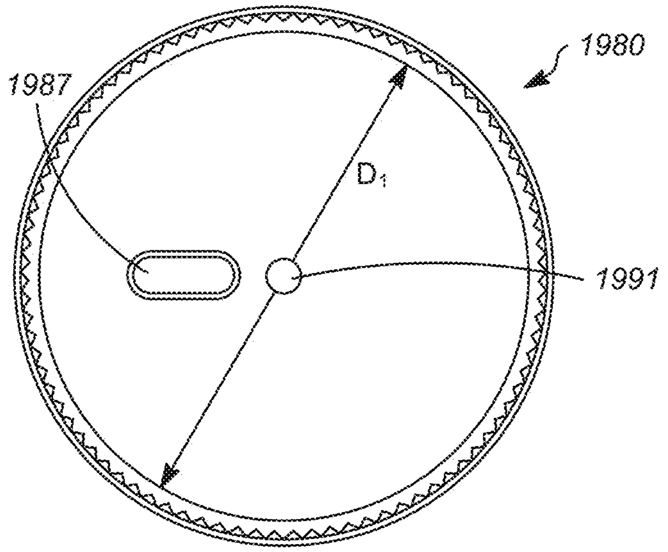
FIG. 22A is a top elevation view of a crown of the cap assembly of FIG. 19.
Figure 22B:
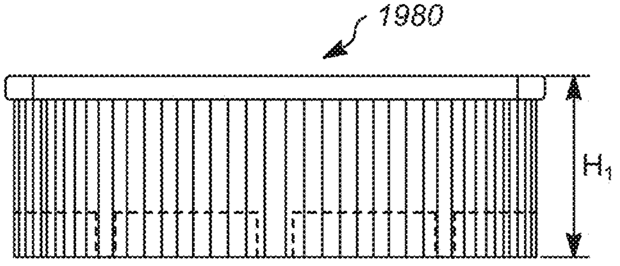
FIG. 22B is a side elevation view of the crown of FIG. 22A.
Figure 22C:
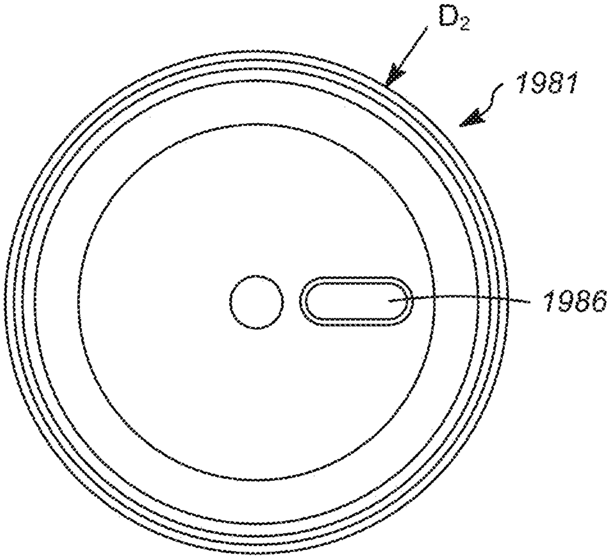
FIG. 22C is a top elevation view of an inner cap of the cap assembly of FIG. 19.
Figure 22D:
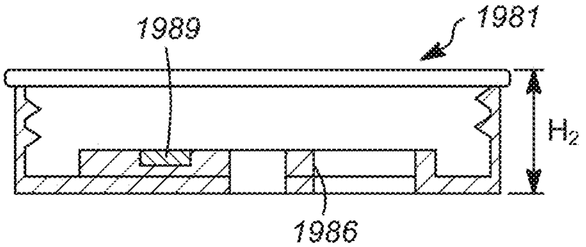
FIG. 22D is a cross-sectional view of the inner cap of FIG. 22C.
Figure 22E:
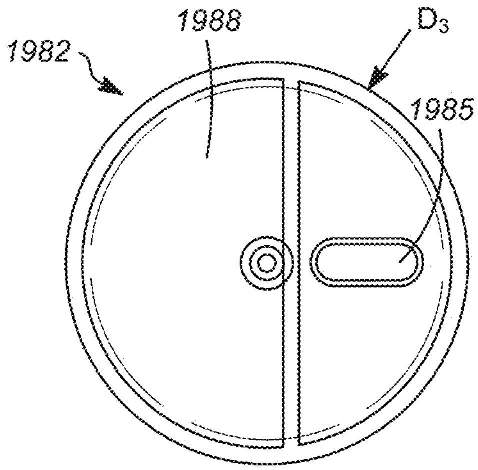
FIG. 22E is a top elevation view of a disk of the cap assembly of FIG. 19.
Figure 22F:
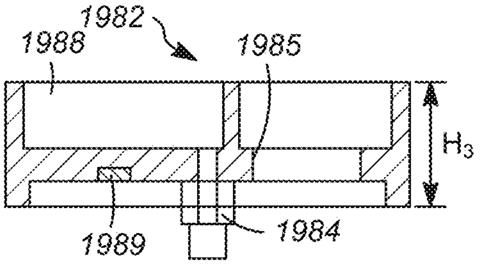
FIG. 22F is a cross-sectional view of the disk of FIG. 22E.
Figure 22G:
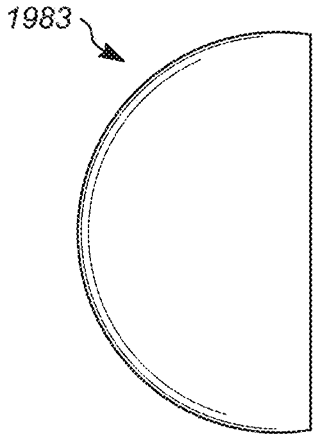
FIG. 22G is a top elevation view of a circuit board cover of the cap assembly of FIG. 19.
Figure 22H:
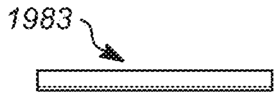
FIG. 22H is a side elevation view of the circuit board cover of FIG. 22G.

The inner cap 1981 has a single second pill opening 1986 that is shaped and sized similarly to the first pill opening 1985. The second pill opening 1986 is spaced radially from the central axis A by approximately the same distance as the first pill opening 1985 of the disk 1982 so that rotating the disk 1982 relative to the receptacle 1922 and inner cap 1981 can bring the second pill opening 1986 into alignment with the first pill opening 1985 to allow a single pill 1926 to drop from the first pill opening 1985 into the second pill opening 1986, as shown in FIG. 20. As shown, the dispensing operation occurs with the receptacle 1920 being inverted with the cap assembly 1924 being downward of the content holding body of the receptacle 1922. The crown 1980 includes a single third pill opening 1987 that is shaped similarly to the first and second pill openings 1985, 1986 and is spaced radially from the central axis A by approximately the same distance as those pill openings 1985, 1986. However, the third pill opening 1987 is circumferentially offset from the first pill opening 1985 so that the three pill openings 1985, 1986, 1987 cannot be simultaneously all aligned with one another. Thus, to dispense a pill 1926 in the second pill opening 1986 of the inner disk 1982 from the medication bottle 1920, the crown 1980 must be rotated relative to the receptacle 1922 (or vice versa) to bring the second pill opening 1986 into alignment with the third pill opening 1987 of the crown 1980 so that the pill 1926 can pass through the third pill opening 1987 and outside of the medication container 1920, as shown in FIG. 21. In an exemplary embodiment, the third pill opening 1987 is offset from the first pill opening 1985 by approximately one hundred and eighty degrees. In other embodiments, the circumferential offset between the first and third pill openings 1985, 1987 can be either more or less than one hundred and eighty degrees (but greater than zero degrees), e.g., ninety degrees. The first and third pill openings 1985, 1987 are not alignable in either the radial direction or the longitudinal direction relative to the receptacle 1920. The second pill opening 1986 is movable from a first position aligned with the first pill opening 1985, a second position intermediate the first pill opening 1985 and the third pill opening 1987, and a third position aligned with the third pill opening 1987. In an example embodiment, a first ball and detent mechanism is positioned between the insert and the inner cap to provide a mechanical indicator that the first opening 1985 is aligned with the second opening 1986. In an example embodiment, a second ball and detent mechanism is positioned between the outer cap and the inner cap to provide a mechanical indicator that the second opening 1986 is aligned with the outer, third opening 1987. Both detent mechanism can be overcome with a person's grip on the crown 1924.

Inserting a pill 1926 follows a process that is the opposite of the dispensing process. That is, to insert a pill 1926 into the medication container 1920, the user first puts a pill 1926 into the third pill opening 1987 and rotates the crown 1980 to bring the second pill opening 1986 into alignment with the third pill opening 1987 such that the pill 1926 can fall into the second pill opening 1986 of the inner cap 1981. The user continues rotating the crown 1980 to bring the second pill opening 1986 into alignment with the first pill opening 1985, whereupon the pill 1926 falls through the first pill opening 1985 of the disk 1982 and into the receptacle 1922.

From the user's perspective, dispensing a single pill 1926 from the medication container 1920 simply involves tilting the medication container 1920 essentially upside down, holding the receptacle 1922 still, and rotating the crown 1980 in the one direction that is permitted until the pill 1926 falls out of the cap assembly 1924. The inversion of the medication container 1920 can be with the medication container 1920 inverted between 165 degrees and 195 degrees, +/−5 degrees or +/−10 degrees. This process is both intuitive and simple for the user and can be repeated to dispense a second pill 1926. Alternately, with the medication container 1920 upside-down, the user can hold the crown 1980 steady and rotate the receptacle 1922, and the pill 1926 will follow the same route from inside the receptacle 1922, through the cap assembly 1924, to outside of the medication container 1920. Likewise, to insert a pill 1926 into the medication container 1920, the user simply inserts the pill 1926 into the third pill opening 1987 of the crown 1980 and rotates the crown 1980 relative to the receptacle 1922 until the user hears the pill 1926 fall into the receptacle 1922. Within the cap assembly 1924, when the user is rotating the crown 1980 to dispense a pill 1926, the pill 1986 within the second pill opening 1986 is isolated from the other pills 1926 within the receptacle 1922 and from the external environment.

The disk 1982 has a recess 1988 with a semi-circular shape that opens in a direction towards the receptacle 1922 (away from the probe 1984). At least some of electronic components (shown schematically in FIG. 23) of the cap assembly 1924 fit into this recess 1988. In this embodiment, the electronic components may include at least the microprocessor 1954, the memory 1956, the accelerometer 1950, the wireless module 1952, and the battery 1958. The circuit board cover is fixedly attached with the disk 1982 within the recess 1988 to protect these electronic components from the pills 1926 in the receptacle 1922. The accelerometer 1950 can sense when the receptacle 1922 with the cap assembly 1920 is inverted.

The probe 1984 of the disk 1982 includes a through passage that opens into the recess 1988 and extends from the recess 1988 to the end of the probe 1982, and a light 1966 (such as an LED) is fixedly attached with the probe 1984 at or adjacent the end of the probe 1982. A wire extends from the circuit board in the recess 1988, through the through passage of the probe 1984, and to light 1966 to activate and power the light. The light 1966 is preferably either flush with an outer surface of the crown 1980 or is recessed within the crown 1980 to protect the light 1966 from damage if it the medication container 1920 dropped on the ground. As discussed above, the light 1966 could provide reminders to the user. Those reminders may include, for example, when to take a dose according to the medication schedule, when the battery 1958 needs to be recharged or replaced, or when a medication count within the receptacle 1922 falls below a predetermined level such that refill of the pills 1926 may soon be required.

The cap assembly 1924 also includes a position sensor 1989 and a pill detect sensor 1990 that are in electrical communication with the microprocessor 1954 to allow the microprocessor 1954 to positively confirm each pill 1926 dispensing and insertion event. In the exemplary embodiment, a magnet is disposed on the inner disk at a location that is diametrically opposite of the second pill opening 1986, and the position sensor 1989 is disposed on the disk 1982. The magnet and position sensor 1989 are spaced from the central axis A by the same distance such that the position sensor 1989 is brought into the proximity of the magnet once with each rotation of the crown 1980. In operation, the position sensor 1989 detects the magnet each time it passes the magnet passes to send a signal from the position sensor 1989 to the microprocessor 1954 so that the microprocessor 1954 knows that the crown 1980 has undergone a revolution. The position sensor 1989 can be a Hall effect sensor in an example embodiment. The position sensor 1989 can be a magnetic field sensor to output a binary signal when the magnet changes state of the switch in the sensor an example embodiment. In other embodiments, the position sensor may take different forms for detecting rotation of the disk relative to the inner cap and the receptacle. For example, the position sensor could alternately utilize a light detector to determine when the crown has been rotated. In an alternative embodiment, the position sensor can be a mechanical switch or electrical switch that changes state when the openings 1985, 1986, 1987 are in the first position, the second position or the third position. In an example, the sensor includes a cantilevered arm that is deflected into a first state in the first position (e.g., a first deflected state), a second state in the second position (e.g., a normal state), and a third state in the third position (e.g., a second deflected state).

The pill detect sensor 1990 includes two piece that are both attached with the disk 1982. One of the pieces is attached with an outer surface of the probe 1984, and the other piece is attached with an axially projecting and cylindrically shaped lip at an outer circumference of the disk 1982. As shown in FIGS. 20 and 21, the pill detect sensor 1990 is aligned circumferentially with the first pill opening 1985 but overlaps in an axial direction with the second pill opening 1986. In operation, the pill detect sensor 1990 sends a signal, such as an ultrasonic pulse, from one of the pieces towards the other piece. The received pulse will differ depending on whether a pill 1926 is in the second pill opening 1986 or not. The microprocessor 1954 receives a signal from the pill detect sensor 1990 and compares the received signal to known signals to determine if a pill 1926 is between the two pieces, i.e., in the second pill opening 1986 of the inner cap 1981.

Figure 24:
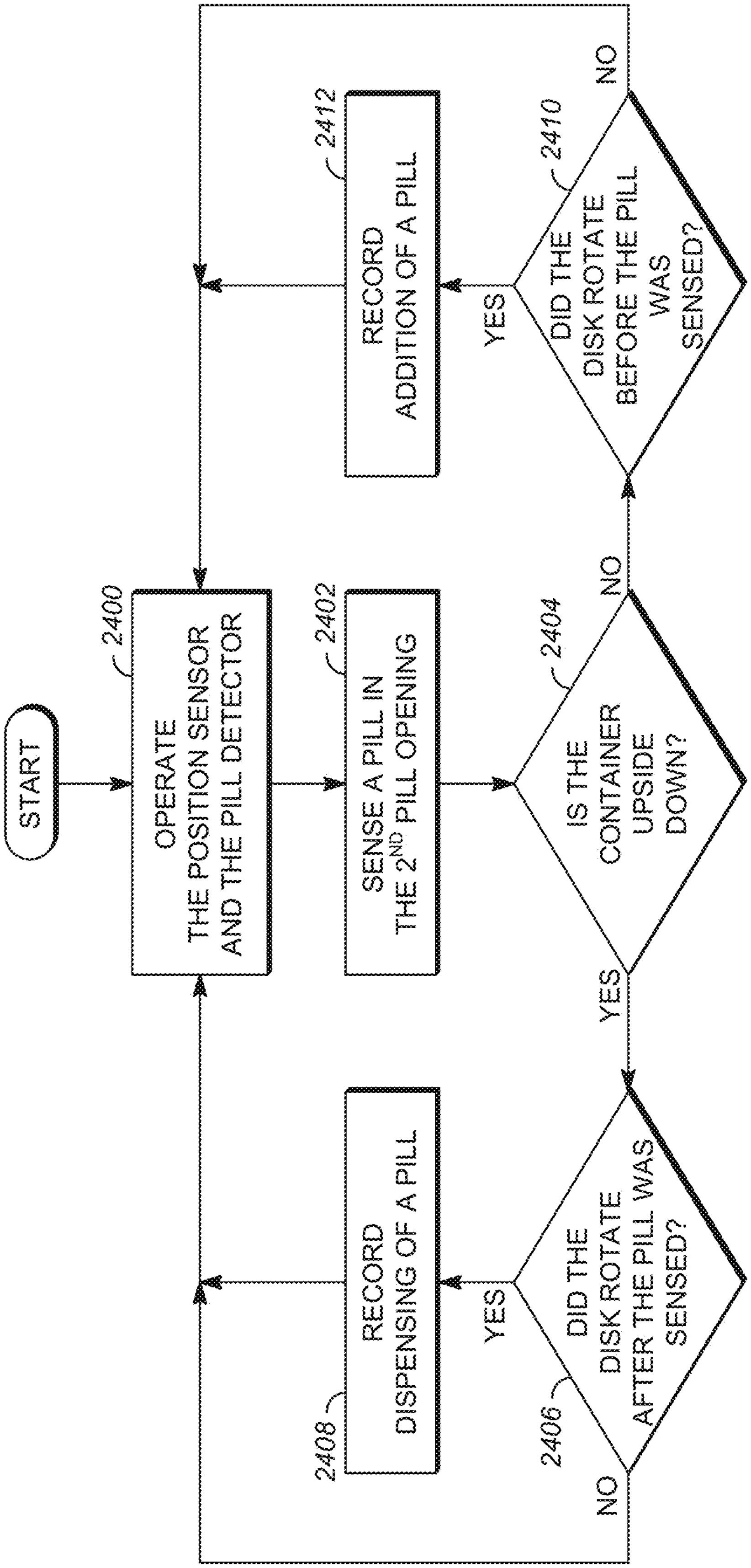
FIG. 24 is a flow chart depicting an exemplary method of operating the cap assembly of FIG. 19.

Through the accelerometer 1950, the position sensor 1989, and the pill detect sensor 1990, the microprocessor 1954 is able to determine each passage of a pill 1926 into or out of the receptacle 1922 according to the process shown in the flow chart of FIG. 24. At step 2400, the position sensor 1989 and the pill detect sensor 1990 are operated. At step 2402, the pill detect sensor 1990 detects a pill 1926 in the second pill opening 1986 of the inner cap 1981.

At decision step 2404, the microprocessor 1954 communicates with the accelerometer 1950 to determine if the medication container 1920 is upside-down, i.e., with the cap assembly 1924 facing vertically downwardly. If the answer at decision step 2404 is yes, then the process proceeds to decision step 2406. At decision step 2406, the microprocessor 1954 communicates with the position sensor 1989 to determine if the disk 1989, which is fixedly attached with the crown 1980, was rotated shortly after the pill 1926 was sensed in the second pill opening 1986. In other words, decision step 2406 determines if the crown 1980 was rotated relative to the receptacle 1922 after the pill 1926 was detected in the second pill opening 1986 of the inner cap 1981. If the answer at decision step 2406 is yes, then the process proceeds to step 2408. At step 2408, the microprocessor 1954 records data pertaining to a pill dispensing event into the memory 1956 before returning to step 2400. The data recorded to the memory 1956 may include, inter alia, a subtraction from the medication count, a date/time stamp, and a temperature stamp. If the answer at decision step 2406 is no, then the process returns to step 2400.

If the answer at decision step 2404 is no, then the process proceeds to decision step 2410. At decision step 2410, the microprocessor 1954 communicates with the position sensor 1989 to determine if the disk 1982 rotated shortly before the pill 1926 was sensed in the second pill opening 1986. If the answer at decision step 2410 is yes, then the process proceeds to step 2412. At step 2412, the microprocessor 1954 records data pertaining to a pill addition event into the memory 1956. The data recorded to the memory 1956 may include, inter alia, an addition to the medication count, a date/time stamp, and a temperature stamp before returning to step 2400. If the answer at decision step 2410 is no, then the process returns to step 2400.

In the exemplary embodiment, because the pill detect sensor 1990 is fixedly attached with the disk 1982, it can only detect the pill 1926 when the first and second pill openings 1985, 1986 of the disk 1982 and inner cap 1981 respectively are aligned with one another. In alternate embodiments, the pill detect sensor 1990 may be fixedly attached with the disk 1982 in a different location or may be fixedly attached with either the crown 1980 or with the inner cap 1981. In those embodiments, decision steps 2406 and 2410 may be reversed.

Figure 23:
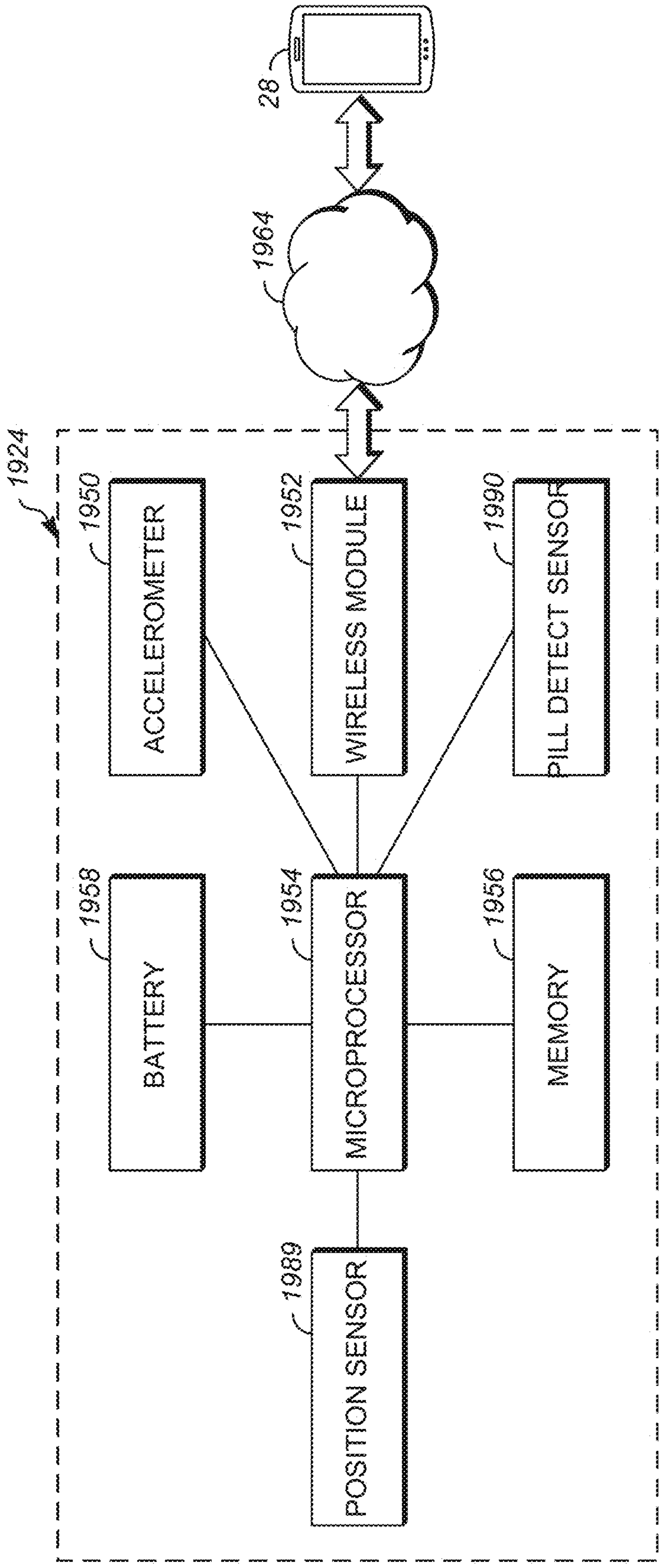
FIG. 23 is a schematic view of a working environment of the cap assembly of FIG. 19.

The microprocessor 1954 may periodically sync the data on the memory 1956 with the external device 1928 and/or with an external, cloud-based server. As shown in FIG. 23, the wireless module 1952 may communicate with the external device 1928 via the internet 1964. Alternately, the communication between the wireless module 1952 and the external device 1928 may be direct or through a local area network.

With reference to FIGS. 22A-H, the crown 1980 has an outer surface with a texturing to provide grip for a user to more easily rotate the crown 1980 relative to the receptacle 1922 during either a pill dispensing or pill adding operation. In the exemplary embodiment, the texturing includes a plurality of axially extending and circumferentially spaced apart ribs. The crown 1980 also includes a centrally located opening 1991, which the probe 1984 of the disk 1982 extends into and is attached with to fixedly attach the crown 1980 and disk 1982 with one another. The attachment between the probe 1984 of the disk 1982 and the crown 1980 is preferably formed through a heat staking operation. In other embodiments, other attachment means may be employed to fixedly attach the crown 1980 with the disk 1982, including adhesives or mechanical fasteners. The centrally located opening 1991 on the crown 1980 has a diameter that is smaller than a diameter of a centrally located opening 1992 on the inner cap 1981, thereby allowing the inner cap 1981 and probe to rotate relative to one another about the central axis A (shown in FIG. 20).

In the exemplary embodiment, the third pill opening 1987 of the crown 1980 is located closer, in a radial direction, to the centrally located opening 1991 than to an outer circumference of the crown 1980. Likewise, the second pill opening 1986 of the inner cap 1981 is located closer to the centrally located opening 1992 of the inner cap 1981 than to an outer circumference of the inner cap 1981. On the other hand, the first pill opening 1985 of the disk 1982 is located approximately equidistantly between the probe 1984 and an outer circumference of the disk 1982.

The disk 1982 has a height $H_3$ that is greater than a height $H_2$ of the inner cap 1981, and therefore, as shown in FIGS. 20 and 21, when the cap assembly 1924 is assembled with the disk 1982 being seated in the inner cap 1981, the disk 1982 projects vertically past the inner cap 1981 and partially into the receptacle 1922. The disk 1982 includes a dividing wall 1993 that extends across the disk 1982 and is located on an opposite side of the disk 1982 from the probe 1984. The dividing wall 1993 is radially offset from the probe 1984, which is centrally located, such that one side of the dividing wall 1993 is larger than the other side. The larger side is the aforementioned recess 1988 that contains the electronic components of the cap assembly. The dividing wall 1993 extends across the disk 1982 at a location between the probe 1984 and the first pill opening 1985.

The cap assembly 1924 is assembled by first separately making the crown 1980, the inner cap 1981, the disk 1982, and the circuit board cover 1983. The probe 1984 on the disk 1982 is then inserted through the opening 1992 of the inner cap 1981 such that the shoulder of the probe 1984 rests against the inner cap 1981. The probe 1984 is then inserted into the opening 1991 of the crown 1980, and a heat staking operation is performed to fuse the material of the probe 1984 with the material of the crown 1980, thereby fixedly attaching the crown 1980 and the disk 1982 together. The electronic components may then be inserted into the recess 1988 of the disk 1982 and the circuit board cover 1983 can be attached with the disk 1982 to protect the electronic components. The assembled cap assembly 1924 may then be joined with the receptacle 1922 by threading the inner cap 1981 onto the receptacle 1922.

In some embodiments, the pill openings can be sized to accommodate multiple pills, such as enough pills to effectuate a dose according to a user's medication schedule. In some embodiments, the inner cap may include multiple second pill openings that are circumferentially spaced apart from one another and multiple magnets located thereon. In another embodiment, the cap assembly may further include a membrane that can be positioned within the third pill opening of the crown and has to be opened by a user to remove the pill from the cap assembly. In another embodiment, an actuator (such as an electric motor) may be provided in the cap assembly to automatically rotate the crown and disk and thereby effectuate a dispensing operation when the actuator is activated.

Figure 25:
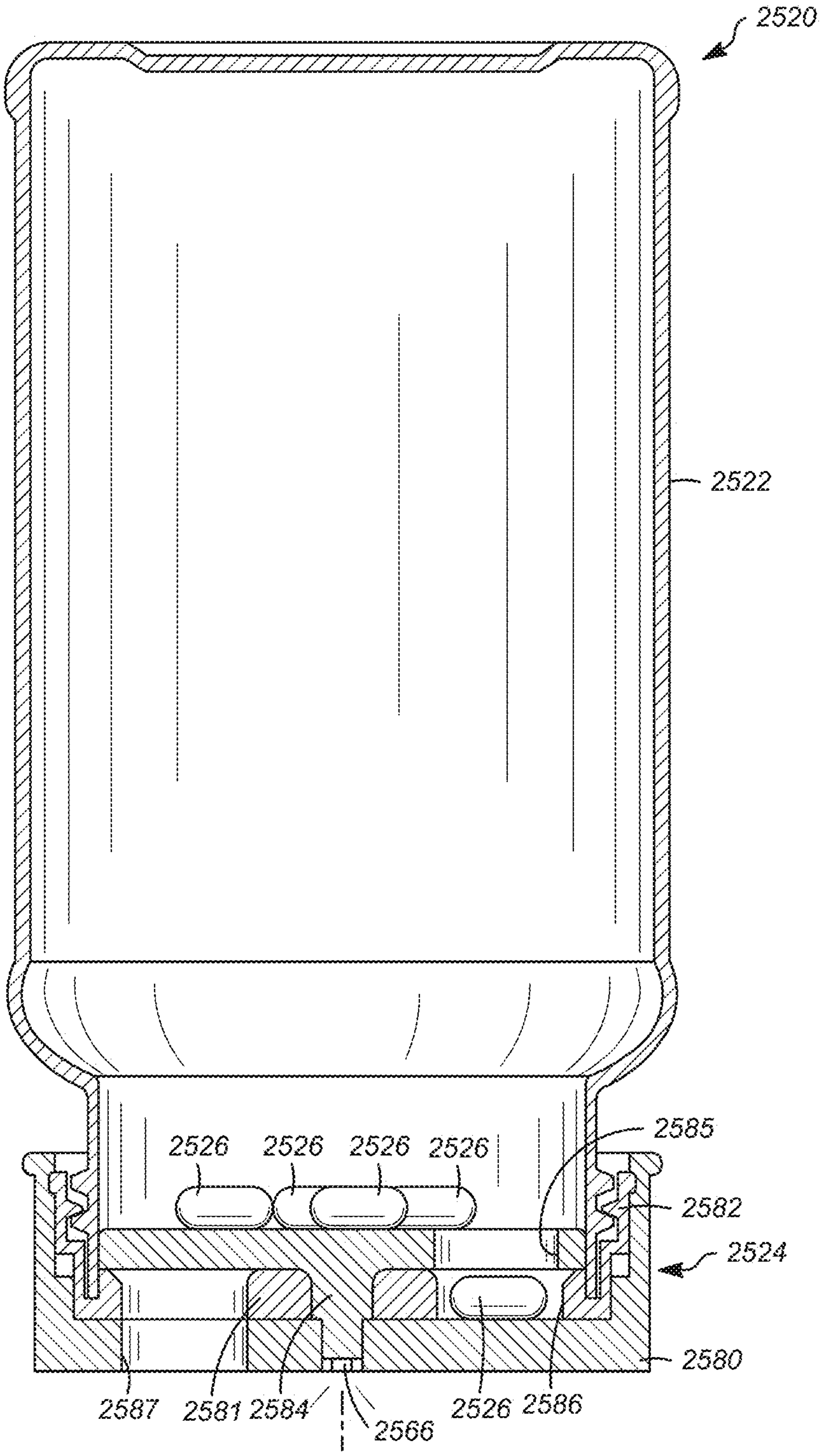
FIG. 25 is a cross-sectional view of a medication container including yet another exemplary embodiment of the cap assembly.
Figure 26A:
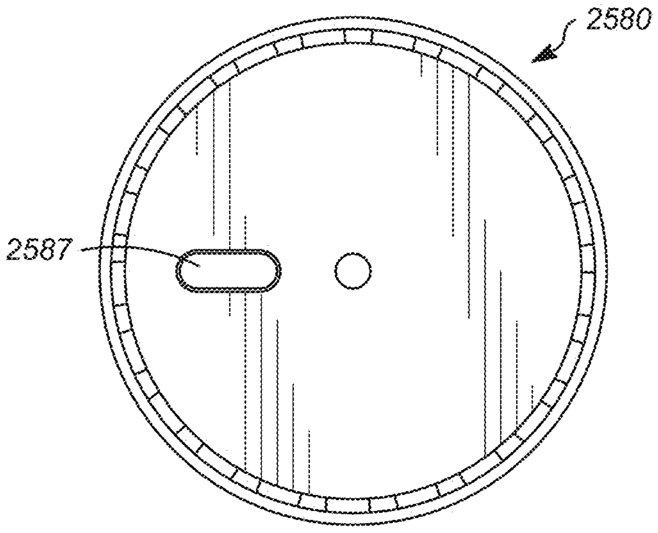
FIG. 26A is a top elevation view of a crown of a cap assembly of the FIG. 25.
Figure 26B:
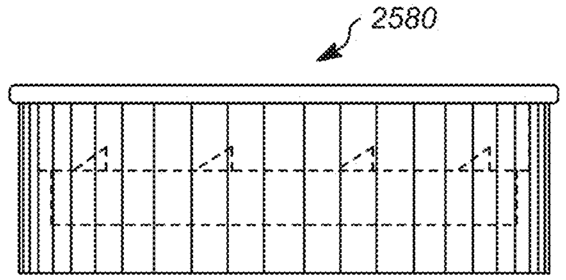
FIG. 26B is a side elevation view of the crown of FIG. 26A.
Figure 26C:
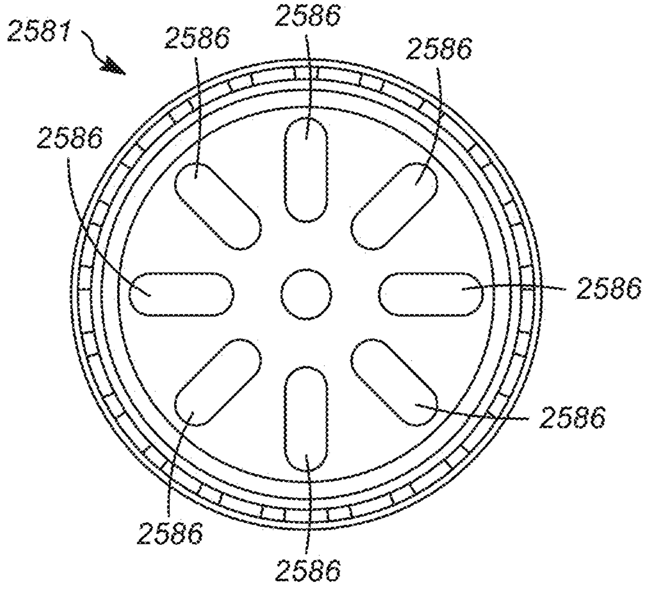
FIG. 26C is a top elevation view of an inner cap of the cap assembly of FIG. 25.
Figure 26D:
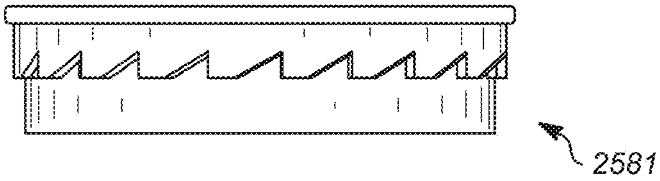
FIG. 26D is a side elevation view of the inner cap of FIG. 26C.
Figure 26E:
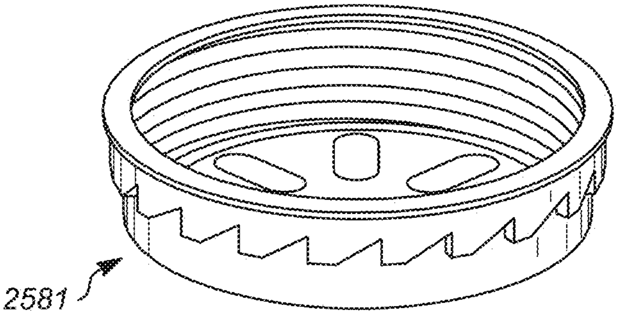
FIG. 26E is a perspective elevation view of the inner cap of FIG. 26C.
Figure 26F:
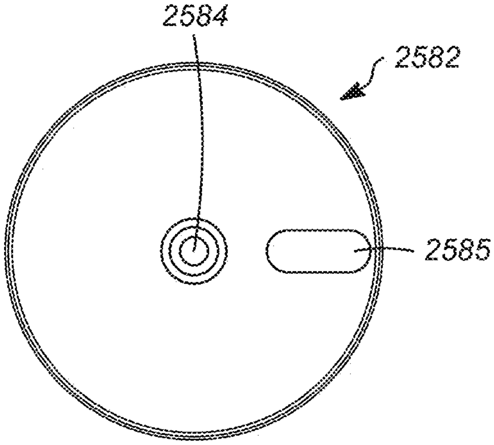
FIG. 26F is a top elevation view of a disk of the cap assembly of FIG. 25.
Figure 26G:
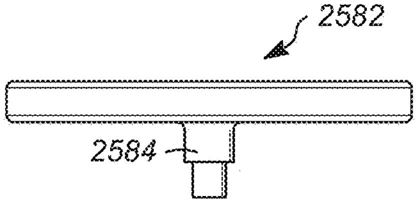
FIG. 26G is a side elevation view of the disk of FIG. 26F.

Referring now to FIGS. 25 and 26, another exemplary embodiment of the medication container 2520 is shown with like numerals, separated by a prefix of "25," identifying like parts with the embodiments described above. This embodiment is similar to the one shown in FIGS. 19-23, but the disk 2582 lacks the recess for holding the electronic components, and the cap assembly 2524 lacks the circuit board cover. The electronic components may be fixedly attached directly with the disk 1982 or may be attached with any component of the cap assembly 2524. In some embodiments, one or more of the electronic components may be disposed outside of the cap assembly 2524 and fixedly attached with the receptacle 2522.

In this embodiment of the cap assembly 2524, the disk 2582 includes a planar and circular base, and the probe 2584 projects axially from a central location of the circular base. The inner cap 2581 also includes a plurality of second pill openings 2586 rather than just one second pill opening as is the case in the embodiment described above.

Figure 27:
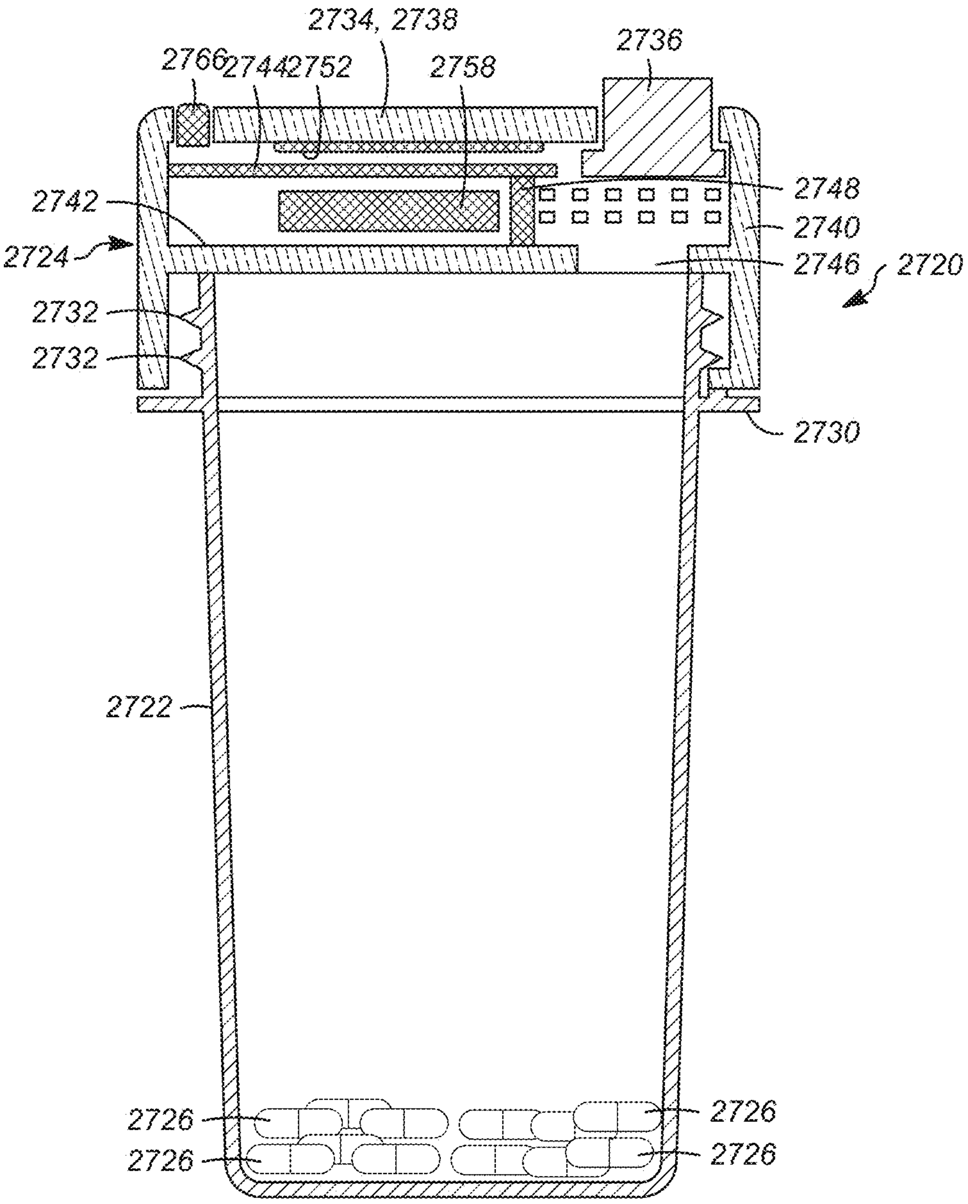
FIG. 27 is a cross-sectional view of a medication container including yet another exemplary embodiment of the cap assembly.

Referring now to FIG. 27, another exemplary embodiment of the medication container 2720 is shown with like numerals, separated by a prefix of "27," identifying like parts with the embodiments described above. In this embodiment, a single medication sensor 2748 or multiple medication sensors 2748 emit two vertically spaced apart beams of light across the passage 2746. The beams of light can be spaced apart from one another by a distance that is greater than a major dimension of the pills 2726 contained in the medication container 2720. The medication sensor 2748 is in electrical communication with the microprocessor for communicating all events where the beams of light are broken to the microprocessor. If both of the beams of light are broken simultaneously, then the microprocessor interprets this event as either multiple pills 2726 being dispensed at the same time or that something else (other than the pills 2726) has been inserted into the passage 2746. Thus, the microprocessor may be able to differentiate a dispensing event from a false dispensing event, e.g., the user inserting their finger into the passage 2746.

If one of the beams of light is broken and then returned (unbroken) before the other beam is broken, then this event is interpreted by the microprocessor as being either the dispensing of a pill 2726 or a pill 2726 being added into the medication container 2720. Based on which of the beams of light is broken first, the microprocessor can also determine which direction the pills 2726 are travelling, i.e., into or out of the receptacle 2722. Specifically, with reference to the orientation of the medication container 2722 in FIG. 27, if the upper light beam is broken first and then the lower beam of light is broken, then the microprocessor interprets this event as the addition of a pill 2726 into the receptacle 2722. On the other hand, if the lower light beam is broken first and then the upper beam of light is broken next, then the microprocessor interprets this event as the dispensing of a pill 2726 from the receptacle 2722.

The following discussion will refer to the reference numbers of the embodiment of FIGS. 1-5 except where a specific feature found only a different one or more embodiments or where otherwise indicated. However, it should be appreciated that any of the following discussion may apply to any of the embodiments discussed above or other possible embodiments beyond those expressly discussed herein.

Figure 28A:
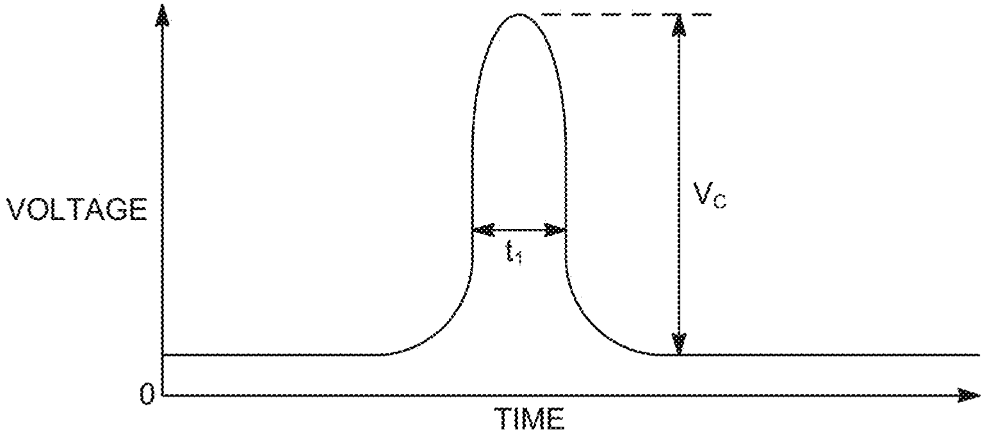
FIG. 28A is a plot showing the voltage produced by a light detector in the cap assembly of FIG. 5 as a medication is dispensed therefrom.
Figure 28B:
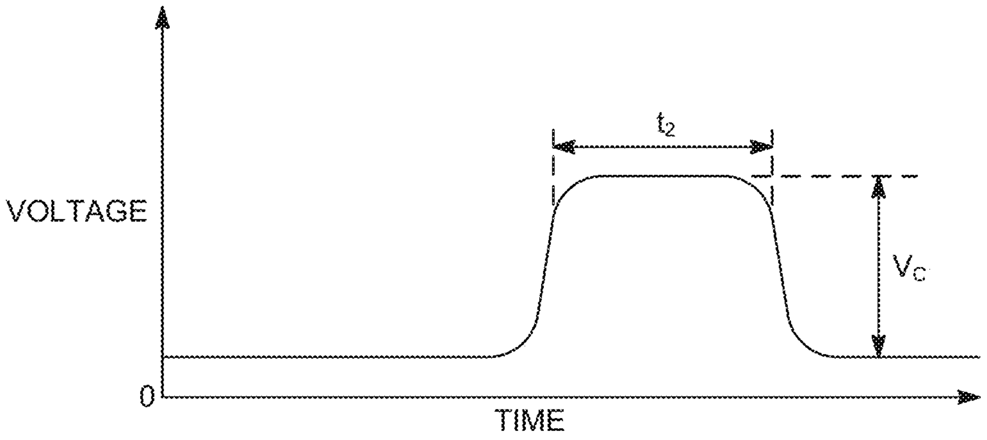
FIG. 28B is a plot showing the voltage produced by a light detector in the cap assembly of FIG. 5 as a non-pill is inserted into a passage of the cap assembly.

FIGS. 28A and 28B show plots illustrating the voltage produced by a light detector of the medication sensor 48 in the cap assembly 24 as different events occur. In FIG. 28A, a pill 26 passes through the passage 46 either into or out of the receptacle 22. The time $t_1$ of the voltage spike $V_C$ is within a predetermined range, e.g., 0.5±0.1 seconds. In FIG. 27B, the time $t_2$ falls outside of the predetermined range, and therefore, the microprocessor 54 determines this event to not be a pill addition or removal event. Such an event could be, for example, if a user inserts an object, like a finger, into the passage 46.

Referring still to FIGS. 28A and 28B, in some embodiments, the cap assembly 24 may periodically recalibrate itself to establish a new baseline voltage, i.e., the voltage produced by the light detector of the medication sensor 48 when the passage 46 is empty. The recalibration process may be to improve performance of the cap assembly because dust or other particles can settle on the light detector or a reflective surface on the opposite side of the passage 46 from the light detector, thereby and impacting the amount of light that is emitted and/or received by the light detector when the passage 46 is empty and altering the baseline voltage produced by the light detector. The calibration process includes activating the medication sensor 48 when the passage 46 is empty and measuring the voltage produced by the light detector. Once a generally constant voltage is measured for a predetermined period of time, (for example, two seconds) without any substantial voltage changes, such as voltage spike, this constant voltage is set as the new baseline voltage. The voltage change $V_C$ measurement used to determine if an object in the passage 46 is a pill 26 or something else, does not have to be adjusted over time.

Figure 3B:
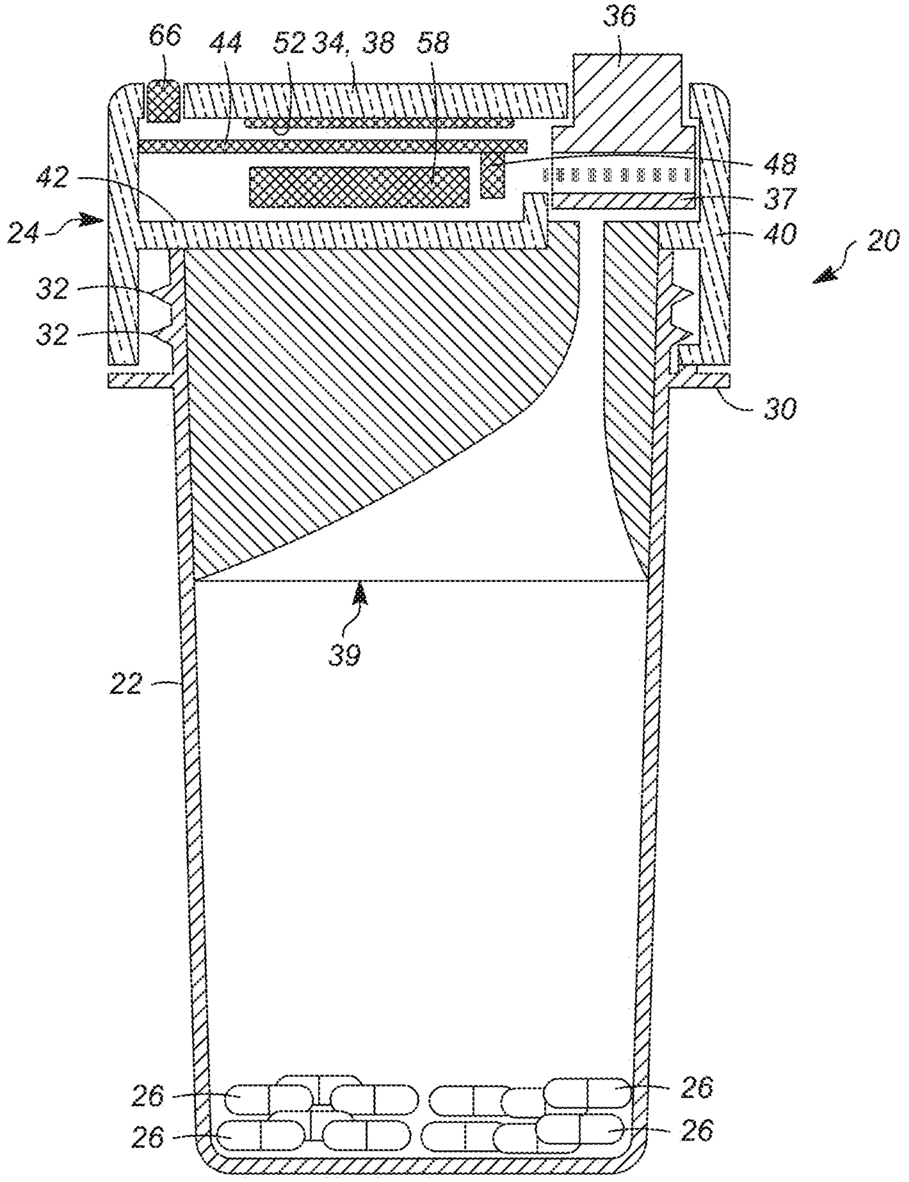
FIG. 3B is a cross-sectional view of a medication container of an alternate embodiment.

Referring now to FIG. 3B, in an embodiment, the gate 36 may include a restrictor arm 37 that is partially spaced from the beam of light from the light emitter of the medication sensor 48. The restrictor arm 37 may be generally L-shaped with a short leg that attaches with an upper portion of the gate 36 and a long arm that extends in spaced and parallel relationship with the upper portion of the gate 36. The short leg of the L-shaped restrictor arm 37 is fixedly attached with or integrally attached with the remainder of the gate 36 such that these two components move together when the gate 36 is opened and closed. The gap between the upper portion of the gate and the restrictor arm 37 is smaller than the size of the pills 26 such that the pills 26 cannot get trapped into this gap, thereby ensuring that when the gate 36 is in the closed position shown in FIG. 3B, the beam of light from the emitter is unobstructed. Thus, the aforementioned calibration operation to establish the baseline voltage can be performed while the gate 36 is in the closed position without any pills 26 obstructing the operation.

In an embodiment, the cap assembly 24 may include a gate limiter that is configured to limit the amount that the gate 36 can open based on the size of the pills 26 contained in the receptacle 22. In one embodiment, the gate limiter can be a non-electronic device that is set to allow the gate 36 to open by a predetermined amount in a pharmaceutical setting based on the type of pill 26 that is to be included in the medication container 20.

In another embodiment, the gate limiter can be electronic including one or more solenoids and can be adjustable to change the amount that the gate 36 can open. In an embodiment with multiple chambers 268 that contain differently sized pills but the cap assembly 224 only includes a single passage (such as the embodiment of FIG. 9), the gate limiter may include an electronic solenoid and may be configured to alter the amount the gate 236 can be opened based on which of the chambers 268 the gate 236 is aligned with, i.e., the gate 236 can open further when aligned with a chamber 268 that contains large pills than when the gate 236 is aligned with a chamber 268 that contains comparatively smaller pills. In an embodiment where the cap assembly 424 includes multiple passages 446 with multiple gates 436 (such as the embodiment of FIGS. 13 and 14), the cap assembly 424 may include multiple gate limiters that are configured to allow the gates 436 to open by different amounts based on the types of pills in the chambers associated with those gates 434.

Figure 29:
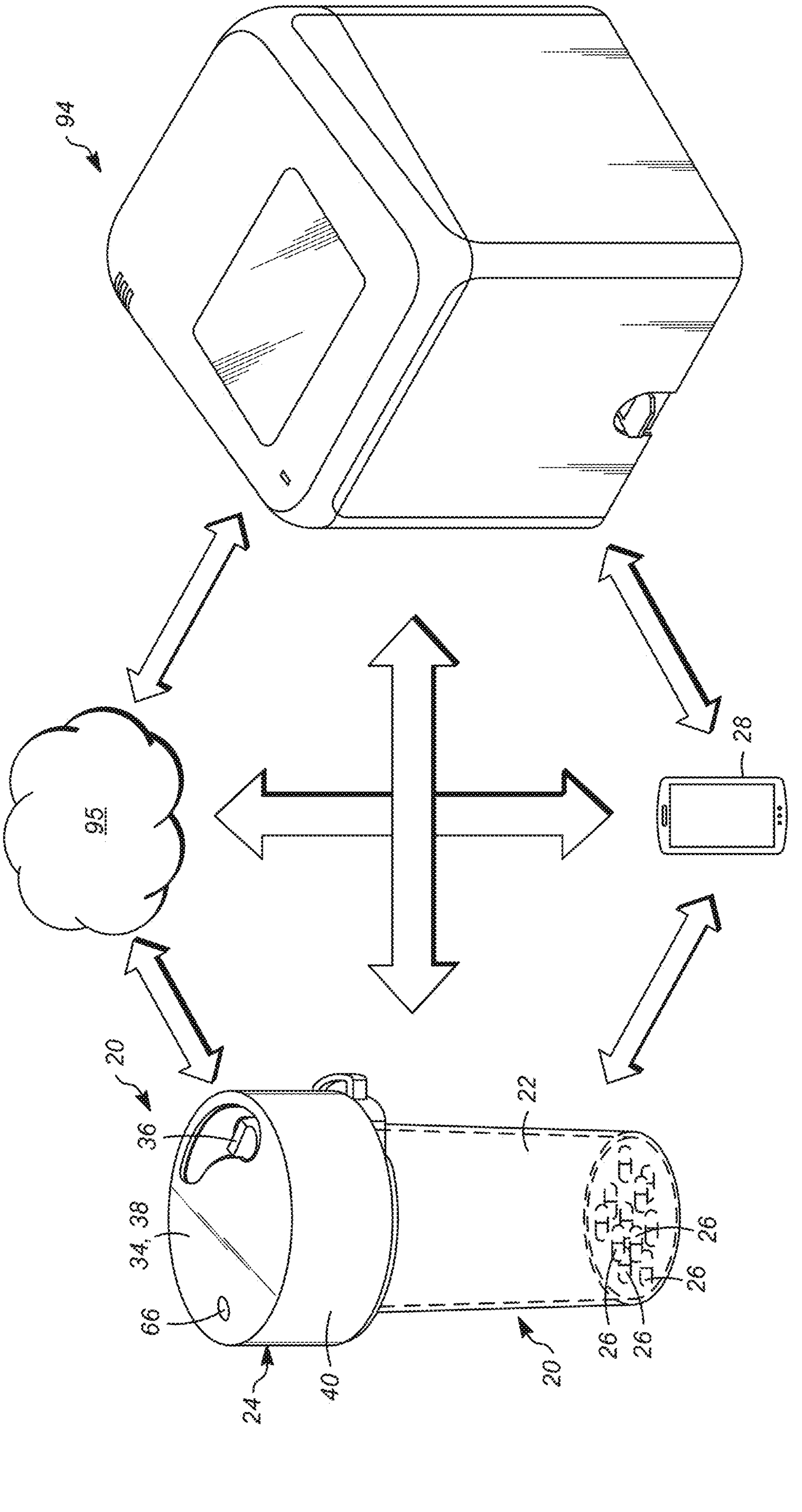

Referring now to FIG. 29, the cap assembly 24 may be configured to communicate with a medication dispenser 94. Such a medication dispenser 94 can be a personal countertop device that contains one or more type of medication and is programmed to automatically dispense pills according to a programmed medication schedule or upon receiving a demand for one or more pills. If a user is going to be away from the medication dispenser 94 for a period of time (for example, the user is leaving their house for one or more days), the user can dispense a sufficient quantity of pills to last for the time they are away from the medication dispenser 94 and insert those pills into the medication container 20. For the embodiments where the receptacle 22 of the medication container 20 includes multiple chambers, different types of pills can be dispensed from the medication dispenser and put into the different chambers of the medication container 20. The medication dispenser 94 can then automatically communicate with the cap assembly 24 to program the user's medication schedule into the memory of the cap assembly and/or to store a medication count of the pills dispensed by the medication dispenser 94 into the cap assembly 24. This communication could be direct, via the internet, or via the external device 28. Once programmed into the memory of the cap assembly 24, the cap assembly 24 can automatically alert the user (such as with the light) for each dosing event and can alert the user when a medication count in the medication container 20 falls below a predetermined threshold.

Both the medication dispenser 94 and the cap assembly 24 can communicate with a database that may be located, for example, on the external device or on a cloud-based server and may be accessible by a third party (such as a medical care provider, a pharmacy, or a pharmacy benefit manager) to allow the user or the third party to monitor the user's medication adherence, whether the user is dispensing the pills from the medication dispenser 94 or the medication container 20. More specifically, either a dispensing event by the medication dispenser 94 or a dispensing event by the medication container 20 can be recorded to a database that can be accessed by various parties using various devices, including the external device 28.

Figure 30:
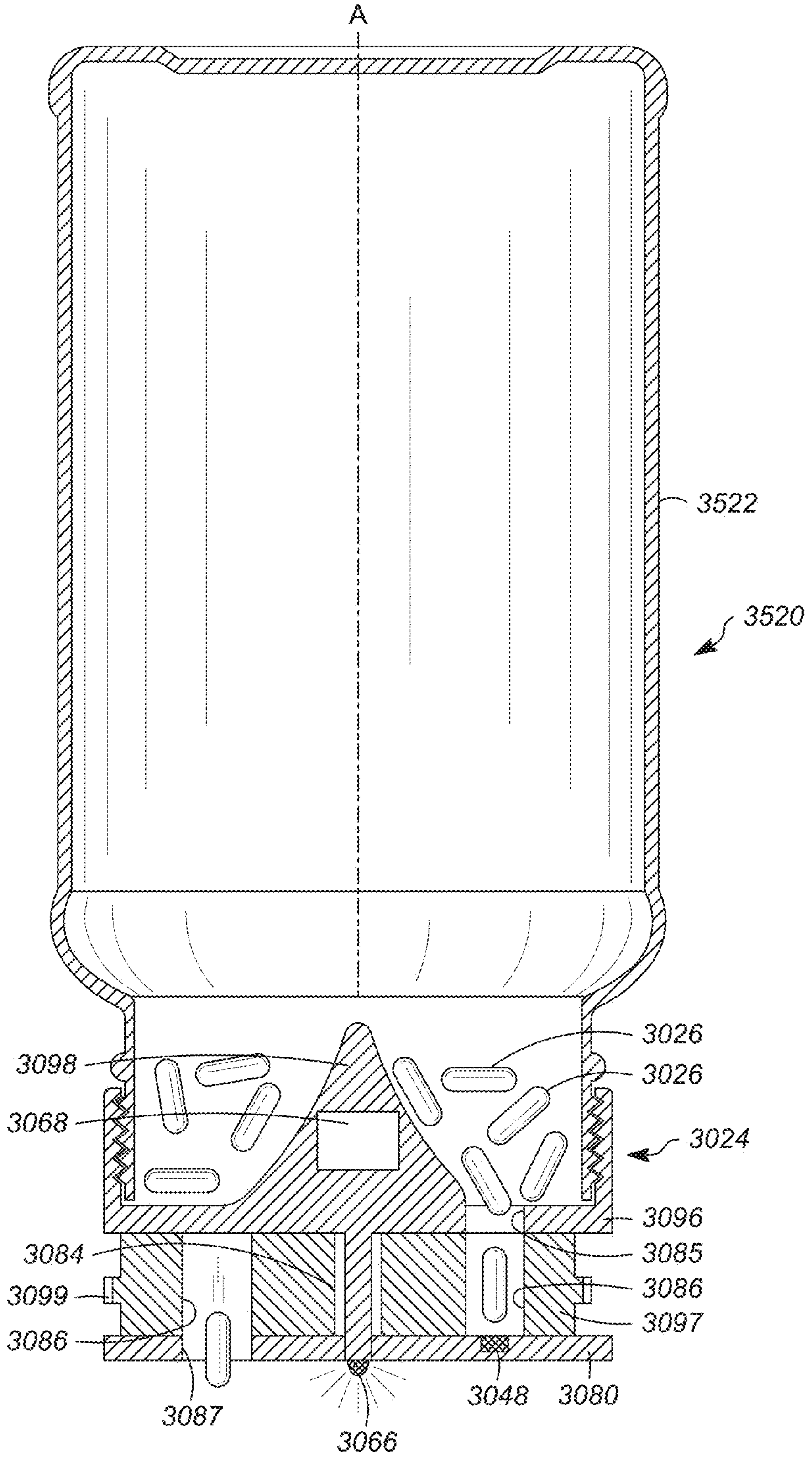
FIG. 30 is a cross-sectional view of a medication container that includes yet another exemplary embodiment of the cap assembly.

Referring now to FIG. 30, a medication container 3020 including yet another exemplary embodiment of the cap assembly 3024 is generally shown with like numerals, separated by a prefix of "30," identifying like features with the embodiments described above. The cap assembly 3024 includes three pieces: a base 3096, a rotating wheel 3097, and a crown 3080. These cap assembly pieces can be formed separately from one another and are pre-connected with one another prior to engaging the cap assembly 3024 with the receptacle 3022. In an example embodiment, the base and the crown can be unitarily formed from a polymer.

Figure 31:
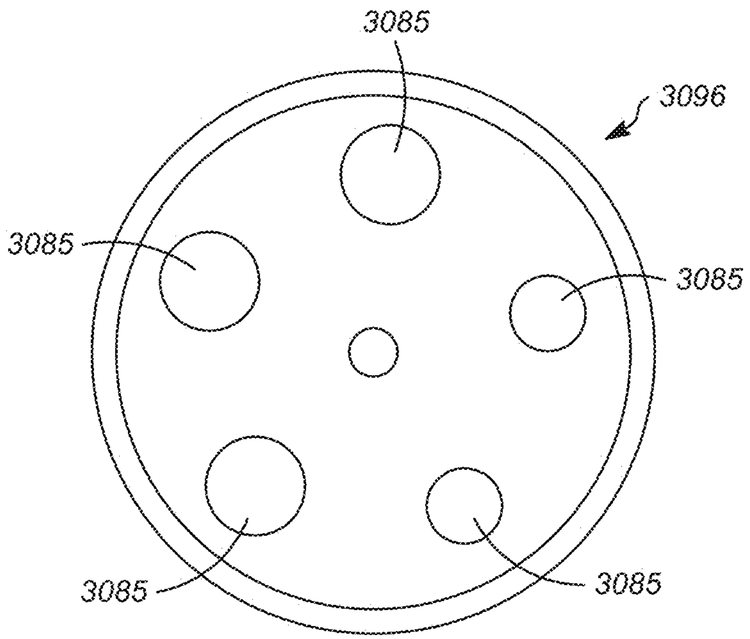
FIG. 31 is a top elevation view of a base of the cap assembly of FIG. 30.
Figure 32:
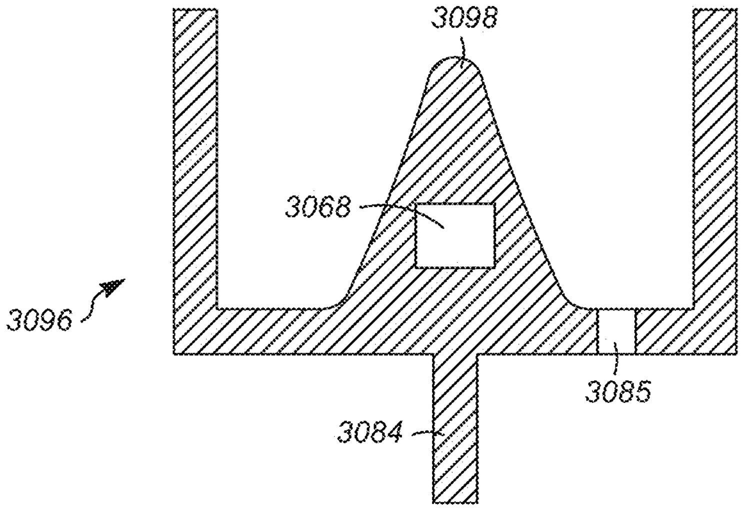
FIG. 32 is a cross-sectional view of the base of FIG. 31.
Figure 33:
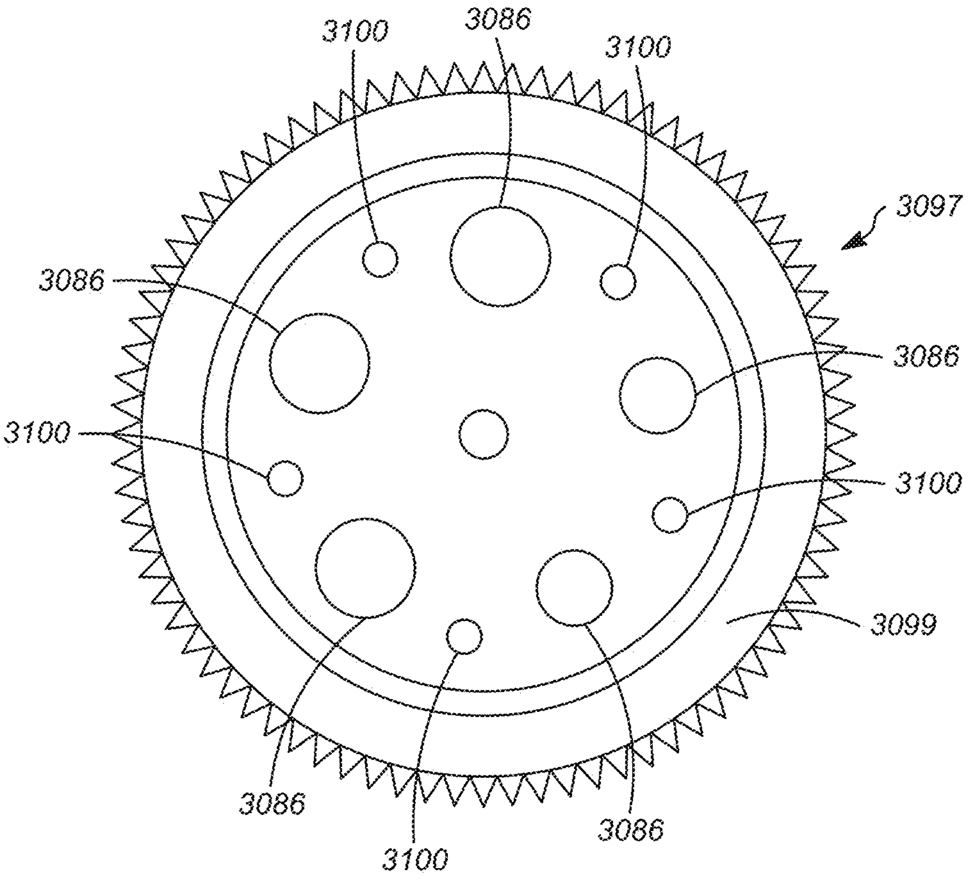
FIG. 33 is a top elevation view of a rotational wheel of the cap assembly of FIG. 30.
Figure 34:
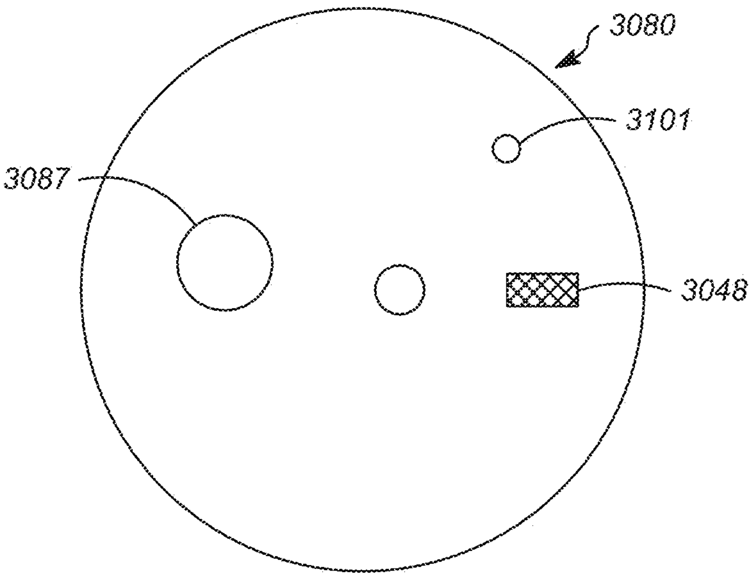
FIG. 34 is a top elevation view of a crown of the cap assembly of FIG. 30.

The base 3096 is cup-shaped with a cylindrically shaped sidewall that has internal threads that threadedly engage with male threads at an opening of the receptacle 3022. The male threads can be outward of a lip on the receptacle 3022 adjacent an opening of the receptacle 3022. The base 3096 further includes a generally planar bottom with at least one first pill opening 3085 in the form of a through hole. The at least one first pill opening 3085 is spaced radially from a central axis A of the cap assembly 3024. In the exemplary embodiment, the base 3096 includes a plurality of openings 3085, here illustrated as five first pill openings 3085 (shown in FIG. 31) that are equally and circumferentially spaced apart from one another. In some embodiments, the base includes one, two, three, four, or more than five first pill openings. In other example embodiments, at least one of the equally spaced positions of first pill openings does not include a pill opening 3085.

The base 3096 further includes a projection 3098 that extends from the bottom towards the interior of the receptacle 3022 and that is sloped. In the exemplary embodiment, the projection 3098 is centrally located on the central axis A and has a generally conical shape. When the medication container 3020 is inverted (tipped upside-down) with the cap assembly 3024 facing vertically downwardly, the projection 3098 guides pills 3026 in the receptacle 3022 radially outwardly towards, and ultimately into, empty ones of the at least one first pill opening 3085. Thus, the projection 3098 is able to effectively guide even the last pills 3026 in the medication container 3020 into the at least one first pill opening 3085 of the base 3096. The projection 3098 steers individual pills 3026 to align with one of the first pill openings 3085. The projection 3098 can have ridges upstanding therefrom to form one or more guide chutes to steer the pills 3026 to an empty one of the openings 3085. In the exemplary embodiment, each of the at least one first pill openings 3085 is sized and shaped to accommodate only a single pill 3026 at a time such that the cap assembly 3024 can automatically singulate pills 3026 to only allow a single pill 3026 to be dispensed from the medication container 3020 at a time in the manner described in further detail below. When the cap assembly 3024 is engaged with the receptacle 3022, the projection 3098 extends partially into the interior of the receptacle 3022. On an opposite axial side of the bottom from the projection 3098, the base 3096 includes a probe 3084 that extends along the central axis A in a direction away from the receptacle 3022.

In this embodiment, the base 3096 also includes a chamber 3068 that contains and protects the one or more electrical components of the cap assembly 3024 (for example, the PCB, the processor, the memory operably connected to the processor, the battery, the wireless module, the accelerometer, etc.). The chamber 3068 may be located along the central axis A and spaced from a peak of the projection 3098.

In some embodiments, the base 3096 may be fabricated as a single, monolithic piece of material. In other embodiments, the base 3096 may include multiple pieces that are formed separately and are subsequently joined together. The two pieces could each partially define the chamber 3068 such that when the pieces are joined together, the chamber 3068 containing the electrical components becomes enclosed to separate the electrical components from the pills 3026.

In some embodiments, the first pill openings may be sized to accommodate multiple pills. For example, if a patient's dosage of a medication is two pills, then the first pill openings may shaped and sized to accommodate two pills at a time. In some embodiments, the first pill openings may be shaped and sized to accommodate three or more pills.

The rotating wheel 3097 includes a central opening into which the probe 3084 of the base 3096 is inserted during construction of the cap assembly 3024. The rotating wheel 3096 is in a slip fit contact with the probe 3084 so that, during a dispensing operation discussed below, the rotating wheel 3097 can rotate about the central axis A relative to the base 3096. The rotating wheel 3097 has an outer surface that includes a flange 3099 that extends radially outwardly and that encircles the central axis A. The flange 3099 includes a texturing, such as a plurality of knurls, which allow it to be easily be gripped so that a user can easily spin the rotating wheel 3097 about the central axis A during the dispensing operation. The user can thus engage the flange 3099 with a digit to rotate the wheel 3097 about the axis A. In an example embodiment, the flange 3099 does not extend radially outwardly beyond the outer circumference of the base 3096, the crown 3080, or both.

The rotating wheel 3097 is generally cylindrically shaped and includes at least one second pill opening 3086. In the exemplary embodiment of the cap assembly 3024, the rotating wheel 3097 includes five second pill openings 3086. In some embodiments, the rotating wheel includes one, two, three, four, or more than five second pill openings. The second pill openings 3086 are spaced radially from the central axis A by the same distance as the first pill openings 3085, and the second pill openings 3086 have similar shapes and sizes as the first pill openings 3085. Accordingly, when the medication container 3020 is inverted and an empty one of the second pill openings 3086 is brought by spinning the rotating wheel 3097 into alignment with one of the first pill openings 3085 that is holding a pill 3026, that pill 3026 will fall under the influence of gravity from the first pill opening 3085 to the second pill opening 3086. In an example embodiment, the second pill openings 3086 are greater in number than the first pill openings 3085.

In the exemplary embodiment, the pills 3026 are elongated in shape with a major dimension and a minor dimension, and the second pill openings 3086 are configured to hold the pills 3026 in such a manner that a major dimension of the pill 3026 extends in an axial direction. In an example embodiment, the axial direction is generally parallel to the axis A, e.g., with less than five degrees of skew along the respective axis. Therefore, the second pill openings 3086 have diameters that are greater than the minor dimension but less than the major dimension of the pills 3026, and the second pill openings 3086 have axial heights that are greater than the major dimension of the pills 3026. This allows each second pill opening 3086 to only accommodate a single pill 3026 at a time. In some embodiments, the second pill openings may be sized to accommodate multiple pills at a time. The number of pills that the second pill openings can accommodate preferably matches the number of pills that the first pill openings of the base can accommodate. In some embodiments, the first and second pill openings may have variable sizes to accommodate different types of pills. Thus, the receptacle can contain different types of pills, which may be in the same or different chambers.

The crown 3080 includes a centrally located probe opening that receives and is engaged with an end of the probe 3084 of the base 3096 to fixedly attach the base 3096 and the crown 3080 with one another. Thus, when the rotating wheel 3097 is rotated about the central axis A, the crown 3080 and base 3096 remain fixed against rotation along with the receptacle 3022. In other words, the rotating wheel 3097 rotates relative to both the crown 3080 and the base 3096. The attachment between the probe 3084 of the base 3096 and the crown 3080 may be formed through a heat staking operation. In other embodiments, other attachment means may be employed, including adhesives or mechanical fasteners. In the exemplary embodiment, an LED light 3066 is attached with a distal end of the probe 3084 and is able to provide visual alerts to a user of the medication container 3020. The LED light 3066 is in electrical communication with the electrical components within the chamber 3068.

The crown 3080 has an outer diameter that is equal to or greater than an outer diameter of the flange 3099 of the rotation wheel 3097. In other words, the flange 3099 either is flush with an outer surface of the crown 3080 or is recessed inwardly from the outer surface of the crown 3080. This may protect against unintentional rotation of the rotation wheel 3097 relative to the crown 3080 and base 3096.

The crown 3080 includes a single third pill opening 3087 that is spaced radially from the central axis A by the same distance as the second pill openings 3086 of the rotation wheel 3097 so that the second pill openings 3086 can be brought into alignment with the third pill opening 3087 by rotation of the rotating wheel 3097. The third pill opening 3087 is spaced circumferentially from all of the first pill openings 3085 in the base such that the first, second, and third pill openings 3085, 3086, 3087 cannot all be aligned with one another. Thus, dispensing pills 3026 is only possible through the rotation of the rotation wheel 3097 as discussed below, and only a single pill 3026 can be dispensed at a time.

The dispensing operation begins with inverting the medication container 3020 such that the projection 3098 on the base 3096 guides at least one pill 3026 into at least one of the first pill openings 3085. The user then holds the receptacle 3022 stationary while rotating the rotating wheel 3097 to bring an empty one of the second pill openings 3086 into alignment with the first pill opening 3085 such that the pill 3026 will fall under the influence of gravity from the first pill opening 3085 into the second pill opening 3086. Further rotation will bring one of the second pill openings 3086 containing a pill 3026 into alignment with the third pill opening 3087 of the crown 3080 such that the pill 3026 can fall through the third pill opening 3087 and out of the cap assembly 3024. Another pill 3026 can be dispensed by rotating the rotation wheel 3097 further. This operation is both simple and intuitive for the user.

The cap assembly 3024 further includes at least one pill detect sensor 3048 that detects the movement of pills 3026 in at least one of the first, second, and third pill openings 3085, 3086, 3087. In the exemplary embodiment, the at least one pill detect sensor may be a photovoltaic sensor that projects a light into one or more of the pill openings 3085, 3086, 3087 and detects reflected light to determine if a pill 3026 is present in the pill opening. In the exemplary embodiment, the at least one pill detect sensor 3048 is located in the crown 3080 and projects light into one or more of the second pill openings 3086 of the rotating wheel 3097.

In other embodiments, the at least one pill detect sensor 3048 may be located in either the rotating wheel 3097 or in the base 3096.

The cap assembly 3024 further includes a rotation indexing or limiting device that is configured to lightly hold the rotation wheel 3097 in one or more predetermined orientations relative to the base 3096 and crown 3080 of the cap assembly 3024. For example, the predetermined orientations could be when at least one of the second pill openings 3086 of the rotation wheel 3097 is aligned with at least one of the first pill openings 3085 of the base 3096. The rotation indexing device may protect against unintentional rotation of the rotation wheel 3097 when the user does not intend to dispense pills 3026 from the medication container 3020.

The rotation indexing device of the exemplary embodiment includes at least one dimple 3100 and at least one bump 3101 that is shaped to be received in the at least one dimple 3100 when the alignment between the at least one second pill opening 3086 and the at least one first pill opening 3085 is achieved. The rotation wheel 3097 may be biased in an axial direction by, for example, a spring or a compression material to urge the at least one bump 3101 into the at least one dimple 3100 but to allow the bump 3101 to separate from the dimple 3100 upon the application of sufficient force, thereby allowing further rotation of the rotation wheel 3097. In the exemplary embodiment, the rotation indexing device includes five dimples 3100 (one for each second pill opening 3086) that are located on the rotation wheel 3097 and a single bump 3101 that is located on the crown 3080. In some embodiments, either the dimple (s) or the bump(s) may be located on the rotation wheel, and the other may be located on either the base or the crown. In some embodiments, other types of rotation indexing devices than the dimple and bump embodiment described herein may be utilized.

The rotation indexing device may be configured to communicate with the processor such that the processor can either activate or otherwise increase the power applied to one or more of the electrical components of the cap assembly 3024 in response to rotation of the rotation wheel 3097. For example, the processor could leave the electrical components in a low power, or sleep, mode until the rotation indexing device detects rotation of the rotation wheel 3097. In response to this detection, the other electrical components can be powered up to detect the passage of one or more pills 3026 through the cap assembly 3024 and to record this event to the memory.

Figure 35:
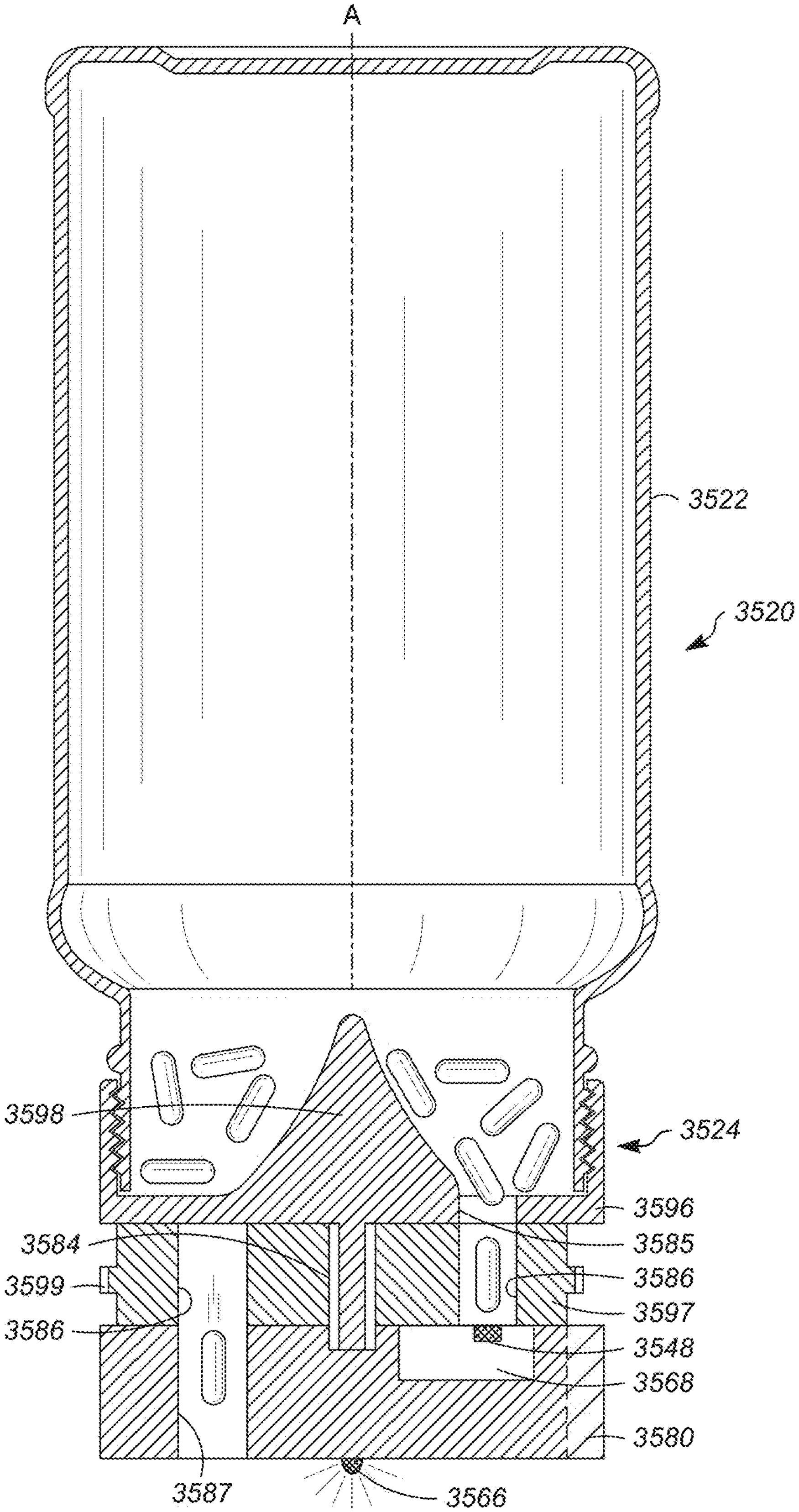
FIG. 35 is a cross-sectional view of a medication container that includes still another exemplary embodiment of the cap assembly.

Referring now to FIG. 35, yet another exemplary embodiment of the cap assembly 3520 is generally shown with like numerals, separated by a prefix of "35," identifying like components with the embodiments described above. This embodiment is similar to the embodiments of FIGS. 30-34 but in this embodiment, the chamber 3568 containing the electrical components of the cap assembly 3524 is located within the crown 3580 rather than within the base 3596. Also, in this embodiment, the probe 3584 on the base 3596 does not extend fully through the crown 3580, and the light 3566 is attached directly with the crown 3580 rather than with the probe 3584. In some other embodiments, the probe, which fixes the base and crown together, may be formed into the crown.

Figure 36:
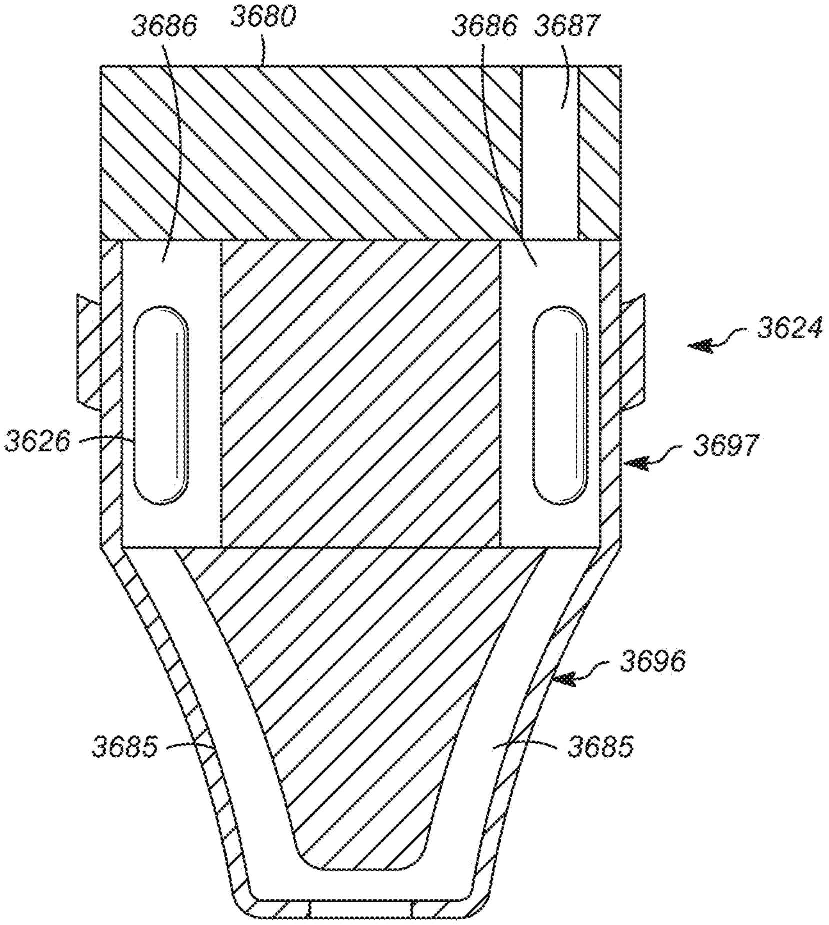
FIG. 36 is a cross-sectional view of a further exemplary embodiment of a cap assembly.
Figure 37:
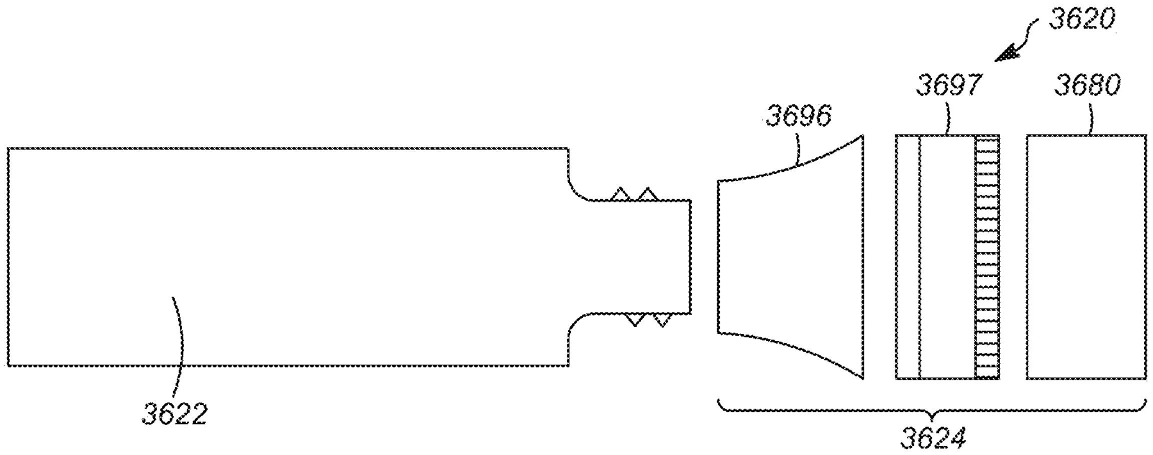
FIG. 37 is an exploded view of a medication container including the cap assembly of FIG. 38.
Figure 38:
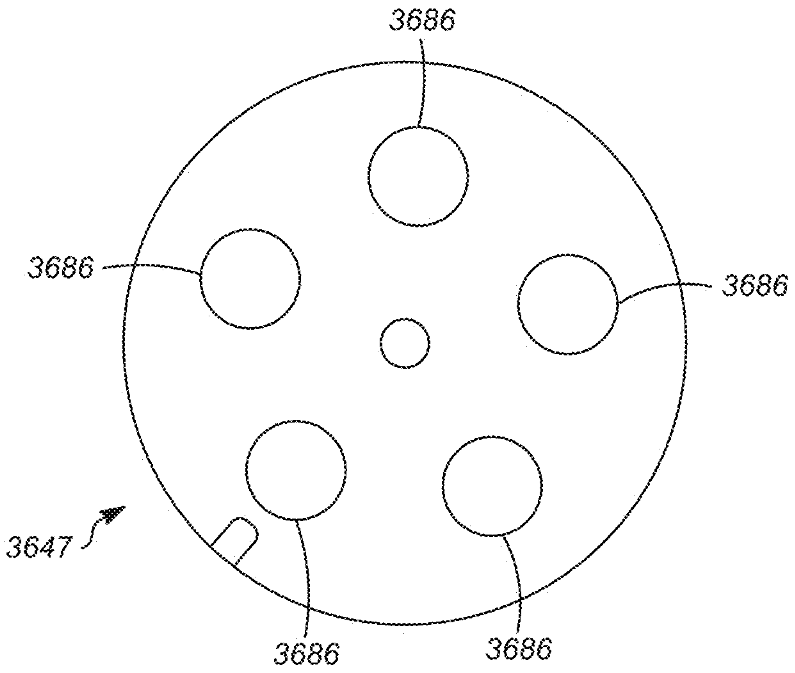
FIG. 38 is a top elevation view of a rotational wheel of the cap assembly of FIG. 36.

Referring now to FIGS. 36-38, yet another exemplary embodiment of the cap assembly 3624 is generally shown with like numerals, separated by a prefix of "36," In this embodiment, the first pill openings 3685 of the base 3696 extend into the projection 3698. Specifically, the projection 3698 includes one or more channels that extend downwardly and radially outwardly for delivering pills 3626 in the receptacle 3622 into the second pill openings 3686 of the rotation wheel 3697.

Figure 39:
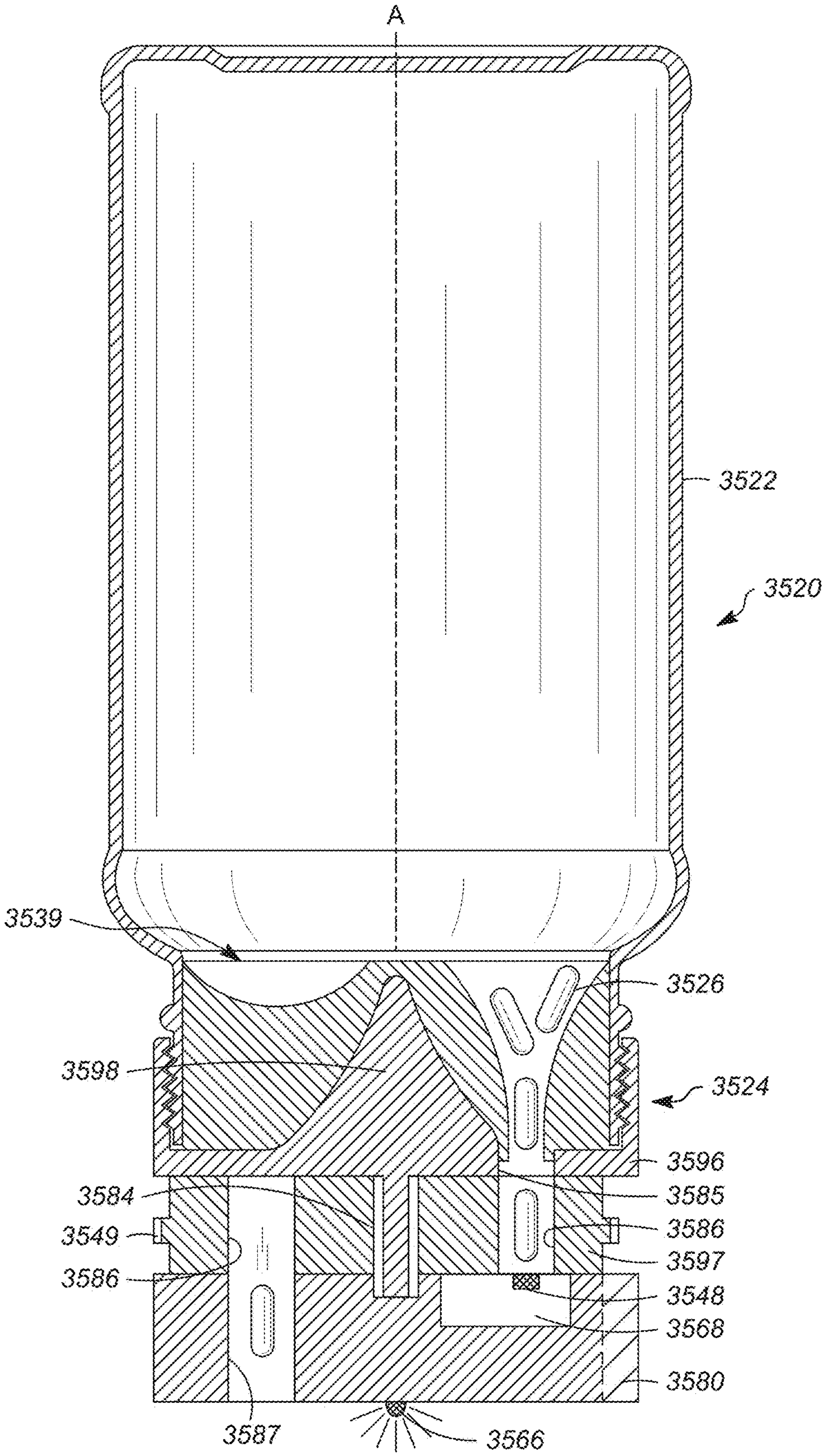
FIG. 39 is a cross-sectional view illustrating the medication container of FIG. 35 and further including a guiding device attached with the base of the cap assembly.

Turning now to FIG. 39, the embodiment of the medication container 3520 with the cap assembly 3524 of FIG. 35 is illustrated. However, FIG. 39 is distinguished from FIG. 35 by the inclusion of a guiding device 3539 that is received into the open end of the receptacle 3522 and is configured to guide pills 3526 inside the receptacle 3522 towards the first pill openings 3585. The guiding device 3539 may either be fixed with the receptacle 3522, such as by press-fitting the guiding device 3539 into the opening; it may be fixed with the base 3596 of the cap assembly 3524, such as with adhesives or fasteners; or it may be integrally formed with the base 3596. The guiding device 3539 may include a plurality of funnel-shaped openings that extend vertically downwardly towards and partially into the first pill opening 3585 of the base 3596. The guiding device 3539 includes as many funnel-shaped openings as the base 3596 includes first pill openings 3585. For example, in the exemplary embodiment, the base 3596 includes five first pill openings 3585, and therefore, the guiding device 3539 includes five funnel-shaped openings with one full funnel-shaped opening being fully visible and one funnel-shaped opening being partially invisible in FIG. 39. The lower ends of the funnel-shaped openings are dimensioned slightly larger than a minor dimension of the pills 3526 so that the funnel-shaped openings guide and property orient the pills 3526 prior to the pills 3526 passing through the first pill opening 3585 of the base 3596 and into the second pill opening 3586 of the rotation wheel 3597. Thus, the funnel-shaped openings automatically singulate the pills 3526 prior to the pills 3526 proceeding into the cap assembly 3524 and ultimately out of the medication container 3520.

Figure 40:
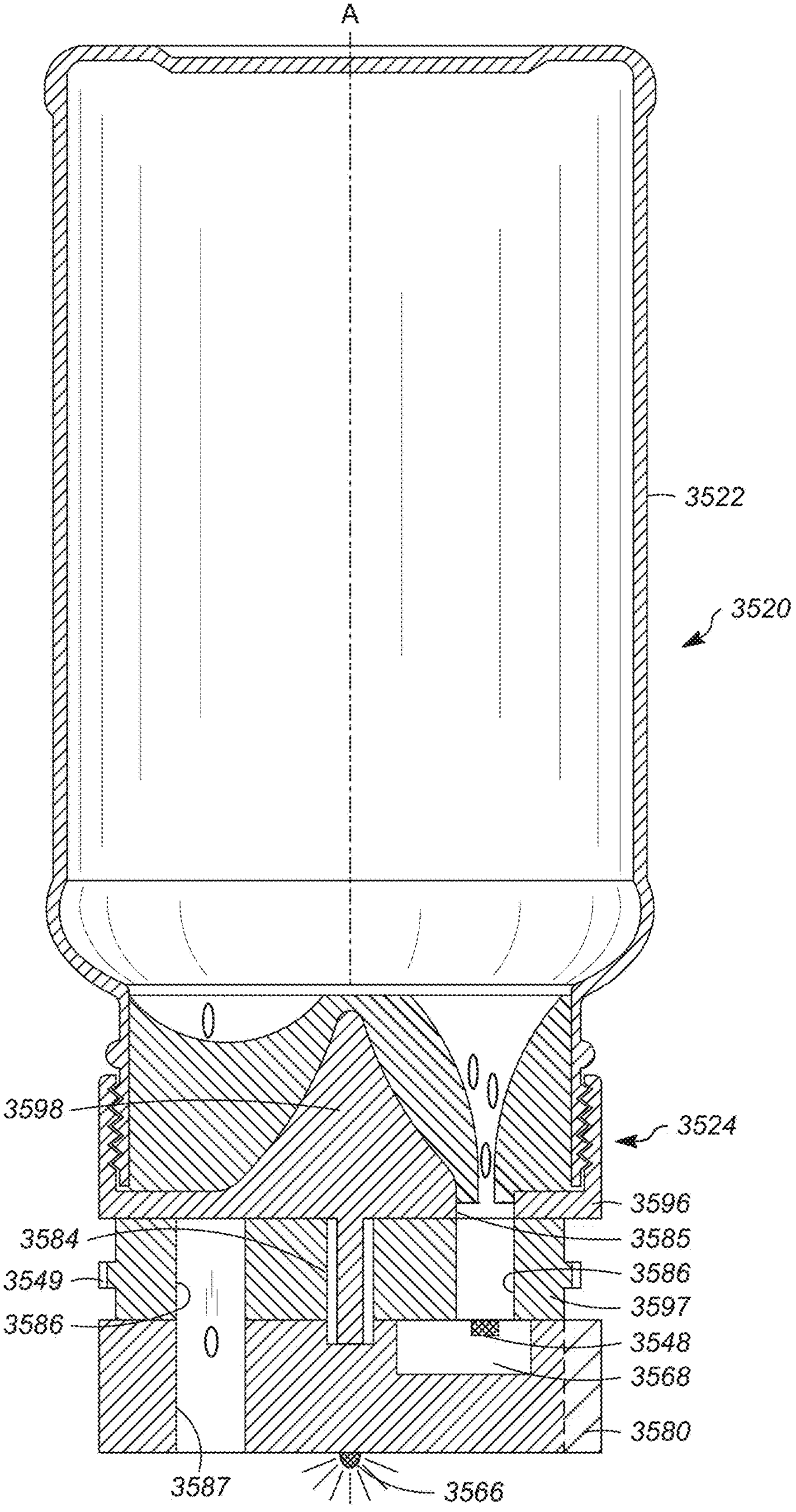
FIG. 40 is another cross-sectional view of the medication container of FIG. 35 and further including a different embodiment of the guiding device attached with the base of the cap assembly.

Turning now to FIG. 40, this embodiment illustrates a similar medication container 3520 but with a differently shaped guiding device 3539 having differently dimensioned funnel-shaped openings for singulating differently sized pills 3526 than the embodiment of FIG. 39.

The guiding device for singulating and guiding pills towards an opening can also be incorporated into other embodiments of the medication container, including both those shown in the drawings and those not shown. For example, FIG. 3B illustrates a guiding device 39 with a single funnel-shaped opening which extends towards the single opening of the cap assembly 24 of this embodiment. The funnel shaped opening has a wider throat (in which the exiting pills enter first during dispensing) and a narrower mouth. As with the above-described embodiments of the guiding device, the guiding device 39 of FIG. 3B may be fixedly attached with either the receptacle 22 or with one of the components of the cap assembly 24 and may extend partially into the opening of the cap assembly 24.

In various embodiments, the medications can be non-liquid medications such as individualized dose medications, e.g., pharmaceuticals. The individual dose medications can be individually counted when they are dispensed from the receptacle past the medication sensor aligned with the passage. The medication, as in some embodiments, is a small, solid dosage form of a globular, ovoid, spheroid, or lenticular shape, containing one or more medical substances, supplemental substances, spices, or combinations thereof. The container and the cap are adapted to store these forms and prevent entry of environment into the interior of the medication container when closed by the cap assembly. The medication container is adapted to hold a plurality of the forms, e.g., ten, twenty, thirty, sixty, ninety, or multiples thereof.

Some of the embodiments described herein are described with light sensors, however, sonic sensors can be used in these embodiments. The sonic sensors sense reflected sound pulse and detects the echo. The sonic sensors may detect the orientation of one or more items in the passage. The sonic sensors may be more insensitive to hindering factors, e.g., dust, smoke, ambient light, vapor, lint, or the like. In an example embodiment, sonic sensors and light sensors are used together and will produce different detection signals which can be combined to detect the item traveling through the exit passage of the container.

As embodiments of the medication dispensers herein use their own light or sonic pulses to detect dispensing an item, hence, the sensing can be performed in low or no light ambient environments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module.

Further, in one aspect, for example, systems described herein may be implemented using a special purpose computer/processor may be utilized which may contain hardware for carrying out any of the methods, algorithms, or instructions described herein. The hardware may become a special purpose device when storing instructions, loading instructions, or executing instructions for the methods and/or algorithms described herein.

Further, all or a portion of implementations of the present disclosure may take the form of a computer program product accessible from, for example, a computer-usable or computer-readable medium. The program includes steps to perform, at least, portions of the methods described herein. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under law.

What is claimed is:

1. A medication container, comprising a receptacle having an inner space for holding medications;

a cap assembly coupled with the receptacle for retaining the medications in the inner space, the cap assembly including a crown and a base and a rotation wheel, the base being engaged with the receptacle;

the base and crown being fixedly attached with one another;

the base, rotation wheel, and crown have at least one pill opening, the pill openings of the base and crown being circumferentially spaced apart from one another;

the rotation wheel being rotatable relative to the base and the crown to transport a pill through a curved path from the pill opening of the base to the pill opening of the crown or from the pill opening of the crown to the pill opening of the base to either dispense the pill from the receptacle or to insert the pill into the receptacle;

a probe extending through an opening in the rotation wheel between the base and crown to fixedly attach the base and crown with one another; and a light attached to an end of the probe.

2. The medication container as set forth in claim 1, wherein the rotation wheel is in a slip-fit contact with a probe on the base.

3. The medication container as set forth in claim 1, wherein the receptacle has threads adjacent an opening and wherein the base of the cap assembly is threadedly engaged with the threads of the receptacle.

4. The medication container as set forth in claim 1, wherein the rotation wheel includes multiple pill openings and wherein the crown only has a single pill opening so that the cap assembly can only dispense pills from one of the pill openings of the rotation wheel at a time.

5. The medication container as set forth in claim 1, wherein the base includes a projection that extends into the receptacle for guiding pills in the receptacle to the at least one pill opening of the base.

6. The medication container as set forth in claim 1, wherein at least the rotation wheel includes at least one rotation indexing device that holds the rotation wheel in at least one rotational orientation relative to the base and the crown.

7. The medication container as set forth in claim 1 wherein the rotation wheel includes at least one gripping feature that can be engaged by a digit of a user to rotate the rotation wheel relative to the base and the crown during a dispensing operation.

8. The medication container as set forth in claim 7 wherein the at least one gripping feature of the rotation wheel is recessed radially inwardly of or radially aligned with an outer periphery of at least one of the base and of the crown.

9. The medication container as set forth in claim 8 wherein the at least one gripping feature of the rotation wheel is recessed radially inwardly of or radially aligned with the outer peripheries of both of the base and of the crown.

10. The medication container as set forth in claim 1, wherein the base, the crown, and the rotation wheel are made of a polymer.

11. The medication container as set forth in claim 1, wherein the base includes a chamber that contains one or more electrical components of the cap assembly.

12. The medication container as set forth in claim 11, wherein the chamber is located along a central axis of the base.

13. The medication container as set forth in claim 1, further including at least one pill detect sensor that is configured to detect movement of pills in the pill openings of the base, crown, and rotation wheel.

* * * * *